US012675246B2

(12) United States Patent
Hirajima et al.

(10) Patent No.: US 12,675,246 B2
(45) Date of Patent: Jul. 7, 2026

(54) MANAGEMENT SYSTEM, METHOD, IMAGE-FORMING APPARATUS, AND SERVER APPARATUS FOR REPLACING CARTRIDGES

(71) Applicant: Canon Kabushiki Kaisha, Tokyo (JP)

(72) Inventors: Marehiko Hirajima, Kanagawa (JP); Hiroyuki Munetsugu, Kanagawa (JP); Kazumichi Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 18/524,175

(22) Filed: Nov. 30, 2023

(65) Prior Publication Data

US 2024/0094672 A1 Mar. 21, 2024

Related U.S. Application Data

(63) Continuation of application No. PCT/JP2022/021781, filed on May 27, 2022.

(30) Foreign Application Priority Data

Jun. 17, 2021 (JP) ................................ 2021-101028
Dec. 27, 2021 (JP) ................................ 2021-213084

(51) Int. Cl.
*G06F 3/12* (2006.01)
*G03G 21/16* (2006.01)
*G03G 21/18* (2006.01)

(52) U.S. Cl.
CPC ....... *G06F 3/1239* (2013.01); *G03G 21/1892* (2013.01); *G03G 21/1896* (2013.01);
(Continued)

(58) Field of Classification Search
CPC ...... G06F 3/1239; G06F 3/121; G06F 3/1288; G03G 21/1892; G03G 21/1896; G03G 21/1633; G03G 2215/0697
See application file for complete search history.

(56) References Cited

U.S. PATENT DOCUMENTS 10,372,061 B1 8/2019 Fuse
11,046,083 B2 6/2021 Kiyohara
(Continued)

FOREIGN PATENT DOCUMENTS

JP 2002014577 A 1/2002
JP 2004062078 A 2/2004
(Continued)

OTHER PUBLICATIONS

Japanese Office Action dated Sep. 29, 2025 in counterpart Japanese Patent Appln. No. 2021-213084.
(Continued)

*Primary Examiner* — Nicholas Pachol
(74) *Attorney, Agent, or Firm* — Venable LLP

(57) ABSTRACT

In a management system, an apparatus that is present in a user environment obtains a code that is specific to a device containing a consumable agent to be consumed for image formation or specific to a cartridge-type device insertable into an image-forming apparatus. A server apparatus that is present in a remote environment performs authentication for the device based on the code obtained by the apparatus. When the authentication performed by the server apparatus is successful, a replenishment path of the consumable agent from the device to the image-forming apparatus is opened or the replenishment path is allowed to be opened, or an inhibiting mechanism capable of inhibiting the device from being inserted into the image-forming apparatus is put in a state in which the device can be inserted.

22 Claims, 35 Drawing Sheets

(52) U.S. Cl.
CPC ............ *G06F 3/121* (2013.01); *G06F 3/1288* (2013.01); *G03G 21/1633* (2013.01); *G03G 2215/0697* (2013.01)

(56) References Cited

U.S. PATENT DOCUMENTS

| | | | |
|---|---|---|---|
| 11,235,584 B2 | 2/2022 | Hirai et al. | |
| 11,269,267 B2 | 3/2022 | Chick et al. | |
| 11,298,952 B2 | 4/2022 | Mizutani et al. | |
| 11,400,726 B2 | 8/2022 | Oguchi et al. | |
| 2016/0037003 A1 | 2/2016 | Oku | |
| 2021/0129551 A1 | 5/2021 | Mizutani | |
| 2022/0100438 A1* | 3/2022 | Hattori | G06F 3/1285 |
| 2023/0273566 A1* | 8/2023 | Park | G03G 21/1676 399/262 |

FOREIGN PATENT DOCUMENTS

| | | | |
|---|---|---|---|
| JP | 2005134513 | A | 5/2005 |
| JP | 2006142608 | A | 6/2006 |
| JP | 2006301529 | A | 11/2006 |
| JP | 2008225054 | A | 9/2008 |
| JP | 2012054783 | A | 3/2012 |
| JP | 2012201100 | A | 10/2012 |
| JP | 2013058835 | A | 3/2013 |
| JP | 2015090384 | A | 5/2015 |
| JP | 2016033615 | A | 3/2016 |
| JP | 2018039225 | A | 3/2018 |
| JP | 2019064065 | A | 4/2019 |
| JP | 2020179586 | A | 11/2020 |
| JP | 2021030459 | A | 3/2021 |
| JP | 2021030667 | A | 3/2021 |
| JP | 2021030676 | A | 3/2021 |
| JP | 2021067836 | A | 4/2021 |
| JP | 2021070187 | A | 5/2021 |
| WO | 2020046338 | W | 3/2020 |

OTHER PUBLICATIONS

Japanese Office Action dated Jan. 14, 2025 in counterpart Japanese Patent Appln. No. 2021-101028.
International Search Report dated Aug. 16, 2022 issued in PCT Appln. No. PCT/JP2022/021781.
Japanese Office Action dated Nov. 5, 2024 in counterpart Japanese Patent Appln. No. 2021-101028.
Extended European Search Report dated Jun. 10, 2025 in counterpart European Patent Appln. No. 22824778.9.
Japanese Office Action dated Dec. 15, 2025 in counterpart Japanese Patent Appln. No. 2021-213084.
Japanese Office Action dated Apr. 10, 2026 in counterpart Japanese Patent Appln. No. 2025-075692.

* cited by examiner

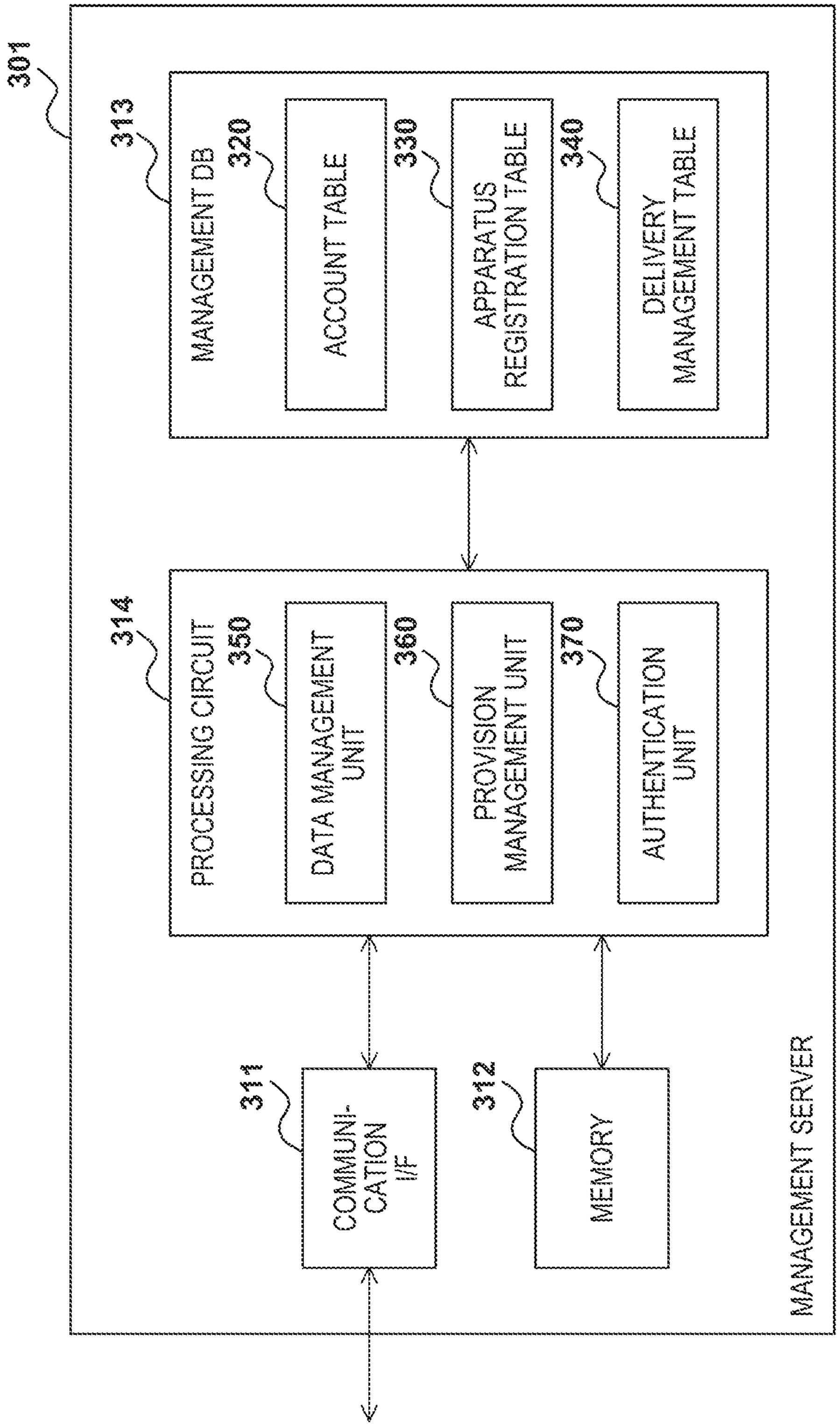
F I G. 5
301 MANAGEMENT SERVER
313 MANAGEMENT DB
- 320 ACCOUNT TABLE
- 330 APPARATUS REGISTRATION TABLE
- 340 DELIVERY MANAGEMENT TABLE
314 PROCESSING CIRCUIT
- 350 DATA MANAGEMENT UNIT
- 360 PROVISION MANAGEMENT UNIT
- 370 AUTHENTICATION UNIT
311 COMMUNI-CATION I/F
312 MEMORY

MANAGEMENT SYSTEM, METHOD, IMAGE-FORMING APPARATUS, AND SERVER APPARATUS FOR REPLACING CARTRIDGES

CROSS-REFERENCE TO RELATED APPLICATIONS

This application is a Continuation of International Patent Application No. PCT/JP2022/021781, filed May 27, 2022, which claims the benefit of Japanese Patent Application No. 2021-101028, filed Jun. 17, 2021 and Japanese Patent Application No. 2021-213084, filed Dec. 27, 2021, all of which are hereby incorporated by reference herein in their entirety.

BACKGROUND OF THE INVENTION

Field of the Invention

The present disclosure relates to a management system, a method, an image-forming apparatus, and a server apparatus.

Background Art

An image-forming apparatus such as a photocopier, a printer, or a facsimile receiver forms an image on a recording medium by consuming a consumable agent such as toner, ink, or the like. When a consumable agent is depleted in a cartridge-type image-forming apparatus, a user replaces the cartridge by extracting the used cartridge from the image-forming apparatus and inserting a new cartridge into the image-forming apparatus. On the other hand, when a consumable agent is depleted in a replenishment-type image-forming apparatus, a user replenishes the consumable agent into a tank of the image-forming apparatus from a device that contains the consumable agent. PTL 1 proposes a mechanism for temporarily connecting a cylindrical device that contains toner to a printer and replenishing the toner into the printer from the device.

There is known an image-forming apparatus that performs advanced information processing based on information read out from a memory which is installed in a cartridge or a device for replenishment described above. For example, PTL 2 discloses a technology in which data indicating a remaining amount of toner in a toner cartridge is stored in a memory of the cartridge and a user is prompted to order a cartridge in a timely manner when the data indicates a decrease in the remaining amount of toner. PTL 3 discloses a technology in which a printer reads a random number value from a memory of a cartridge mounted in the printer and enables toner to be supplied from the cartridge when an authentication based on the random number value is successful in a server apparatus. The printer described in PTL 1 also performs authentication based on authentication data read out from the memory of the device for replenishment, but the authentication is only local authentication by a single printer.

CITATION LIST

Patent Literature

PTL 1: International Publication No. 2020/046338
PTL 2: Japanese Patent Laid-Open No. 2015-090384
PTL 3: Japanese Patent Laid-Open No. 2021-030667

With the local authentication performed by the image-forming apparatus described in PTL 1, compatibility between the device and the image-forming apparatus can be verified. However, local authentication alone may not be preferable in, for example, applications in which a user's usage status of the image-forming apparatus or the consumable agent is managed under some kind of contract conditions. It is also conceived that there will be difficulties in permitting or inhibiting the replenishment of the consumable agent considering conditions, aside from the compatibility of the device, which are not known to the image-forming apparatus. On the other hand, configuring a device memory to store a variety of information, such as data on the remaining amount and random numbers as described in PTL 2 and PTL 3 will increase the cost of the device, which in turn increases the running costs borne by the user. The running costs could be minimized if the device does not have a memory installed therein and functions such as authentication management or remaining amount management are omitted. However, this will result in disadvantages for the user, such as failures, malfunctions, or drops in image quality caused by using a consumable agent or device that does not conform to the contract conditions, or the consumable agent being depleted at an unexpected timing.

The technology according to the present disclosure aims to eliminate or mitigate at least one of the above-described inconveniences.

SUMMARY OF THE INVENTION

According to an aspect, there is provided a management system including: an obtaining unit present in a user environment and configured to obtain a code that is specific to a cartridge-type device that is insertable into an image-forming apparatus; an inhibiting mechanism that is disposed in at least one of the image-forming apparatus and the device and is capable of inhibiting the device from being inserted into the image-forming apparatus; a server apparatus present in a remote environment and configured to perform authentication for the device based on the code obtained by the obtaining unit; and a control unit present in the user environment and configured to put the inhibiting mechanism in a state in which the device can be inserted into the image-forming apparatus when the authentication performed by the server apparatus is successful. A corresponding method, an image-forming apparatus, and a server apparatus are also provided.

According to another aspect, there is provided a management system including: an obtaining unit present in a user environment and configured to obtain a code specific to a device that contains a consumable agent to be consumed for image formation; an opening and closing mechanism that is disposed in at least one of the device and an image-forming apparatus and capable of opening and closing a replenishment path of the consumable agent from the device to the image-forming apparatus; a server apparatus present in a remote environment and configured to perform authentication for the device based on the code obtained by the obtaining unit; and a control unit present in the user environment and configured to cause the opening and closing mechanism to open the replenishment path of the consumable agent or allow the opening and closing mechanism to open the replenishment path when the authentication performed by the server apparatus is successful. A corresponding method, an image-forming apparatus, and a server apparatus are also provided.

Further features of the present invention will become apparent from the following description of exemplary embodiments with reference to the attached drawings.

BRIEF DESCRIPTION OF THE DRAWINGS

FIG. 5 is a block diagram illustrating an example of the configuration of a management server according to the first embodiment.

DESCRIPTION OF THE EMBODIMENTS

Figure 1A:
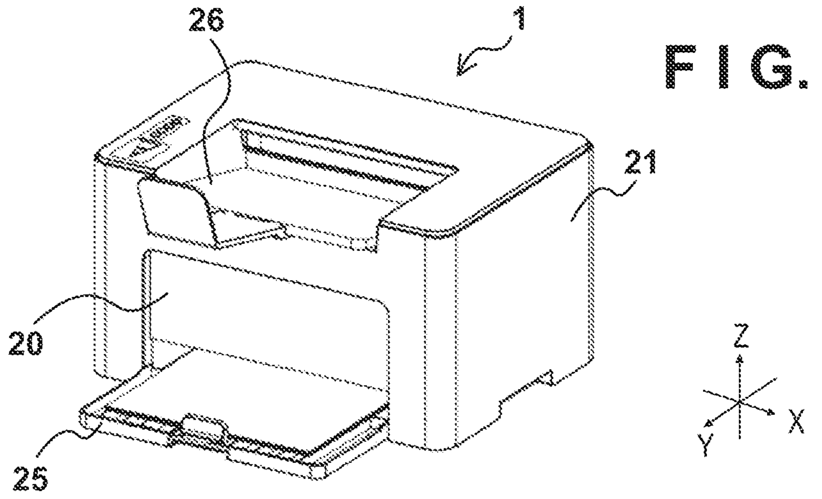
FIG. 1A is a first schematic perspective view illustrating an example of the appearance of an image-forming apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment

<1-1. Cartridge-Type Image-Forming Apparatus>

The first embodiment assumes that an image-forming apparatus 1 is a cartridge-type black-and-white laser printer. Note that the technology according to the present disclosure is not limited to this example, and can be applied in other types of printers, such as color laser printers and inkjet printers, for example. In general, the technology according to the present disclosure can be broadly applied in image-forming apparatuses such as photocopiers, printers, facsimile receivers, and multifunction peripherals.

The image-forming apparatus 1 forms an image on a recording medium based on input image data. Here, the recording medium can include a variety of media of different materials, such as paper, plastic film, envelopes, sheets, and cloth.

<1-1-1. Apparatus Appearance>

Figure 1B:
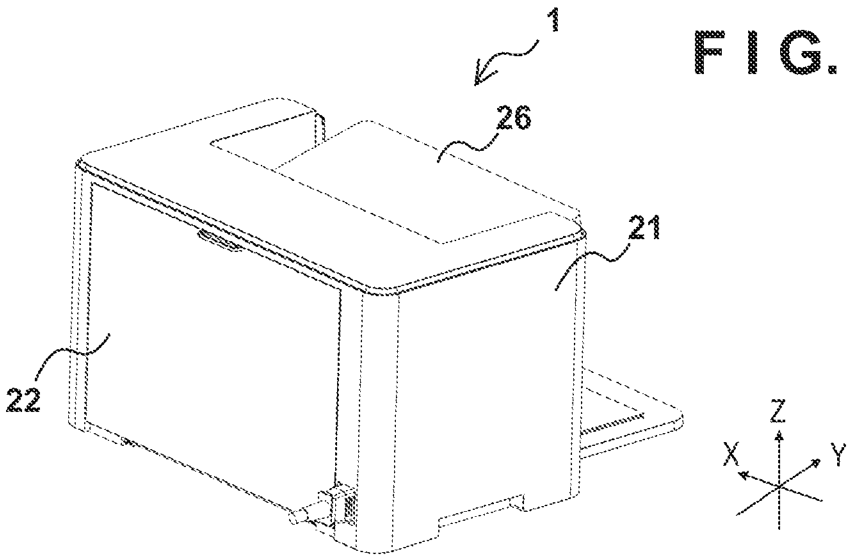
FIG. 1B is a second schematic perspective view illustrating an example of the appearance of the image-forming apparatus according to the first embodiment.

FIG. 1A illustrates an example of the appearance of the image-forming apparatus 1 according to the first embodiment, viewed from a given direction. FIG. 1B illustrates an example of the appearance of the image-forming apparatus 1 viewed from a direction different from that in FIG. 1A. In the following descriptions, a height direction of the image-forming apparatus 1 when the image-forming apparatus 1 is installed on a horizontal surface is taken as a Z direction. A direction that is orthogonal to the Z direction and parallel to a rotational axis direction of a photosensitive drum 44 (a main scanning direction), which will be described below, is taken as an X direction. A direction orthogonal to the X direction and the Z direction is assumed to be the Y direction.

Referring to FIGS. 1A and 1B, a housing of the image-forming apparatus 1 includes a front cover 20, an exterior cover 21, a rear cover 22, a sheet feed tray 25, and a discharge tray 26. The front cover 20 is disposed so as to be capable of being opened and closed on a front surface of the image-forming apparatus 1 (a surface facing the Y direction, in FIG. 1A). For example, a lower side of the front cover 20 is connected at both ends thereof to the exterior cover 21 by hinges. A user can open the front cover 20 by grasping a handle (not shown) on an upper side of the front cover 20 and pulling forward. When the front cover 20 is opened, an insertion path for a process cartridge 200, which will be described below, is opened, for example. The user can replace the process cartridge 200 in this state.

Figure 1C:
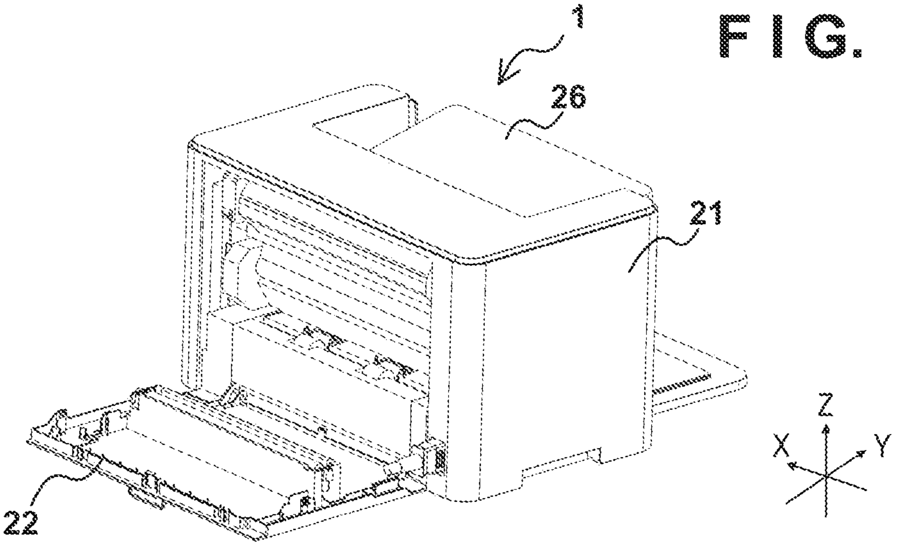
FIG. 1C is a third schematic perspective view illustrating an example of the appearance of the image-forming apparatus according to the first embodiment.

The rear cover 22 is disposed on a rear surface of the image-forming apparatus 1 (a surface facing the opposite direction from the front surface) so as to be capable of being opened and closed. A lower side of the rear cover 22, too, is connected at both ends thereof to the exterior cover 21 by hinges. The user can open the rear cover 22 by grasping a handle on an upper side of the rear cover 22 and pulling rearward. When the rear cover 22 is opened, a part of a transport path through which recording media are transported is exposed, for example. The user can remove jams arising in the transport path in this state. FIG. 1C illustrates a state in which the rear cover 22 is open.

<1-1-2. Internal Configuration of Apparatus>

Figure 2:
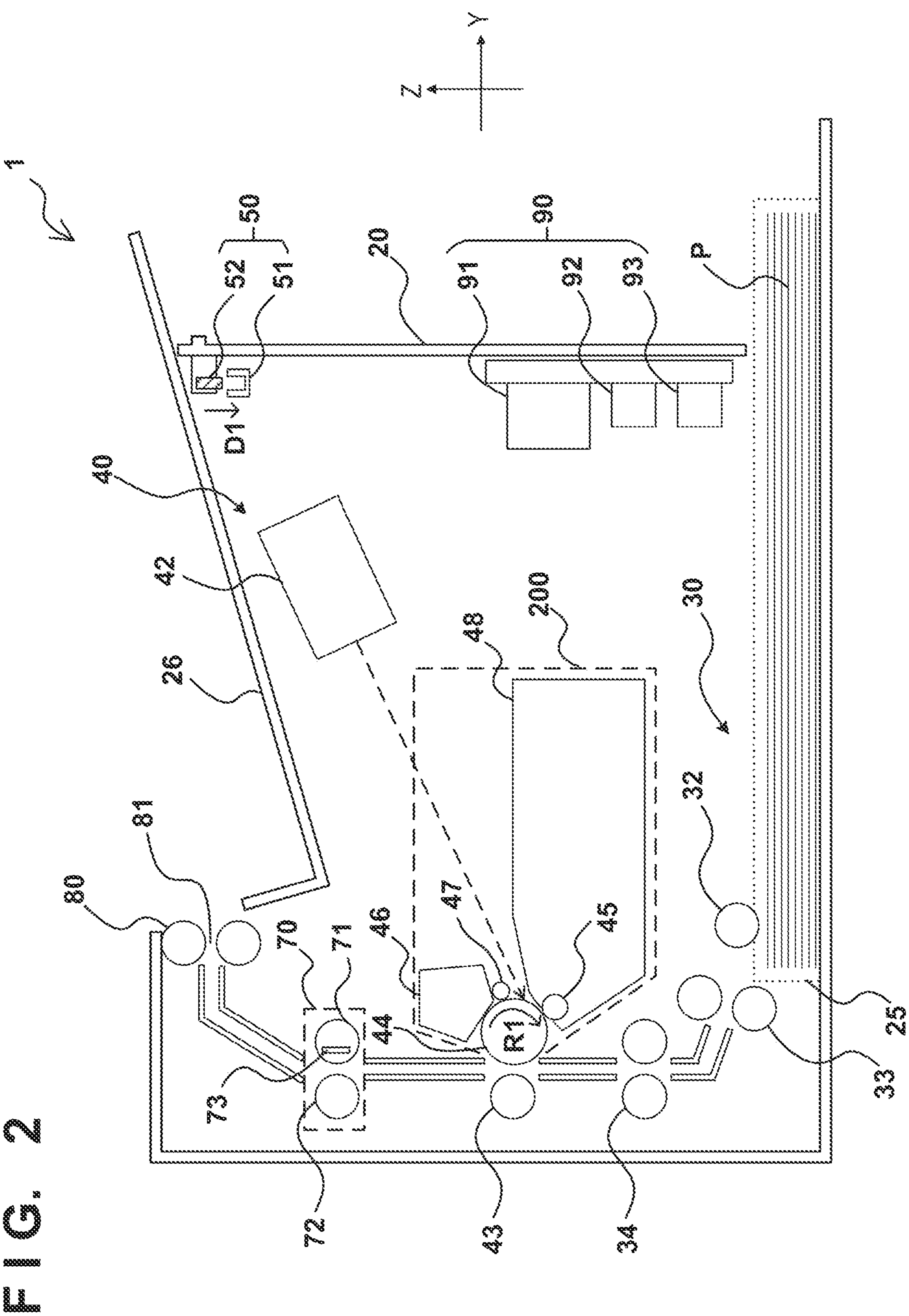
FIG. 2 is a schematic cross-sectional view illustrating an example of the physical configuration of the interior of the image-forming apparatus according to the first embodiment.

FIG. 2 is a schematic cross-sectional view illustrating an example of the physical configuration of the interior of the image-forming apparatus 1. Referring to FIG. 2, the image-forming apparatus 1 includes a feed unit 30, an image-forming unit 40, a fixing unit 70, a discharge roller pair 80, and a processing circuit 90. The feed unit 30 feeds a recording medium toward the image-forming unit 40. The image-forming unit 40 forms an image (a toner image) on the recording medium by consuming toner, which is a consumable agent. The fixing unit 70 fixes the image formed by the image-forming unit 40 onto the recording medium. The discharge roller pair 80 discharges the recording medium processed by the fixing unit 70 to the discharge tray 26.

The image-forming unit 40 includes the process cartridge 200, a scanner unit 42, and a transfer roller 43. The process cartridge 200 includes the photosensitive drum 44, a developing roller 45, a cleaning unit 46, a charging roller 47, and a preserving unit 48. The process cartridge 200 can be inserted into and extracted from the main body of the image-forming apparatus 1.

The photosensitive drum 44 is an image carrier having a photosensitive layer formed from an organic photosensitive material on a drum-shaped substrate. The photosensitive drum 44 is rotationally driven in a direction R1 in the figure by a motor. A charging voltage is applied to the charging roller 47 by a high-voltage power supply, and the charging roller 47 is pressed against the photosensitive drum 44 to uniformly charge the surface of the photosensitive drum 44. In accordance with the input image data, the scanner unit 42 irradiates the photosensitive drum 44 with a laser beam to expose the surface of the photosensitive drum 44. An electrostatic latent image corresponding to the input image is formed on the surface of the photosensitive drum 44 as a result of this exposure. Note that the scanner unit 42 may irradiate the photosensitive drum 44 with light from an LED array rather than a laser beam.

The developing roller 45 is rotatably supported by the preserving unit 48. The preserving unit 48 preserves toner. Although not illustrated in FIG. 2, the preserving unit 48 may further include a supply roller that applies toner preserved in the preserving unit 48 to the surface of the developing roller 45. A developing voltage is applied to the developing roller 45 by the high-voltage power supply. When the toner carried on the developing roller 45 contacts the photosensitive drum 44, the toner transfers from the developing roller 45 to the drum surface according to the potential distribution on the surface of the photosensitive drum 44. The electrostatic latent image is developed, and a toner image is formed, as a result.

The feed unit 30 includes a pickup roller 32, a separation roller pair 33, and a transport roller pair 34. The pickup roller 32 is located above the sheet feed tray 25, picks up a sheet of the recording medium (called simply a "sheet" hereinafter) from a bundle of recording media P stacked in the sheet feed tray 25, and feeds the recording medium to the separation roller pair 33. The separation roller pair 33 separates the sheet from the bundle and transports the sheet toward the transport roller pair 34. The transport roller pair 34 transports the sheet toward a transfer nip between the transfer roller 43 and the photosensitive drum 44. A transfer voltage from the high-voltage power supply is applied to the transfer roller 43, and the transfer roller 43 transfers the toner image developed on the surface of the photosensitive drum 44 to the sheet transported to the transfer nip.

The sheet onto which the toner image has been transferred is transported along the transport path and reaches the fixing unit 70. The fixing unit 70 includes a heating roller 71, a pressurizing roller 72, and a fixing heater 73. The heating roller 71 and the pressurizing roller 72 heat and pressurize the sheet as the sheet passes through the nip between the rollers. As a result, the toner particles melt and then harden again, which fixes the toner image to the sheet. The sheet that has passed through the fixing unit 70 is discharged from a discharge port 81 to the discharge tray 26 by the discharge roller pair 80. The cleaning unit 46 is disposed in the vicinity of the photosensitive drum 44. The cleaning unit 46 cleans the photosensitive drum 44 by scraping off toner remaining on the surface of the photosensitive drum 44.

The processing circuit 90 includes electronic components 91, 92, and 93 disposed on a board. For example, the electronic component 91 may be a processor, the electronic component 92 may be a memory, and the electronic component 93 may be an input/output device. The input/output device may include a communication interface. When a job instructing an image to be formed is input to the image-forming apparatus 1, an image-forming process based on input image data received from an external computer, for example, is started. In the image-forming process, as described above, the scanner unit 42 forms an electrostatic latent image on the photosensitive drum 44 according to the input image data, the developing roller 45 develops the electrostatic latent image to form a toner image, and the toner image is transferred to the sheet by the transfer roller 43. The processing circuit 90 operates as a controller for controlling this image-forming process.

<1-1-3. Internal Configuration of Cartridge>

Figure 3:
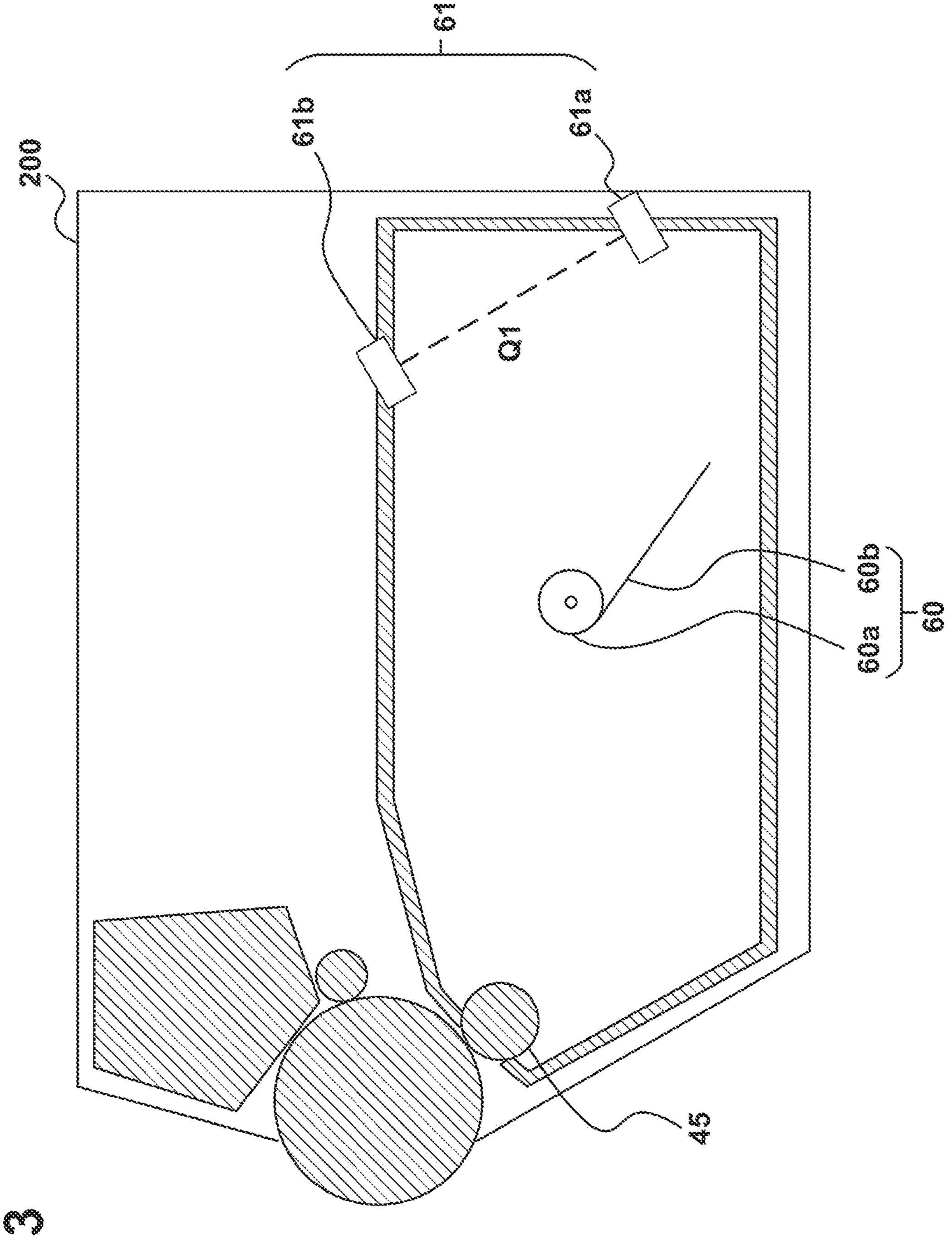
FIG. 3 is a schematic cross-sectional view illustrating a specific example of the configuration of the interior of a process cartridge according to the first embodiment.

A specific example of the configuration of the interior of the process cartridge 200 will be described next with reference to FIG. 3. As illustrated in FIG. 3, an agitation member 60 having a rotational shaft 60*a* and a blade 60*b* that rotates around the rotational shaft 60*a* is provided in the interior of the preserving unit 48 that contains the toner in the process cartridge 200. The blade 60*b* is driven by a motor so as to revolve. Due to the revolving of the blade 60*b*, the toner within the preserving unit 48 is agitated and reaches the developing roller 45. Note that the agitation member 60 may include a screw-shaped member instead of the blade 60*b*. The agitation member 60 may be responsible for homogenizing the toner within the preserving unit 48 by scraping the toner from the developing roller 45 and causing the toner within the preserving unit 48 to circulate.

A remaining amount detection unit 61 is further disposed in the preserving unit 48. The remaining amount detection unit 61 is a sensor for detecting the remaining amount of toner in the preserving unit 48. The remaining amount detection unit 61 includes a light emitter 61*a* and a light receiver 61*b*. The light emitter 61*a* emits light that proceeds along an optical axis Q1 within the preserving unit 48. The light receiver 61*b* is disposed at a position opposite the light emitter 61*a*, and receives the light emitted from the light emitter 61*a*. Note that when the light is guided by a light guide tube, for example, the light receiver 61*b* does not necessarily have to be disposed at a position opposite the light emitter 61*a*. The light emitter 61*a* may be, for example, a light-emitting element such as an LED, or may be a halogen lamp, a fluorescent lamp, or the like. The light receiver 61*b* may be a phototransistor, a photodiode, or an avalanche photodiode, for example. The light receiver 61*b* outputs a light detection signal having a signal level that depends on the amount of light received. The light detection signal is input to the processing circuit 90 after being converted from analog to digital, for example.

The processing circuit 90 may estimate the remaining amount of toner based on, for example, the ratio of time that the light from the light emitter 61*a* is blocked (by the toner) to a constant time window while the toner is being agitated. Note that the remaining amount detection unit 61 is not limited to the configuration example described above, and the remaining amount of toner may be detected or estimated using any method. For example, the remaining amount of toner may be estimated by subtracting, from the total amount of toner the previous time the cartridge was replaced, the total amount used thereafter. The processing circuit 90 may derive the amount of toner used based on statistical values pertaining to the image-forming operations, such as the number of sheets of the recording medium consumed by the printing or the pixel count. Instead of or in addition to the remaining amount of toner, the processing circuit 90 may also detect indices that affect degrees of consumption of members in the cartridge, such as sensitivity or rotational distance of the photosensitive drum, or driving time or voltage application time of other members. Based on values of such indices, the processing circuit 90 may estimate the remaining lifespan (also called the "cartridge remainder") for the process cartridge 200. The term "remaining amount of toner" in the following descriptions may be replaced with "cartridge remainder" as appropriate.

<1-1-4. Inhibiting Cartridge Insertion>

In the present embodiment, the image-forming apparatus 1 further includes an inhibiting mechanism 50 capable of inhibiting the insertion of the process cartridge (called simply a "cartridge" hereinafter) 200 into the image-forming apparatus 1 (see FIG. 2). In general, the inhibiting mechanism may be provided in at least one of the image-forming apparatus 1 and the cartridge 200, but an example in which the inhibiting mechanism 50 is provided in the image-forming apparatus 1 will be described here.

In the example in FIG. 2, the inhibiting mechanism 50 includes a pin receiving member 51 disposed in the main body of the image-forming apparatus 1 and a locking pin 52 disposed on the front cover 20. The pin receiving member 51 is, for example, a cylindrical member having an opening at one end, and can receive the locking pin 52 inside from the opening. The locking pin 52 may be, for example, a rod-shaped member having a diameter slightly smaller than an inner diameter of the pin receiving member 51, and the center axis of the locking pin 52 coincides with the center axis of the pin receiving member 51 when the front cover 20 is closed. The locking pin 52 is capable of moving along its center axis in a direction D1 (and in the opposite direction) in the figure. The movement of the locking pin 52 is controlled by a control command (lock command/unlock command) output from the processing circuit 90 when the front cover 20 is closed. For example, when the processing circuit 90 outputs the lock command, the locking pin 52 moves in the direction D1 due to the effect of a magnetic field generated by a solenoid (not shown) and fits into the pin receiving member 51. This results in the pivoting of the front cover 20 being inhibited, i.e., the user cannot open the front cover 20 to insert the cartridge 200 into the image-forming apparatus 1. When the processing circuit 90 outputs the unlock command, the magnetic field of the solenoid is canceled, and the locking pin 52 moves in the opposite direction (e.g., biased by a spring (not shown)) to disengage from the pin receiving member 51. This results in the pivoting of the front cover 20 being possible once again, i.e., the user can open the front cover 20 to insert the cartridge 200 into the image-forming apparatus 1.

The configuration of the mechanism for inhibiting the insertion of the cartridge is not limited to the example described above. For example, instead of a mechanism that restricts the opening and closing of the cover of the image-forming apparatus 1, a mechanism that blocks the insertion path of the cartridge may be employed as the inhibiting mechanism. For example, the insertion path of the cartridge may be blocked by a movable shutter or stopper. Such an inhibiting mechanism may allow the cartridge to move in an extracting direction at any time while inhibiting the cartridge from moving in an insertion direction. The movable members of the inhibiting mechanism (e.g., the locking pin 52, the shutter, or the stopper described above) may be driven by a motor or other type of actuator rather than a solenoid. In other words, the inhibiting mechanism may be any mechanical, electromagnetic, electrical, or software-based mechanism. If the cartridge is inserted into and extracted from the image-forming apparatus 1 through computer control without relying on operations made by the user, the locking and unlocking of the inhibiting mechanism may be realized simply by program codes. In the following descriptions, a first state of the inhibiting mechanism 50, in which the cartridge 200 can be inserted into the image-forming apparatus 1, will be called an "unlocked state", and a second state of the inhibiting mechanism 50, in which the cartridge 200 cannot be inserted into the image-forming apparatus 1, will be called a "locked state".

The image-forming apparatus 1 may further include an indicator (not shown) that indicates to the user whether the state of the inhibiting mechanism described above is the locked state or the unlocked state. The indicator may be constituted by, for example, a light-emitting diode (LED) disposed within the housing and a window that transmits light from the LED. When the indicator indicates that the inhibiting mechanism is in the unlocked state, the user can insert the cartridge 200 into the image-forming apparatus 1.

<1-2. Device Management System>

To verify the compatibility between the above-described image-forming apparatus 1 and a cartridge-type device such as the cartridge 200, it is contemplated to perform local authentication in the image-forming apparatus 1. However, with local authentication by a single device, it is difficult to permit or inhibit the use of the device taking other conditions into consideration, such as whether a legitimate registered user is using the device. Expanding the conditions to be verified through local authentication results in a more complex and expensive device. Accordingly, the first embodiment described in this section incorporates a mechanism in which a server apparatus operating in a remote environment is involved in managing the use of cartridge-type devices.

<1-2-1. System Overview>

Figure 4:
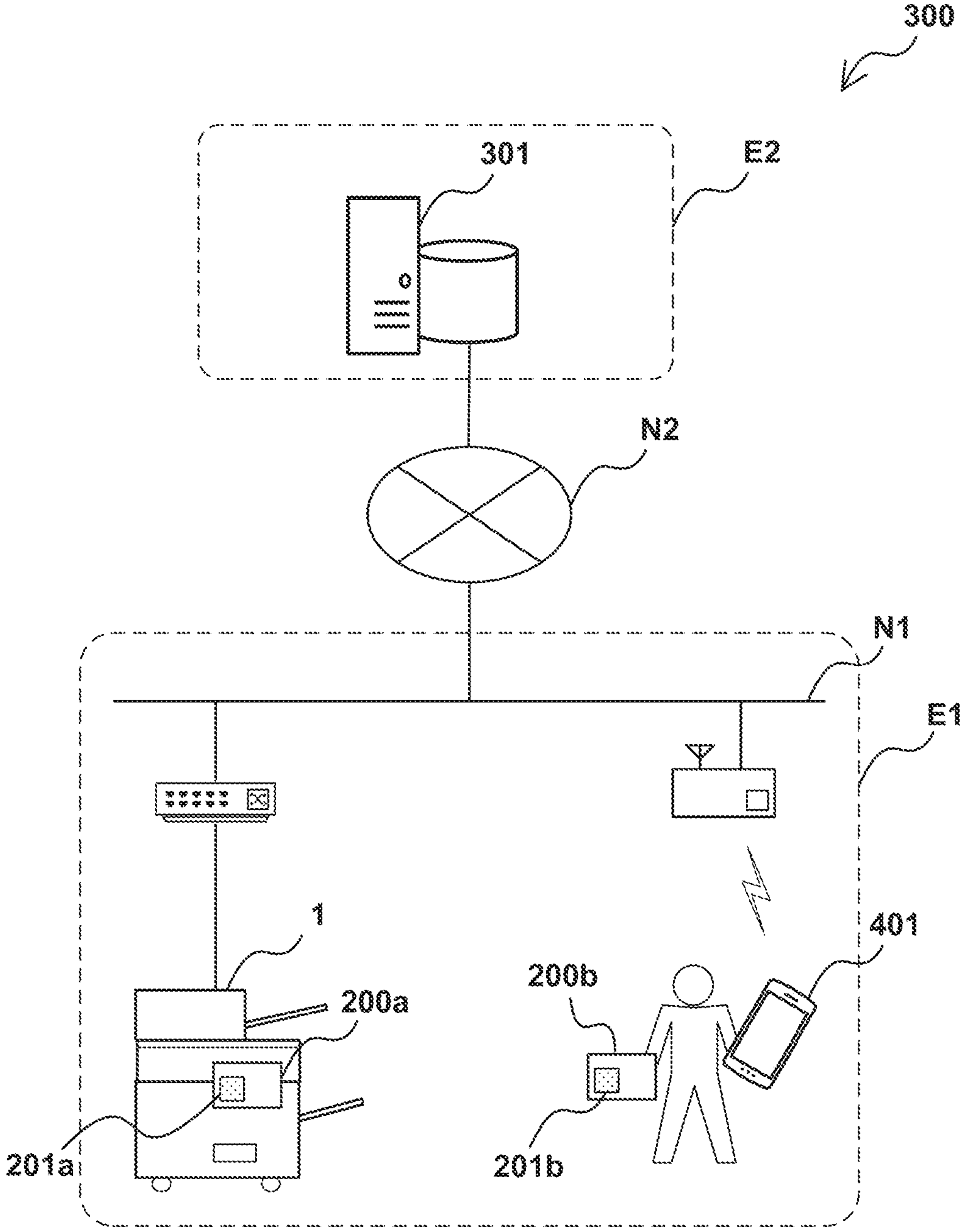
FIG. 4 is a schematic diagram illustrating an example of the configuration of a device management system according to the first embodiment.

FIG. 4 is a schematic diagram illustrating an example of the configuration of a device management system 300 according to the first embodiment. Referring to FIG. 4, the device management system 300 includes the image-forming apparatus 1, a management server 301, and a user terminal 401.

The image-forming apparatus 1 is installed in a user environment E1 in which a user is present. The user terminal 401 is also present in the user environment E1 and is owned by a user. The image-forming apparatus 1 and the user terminal 401 are connected to a local network N1, which can be a local area network (LAN), for example. The management server 301 is installed in a remote environment E2. The remote environment E2 is connected to the local network N1 via an external network N2. The external network N2 may be the Internet or a virtual private network (VPN), for example. Each of the local network N1 and the external network N2 may include any number of network devices of any type, such as routers, switches, gateways, wireless access points, and base stations.

The user uses the image-forming apparatus 1 in the user environment E1. As described above, the image-forming apparatus 1 forms an image on a recording medium by consuming toner, which serves as a consumable agent. When the toner in the process cartridge (a cartridge 200*a*) inserted in the image-forming apparatus 1 is depleted, the user extracts the old cartridge 200*a* from the image-forming apparatus 1 and inserts a new process cartridge (a cartridge 200*b*) into the image-forming apparatus 1. The management server 301 is responsible for: avoiding situations where the image-forming apparatus 1 cannot be used because there is no new cartridge in the user environment E1 when the toner is depleted; and preventing the use of unauthorized cartridges.

The management server 301 is a server apparatus for managing the use of the cartridge 200 in the image-forming apparatus 1. The management server 301 may be an apparatus for centrally managing how a plurality of users use their respective image-forming apparatuses and cartridges. The management server 301 may be implemented as an application server, a database server, or a cloud server, for example, using a high-performance general-purpose computer. The user terminal 401 is a terminal apparatus that provides the user with a user interface for supporting the cartridge management function of the management server 301. The user terminal 401 may be a general-purpose terminal apparatus such as a smartphone, a mobile phone, a personal computer (PC), or a personal digital assistant (PDA). The image-forming apparatus 1 may also provide a user interface to the user.

Note that the functions of the management server 301, which will be described in detail below, may be provided by a single apparatus, or may be provided by a plurality of physically separate apparatuses interacting with each other. A part of a database, which is described as being held by the management server 301, may be held by an apparatus separate from the management server 301 (e.g., another database server).

In the present embodiment, each cartridge 200 is provided with a specific code that uniquely identifies that cartridge 200. FIG. 4 illustrates a code 201*a* that is specific to the cartridge 200*a* and a code 201*b* that is specific to the cartridge 200*b* (these will be collectively referred to as a "code 201" of the cartridge 200). The code 201 may be referred to as a manufacturing number, a serial number, a cartridge identifier, a device identifier, or the like, for example. The code 201 is printed on the surface of the cartridge 200, or on the package of the cartridge 200, in a format that can be read visually by the user or optically by the user terminal 401. The optically-readable format may include a format such as a one-dimensional barcode or a two-dimensional QR code (registered trademark), for example. The code 201 read by the user or by the user terminal 401 can be sent to the management server 301 and used for cartridge management, which will be described below.

<1-2-2. Example of Configuration of Management Server>

FIG. 5 is a block diagram illustrating an example of the configuration of the management server 301 according to the present embodiment. Referring to FIG. 5, the management server 301 includes a communication interface (UF) 311, a memory 312, a management database (DB) 313, and a processing circuit 314.

The communication OF 311 is an interface for the management server 301 to communicate with other apparatuses. For example, the communication OF 311 communicates with the image-forming apparatus 1 and the user terminal 401 present in the user environment E1. The communication OF 311 may be a wired communication interface or a wireless communication interface.

The memory 312 may include any type of storage medium, including a semiconductor memory such as read only memory (ROM) or random access memory (RAM), an optical disk, or a magnetic disk. The memory 312 may include a non-transitory computer-readable storage medium. The memory 312 stores one or more computer programs executed by the processing circuit 314, as well as a variety of data.

The management DB 313 is constituted by tables for managing the use of the cartridge 200 in one or more image-forming apparatuses under the management of the device management system 300. To be more specific, as illustrated in FIG. 5, the management DB 313 includes an account table 320, an apparatus registration table 330, and a delivery management table 340.

The account table 320 is a table that holds information pertaining to the accounts of users that use cartridges 200 provided by the device management system 300. The account table 320 can include one or more of the following information items, for example:

"User ID"
"Password"
"Name"
"Email Address"
"Address"
"Contract Type"
"Payment Method"

"User ID" is identification information for uniquely identifying each of user accounts. "Password" is used in user authentication when the user logs into the system. "Name" refers to the username of each account. The username can be displayed on the screen after logging in, for example, and used as a destination name during delivery of a cartridge 200. "Address" can be used as a destination during delivery of a cartridge 200. "Email Address" can be used when making various notifications to each user from the system via email. "Contract Type" refers to the type of contract that each user has entered into with the business operator that operates the device management system 300. A provision management unit 360 (described below) can determine when a cartridge 200 should be delivered to each user depending on the contract type of the user. "Payment Method" is information pertaining to the means by which the price of the cartridge 200 provided to each user is paid.

The apparatus registration table 330 is a table that holds information pertaining to the image-forming apparatuses registered in the device management system 300 as apparatuses of the respective users. The apparatus registration table 330 can include one or more of the following information items, for example:

"Owner"
"Apparatus ID"
"Registration Date"
"Status"
"Remaining Amount of Toner"

"Owner" indicates the account of the user who owns or manages the image-forming apparatus by "User ID" registered in the account table 320. "Apparatus ID" is identification information for uniquely identifying each image-forming apparatus. A pair of "Owner" and "Apparatus ID" indicates an association between each user account and at least one image-forming apparatus registered as an apparatus for the user who owns that account. Two or more image-forming apparatuses may be associated with a single user account. "Registration Date" indicates the date on which "Apparatus ID" of each image-forming apparatus was registered in the apparatus registration table 330. "Status" is status information pertaining to verification of whether each image-forming apparatus is actually installed in the user environment of "Owner". When "Apparatus ID" is initially registered, "Status" indicates "Unverified", and "Status" can be changed to "Verified" once the verification is complete. "Remaining Amount of Toner" indicates the latest value of the remaining amount of toner in the cartridge 200 inserted into each image-forming apparatus. "Remaining Amount of Toner" may be blank for an image-forming apparatus 1 in which no cartridge 200 has been inserted or a cartridge 200 has been extracted, for example.

The delivery management table 340 is a table that holds information pertaining to process cartridges that have been sent to the respective users. The delivery management table 340 can include one or more of the following information items, for example:

"Subscriber"
"Cartridge ID"
"Shipping Date"
"Status"
"Usage Start Date"

"Subscriber" indicates the account of the user to whom each cartridge is provided by "User ID" registered in the account table 320. "Cartridge ID" is identification information for uniquely identifying each cartridge. A pair of "Subscriber" and "Cartridge ID" indicates an association between each user account and at least one cartridge provided to the user who owns that account. Because cartridges are sequentially replaced for each user to continue using the image-forming apparatus 1, the number of cartridges associated with one user account in the delivery management table 340 increases over time. "Shipping Date" indicates the date on which each cartridge was shipped to "Subscriber". "Status" is status information pertaining to the use of each cartridge. For example, "Status" indicates "Unused" at the time of shipment. Once the cartridge arrives in the user environment and is inserted into the apparatus after completing authentication, "Status" can be changed to "Usage Started". "Usage Start Date" indicates the date on which the use of each cartridge started. Note that instead of the apparatus registration table 330, the delivery management table 340 may include the data item "Remaining Amount of Toner" described above. In this case, the apparatus registration table 330 may include a data item that holds a cartridge ID of a cartridge currently inserted into each image-forming apparatus. For a cartridge of which remaining amount of toner has reached zero or is less than a threshold, or which has been used a number of times that exceeds its life span, "Status" may be changed to "Used".

The processing circuit 314 may include a central processing unit (CPU), for example, and provides various functions of the management server 301 by executing computer programs stored in the memory 312. More specifically, as illustrated in FIG. 5, the processing circuit 314 can function as a data management unit 350, the provision management unit 360, and an authentication unit 370.

The data management unit 350 manages the registration and updating of data in the management DB 313. The data management unit 350 may cause the user terminal 401 to display a screen for accepting the input of account information to be registered in the account table 320, receive the input account information through the communication OF 311, and register the input account information in the account table 320. Similarly, the data management unit 350 may cause the user terminal 401 to display a screen for accepting the input of apparatus information for the image-forming apparatus possessed by each user, receive the input apparatus information through the communication OF 311, and register the input apparatus information in the apparatus registration table 330. These input screens may be provided in any format, such as, for example, a web page, an input form, or an application screen. Typically, the input of the apparatus information may be accepted during a period after user authentication using the user ID and password stored in the account table 320 succeeded and in which the user is logged into the system.

For example, in the present embodiment, the data management unit 350 may perform a simple verification for the apparatus information registered in the apparatus registration table 330, as to whether the apparatus is actually installed in the user environment of the corresponding user. Specifically, when the user logs in to the system and inputs the apparatus information of the image-forming apparatus 1 into the input screen, the data management unit 350 presents a message to the user prompting a predetermined operation to be performed in the image-forming apparatus 1. The predetermined operation may be, for example, pressing a particular physical button of the image-forming apparatus 1 or touching a button on a graphical user interface (GUI). The message presented to the user may include content that prompts the user to turn on the power of the image-forming apparatus 1 (in case the power of the image-forming apparatus 1 is off). When the user performs the prompted operation in the image-forming apparatus 1, the image-forming apparatus 1 sends the apparatus ID that identifies that apparatus itself to the management server 301. The data management unit 350 stands by to receive the apparatus ID from the image-forming apparatus 1 until a predetermined period of time has passed following the presentation of the aforementioned message. Then, if the same apparatus ID as the apparatus ID input by the user has been received from the image-forming apparatus 1 prior to a timeout, the data management unit 350 determines that the image-forming apparatus 1 identified by that apparatus ID is actually installed in the user environment. The data management unit 350 sets the value of "Status" in the apparatus registration table 330 to "Unverified" for the apparatus before this verification is complete, and it sets the value of "Status" in the apparatus registration table 330 to "Verified" for the apparatus after this verification is complete.

In the present embodiment, the data management unit 350 also manages the updating of the value of "Remaining Amount of Toner" in the apparatus registration table 330. For example, the data management unit 350 receives, from a registered image-forming apparatus 1, remaining amount information pertaining to the remaining amount of the consumable agent in the cartridge 200 that has been inserted into the apparatus, through the communication OF 311. The data management unit 350 then updates the value of "Remaining Amount of Toner" in the apparatus registration table 330 based on the received remaining amount information.

The provision management unit 360 manages provision of cartridges 200 to users of the device management system 300. For example, the provision management unit 360 monitors occurrence of a trigger event that triggers provision of a cartridge 200 to a user.

An example of a trigger event may be a user purchasing a cartridge 200. The provision management unit 360 may start providing the cartridge 200 to the user who is the purchaser when, for example, an order for the cartridge 200 is accepted through a website on the Internet (i.e., when an individual contract is established).

Another example of a trigger event is the arrival of a provision timing based on a contract with a user. For example, a user may have a regular purchase agreement with a business operator to regularly (e.g., once a month or once every several months) purchase a certain number of cartridge(s) 200. The provision management unit 360 may start providing the cartridge(s) 200 to such a user when it is determined that the next provision timing for the cartridge(s) 200 has arrived for that user.

Another example of a trigger event may be a decrease in a remaining amount of toner in an image-forming apparatus 1 registered in the apparatus registration table 330 being detected. For example, a user may have an automatic purchase agreement with a business operator in which the user is automatically provided with a new cartridge 200 when the remaining amount of toner in the image-forming apparatus 1 owned by the user decreases. In this case, the provision management unit 360 may monitor the value of "Remaining Amount of Toner" in the apparatus registration table 330 for the image-forming apparatus 1 registered for the user, and start providing the cartridge 200 to the user when the remaining amount of toner is determined to be below a predetermined threshold. In addition to or instead of this, the trigger event pertaining to the automatic purchase of the cartridge 200 may be a number of times the registered image-forming apparatus 1 has operated (e.g., the number of jobs executed, or the total number of sheets of the recording medium that have been consumed) reaching a threshold. In addition to or instead of this, the trigger event pertaining to the automatic purchase of the cartridge 200 may be the start of usage of a cartridge 200 provided to the user in the past being detected. For example, the provision management unit 360 may monitor "Status" in the delivery management table 340 for the cartridge 200 provided to a user who has entered into an automatic purchase agreement and start providing a new cartridge 200 when the value thereof changes to "Usage Started".

Providing a user with a new cartridge 200 regularly or automatically in response to such a trigger event being detected makes it possible to reduce the likelihood of the image-forming apparatus 1 becoming unusable when the consumable agent is depleted at an unexpected timing for the user.

The provision management unit 360 can determine which events, among the trigger events described above, to monitor for each user based on the content of "Contract Type" in the account table 320. When a trigger event is determined to have occurred for a user, the provision management unit 360 assigns a new cartridge 200 to that user and sends a message to a delivery person instructing the assigned cartridge 200 to be delivered. In addition, the provision management unit 360 adds a new record to the delivery management table 340 indicating the user ID of the user to whom the cartridge is to be delivered and the cartridge ID of the assigned cartridge 200, and it registers the association between the user account and the cartridge 200 in the management DB 313. "Shipping Date" in the delivery management table 340 can be set to the day on which the cartridge 200 is shipped, and "Status" and "Usage Start Date" can be set to "Unused" and blank, respectively, as initial values.

In addition to user authentication (e.g., password authentication) when the user logs in to the system, the authentication unit 370 performs authentication for permitting the use of the individual cartridges 200 in the image-forming apparatus 1. In the present embodiment, this authentication is performed before each cartridge 200 is inserted into the image-forming apparatus 1, and it will therefore be called "pre-insertion authentication". The pre-insertion authentication may include, for example, a determination as to whether the cartridge 200 can be permitted to be used, such as whether the cartridge 200 has been provided to the user through a legitimate route. As described with reference to FIG. 4, in the present embodiment, a specific code 201 that uniquely identifies each cartridge 200 is provided to that cartridge 200. The code 201 is printed on, for example, each cartridge 200 or on the package thereof, in a format that can be read by the user or by the user terminal 401. The authentication unit 370 receives the code of the cartridge 200 that is to be used from code obtaining means present in the user environment E1, and it performs pre-insertion authentication based on the received code. Several examples of how the code of the cartridge 200 is obtained in the user environment E1 will be given below.

As an example, the code 201 may be equivalent to the cartridge ID of each cartridge 200, in which case the authentication unit 370 can use the received code as-is for the pre-insertion authentication. As another example, the code 201 may be generated by encoding the cartridge ID of each cartridge 200, in which case the authentication unit 370 can use the cartridge ID, which is derived by decoding the code 201, for the pre-insertion authentication.

The pre-insertion authentication may include a determination as to whether the cartridge 200 identified based on the code 201 has correspondence with the user account of the logged-in user. For example, the authentication unit 370 checks whether an association between the cartridge ID based on the code 201 and the user ID of the logged-in user is registered in the delivery management table 340. If this association is registered in the delivery management table 340, the authentication unit 370 can determine that the cartridge 200 to be used has correspondence with the user account of a legitimate user. Verifying the correspondence between the cartridge 200 and the user account in this manner makes it possible to prevent a cartridge 200 obtained without a contract from being used.

In addition to or instead of this, the pre-insertion authentication may include a determination as to whether the image-forming apparatus 1 into which the cartridge 200 is to be inserted has correspondence with the user account of the logged-in user. For example, the authentication unit 370 presents a message to the user who attempts to use the cartridge 200, prompting the user to perform a predetermined operation in the image-forming apparatus 1 into which the cartridge is to be inserted. Here, too, the predetermined operation may be, for example, pressing a particular physical button of the image-forming apparatus 1 or touching a button on a GUI. When the user performs the prompted operation in the image-forming apparatus 1, the image-forming apparatus 1 sends the apparatus ID that identifies that apparatus itself to the management server 301. The authentication unit 370 stands by to receive the apparatus ID from the image-forming apparatus 1 until a predetermined period of time has passed following the presentation of the aforementioned message. Then, the authentication unit 370 checks whether an association between the apparatus ID received from the image-forming apparatus 1 prior to a timeout and the user ID of the logged-in user is registered in the apparatus registration table 330. If such an association is registered in the apparatus registration table 330, the authentication unit 370 can determine that the image-forming apparatus 1 into which the cartridge is to be inserted has correspondence with the user account of the logged-in user. Taking the insertion target apparatus having been registered as the user's apparatus as a condition for the authentication to succeed in this manner makes it possible to facilitate registration of apparatus information in the database. In addition, by receiving the apparatus ID from the image-forming apparatus 1, the management server 301 can reliably recognize the insertion target apparatus into which the user is attempting to insert the cartridge 200, and it can send control commands to that apparatus thereafter.

The authentication unit 370 may receive the remaining amount information indicating the latest remaining amount of toner along with the apparatus ID from the image-forming apparatus 1 in response to the aforementioned predetermined operation. Then, the authentication unit 370 may reject the replacement of the cartridge 200 in the image-forming apparatus 1 if the received remaining amount information indicates that a sufficient amount of toner remains. This makes it possible to prevent the cartridge 200 being used from being extracted from the image-forming apparatus 1 and discarded despite toner remaining therein.

In addition to or instead of this, the pre-insertion authentication may include a determination as to whether the cartridge 200 identified based on the code 201 is unused (or is not used) based on the value of "Status" in the delivery management table 340. For example, the authentication unit 370 can refer to the record of the cartridge ID based on the code 201 in the delivery management table 340 and permit the cartridge 200 to be used if the value of "Status" is "Unused". On the other hand, the authentication unit 370 can reject the usage of the cartridge 200 if the value of "Status" in the referenced record is not "Unused".

In addition to or instead of this, the pre-insertion authentication may include a determination as to whether the cartridge 200 identified based on the code 201 is a legitimate genuine product. Here, "genuine product" refers to a product that conforms to the terms of the contract that the user has entered into with the business operator. For example, if the user has entered into a regular purchase agreement (also called a "subscription agreement"), a product provided to the user based on the regular purchase agreement can be a genuine product. To determine whether a product is genuine, the apparatus registration table 330 may include a model number for each image-forming apparatus, and the delivery management table 340 may include a model number for each cartridge, as additional data items. Additionally, the management DB 313 may include an additional table indicating model numbers of one or more cartridges that match for each image-forming apparatus model number. In this case, the authentication unit 370 may permit a cartridge 200 to be used only when respective model numbers of the insertion target apparatus and the cartridge 200 are determined to be compatible with each other.

As described above, at least one of the image-forming apparatus 1 and the cartridge 200 includes an inhibiting mechanism capable of inhibiting the insertion of the cartridge 200 into the image-forming apparatus 1. This inhibiting mechanism is kept in a locked state unless at least the above-described pre-insertion authentication is successful in a situation where no cartridge 200 is present in the image-forming apparatus 1. When the pre-insertion authentication is successful, the authentication unit 370 causes the image-forming apparatus 1 to switch the state of the inhibiting mechanism from the locked state to the unlocked state by sending a result of the successful authentication (or the unlock command) to the image-forming apparatus 1 through the communication OF 311. The unlock command to the image-forming apparatus 1 may be sent directly from the management server 301 to the image-forming apparatus 1. Alternatively, the user terminal 401 that has received the result indicating the successful authentication from the management server 301 may send the unlock command to the image-forming apparatus 1. When the pre-insertion authentication fails due to any of the above-described conditions not being met, the authentication unit 370 sends a result indicating the failed authentication to the image-forming apparatus 1 or the user terminal 401 through the communication OF 311. The authentication unit 370 may cause a message indicating the cause of the failed authentication (e.g., an unauthorized cartridge, an unregistered apparatus, or a used cartridge) to be displayed on the screen of any of the apparatuses.

When the inhibiting mechanism is unlocked based on the authentication result and a new cartridge 200 is inserted into the image-forming apparatus 1 by the user (after the old cartridge 200 has been extracted), it is enabled to supply toner to the image-forming apparatus 1 from the new cartridge 200. As will be described below, the image-forming apparatus 1 detects the remaining amount of toner and sends the remaining amount information to the management server 301. The data management unit 350 receives this remaining amount information through the communication OF 311 and updates the value of "Remaining Amount of Toner" in the apparatus registration table 330. The data management unit 350 also changes "Status" for the new cartridge 200 in the delivery management table 340 to "Usage Started". As a result, the provision management unit 360 can become capable of assigning further cartridges 200 to the user.

Figure 6:
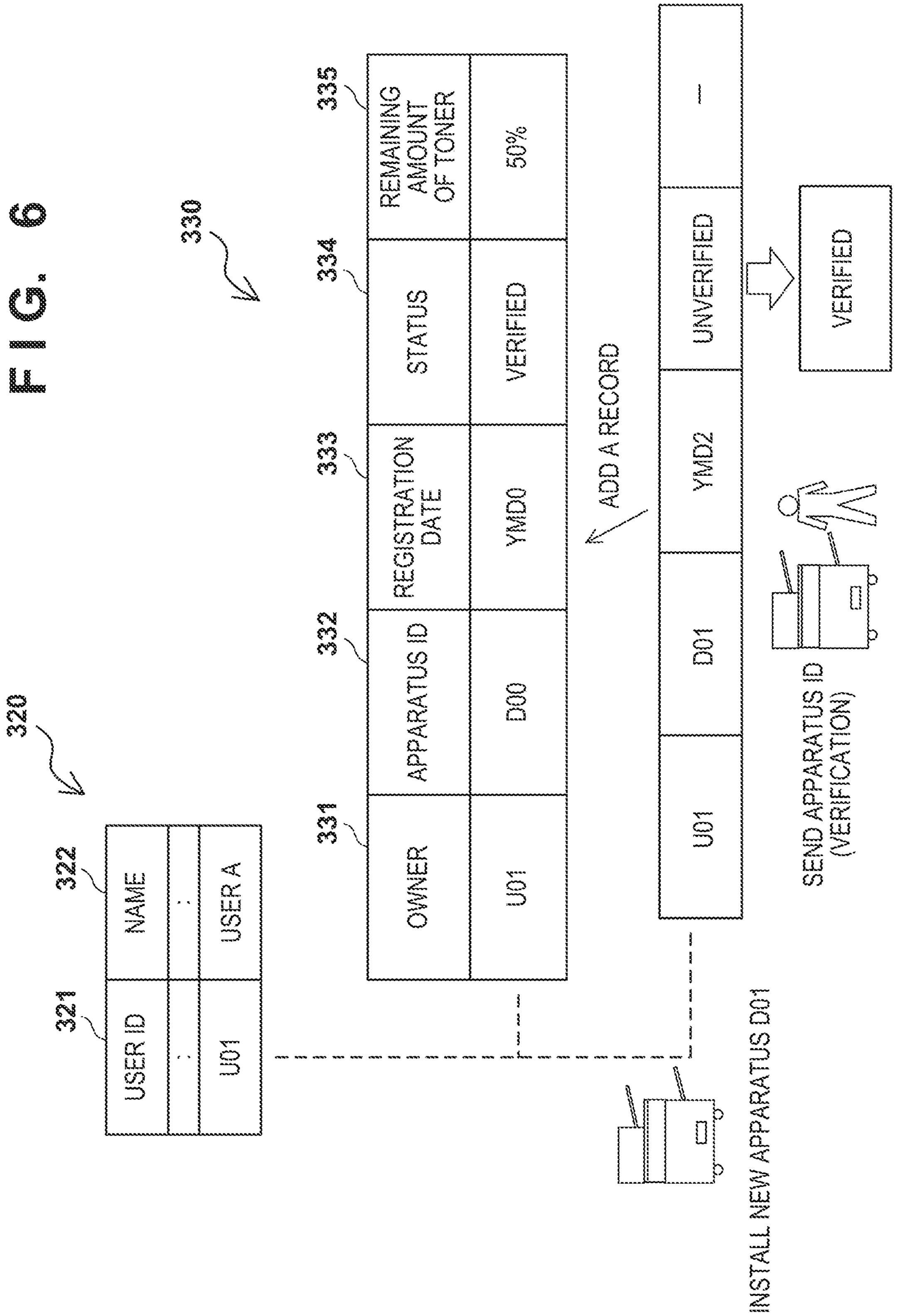
FIG. 6 is an explanatory diagram illustrating an example of updating a database when registering a device.

Updating of the content of the management DB 313 according to a typical flow of processing will be described hereinafter with reference to FIGS. 6 and 7. FIG. 6 illustrates an example of the updating of the apparatus registration table 330 when an apparatus is registered. The account table 320 having User ID 321 and Name 322 as data items is illustrated in the upper part of FIG. 6. Other data items in the account table 320 are not illustrated. The apparatus registration table 330 having Owner 331, Apparatus ID 332, Registration Date 333, Status 334, and Remaining Amount of Toner 335 as data items is illustrated in the middle part of FIG. 6. In the example in FIG. 6, the account of a user identified by a user ID "U01" (called a "user U01" hereinafter) is already registered in the account table 320. Meanwhile, an image-forming apparatus identified by an apparatus ID "D00" is already registered in the apparatus registration table 330 as the apparatus of the user U01.

The user U01 newly installs an image-forming apparatus identified by an apparatus ID "D01" (called an "apparatus D01" hereinafter) in the user environment E1. When the user U01 inputs the apparatus information of the apparatus D01 through the input screen provided by the management server 301, the management server 301 adds a record for the apparatus information of the apparatus D01 to the apparatus registration table 330. In the added record, Owner 331 is "U01", Apparatus ID 332 is "D01", Registration Date 333 is the date of registration, Status 334 is "Unverified", and Remaining Amount of Toner 335 is blank.

Furthermore, the user U01 performs an operation for registering the apparatus in the newly-installed apparatus D01 in accordance with a message displayed on the screen, for example. The apparatus D01 has the apparatus ID "D01" of that apparatus itself stored in advance, and sends the apparatus information including the apparatus ID to the management server 301 in response to the operation by the user. If the apparatus ID received in this manner matches the apparatus ID input by the user U01, the data management unit 350 changes the value of Status 334 of the record added to the apparatus registration table 330 from "Unverified" to "Verified", as illustrated in the lower part of FIG. 6.

Figure 7:
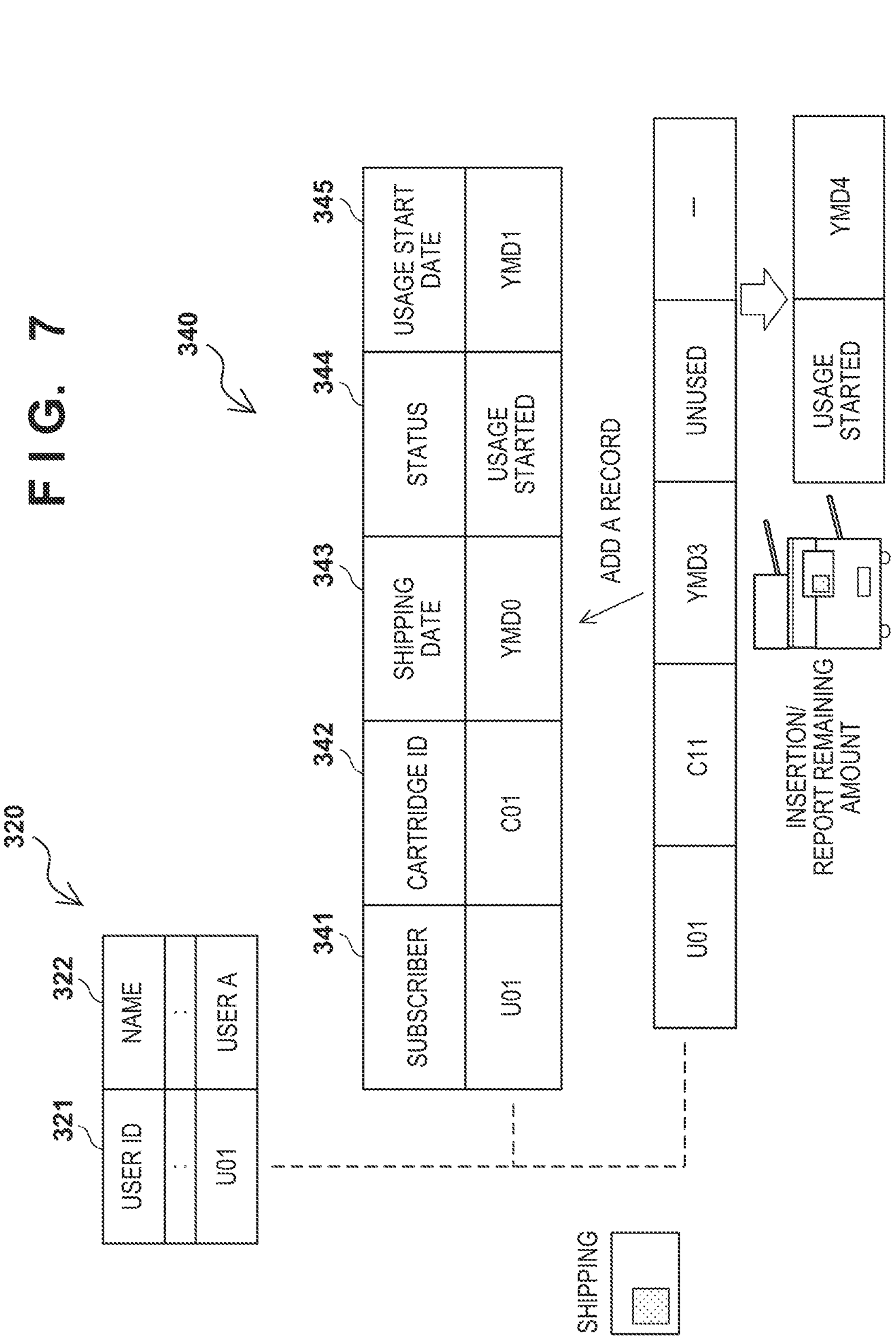
FIG. 7 is an explanatory diagram illustrating an example of updating a database when delivering a device.

FIG. 7 illustrates an example of the updating of the delivery management table 340 when a device is delivered. The upper part of FIG. 7 illustrates the content of the account table 320, which is similar to that illustrated in FIG. 6. The delivery management table 340, which has data items of Subscriber 341, Cartridge ID 342, Shipping Date 343, Status 344, and Usage Start Date 345, is illustrated in the middle part of FIG. 7. In the example in FIG. 7, the cartridge identified by a cartridge ID "C01" has already been provided to the user U01, and the cartridge has already been authenticated and started to be used.

In response to one of the trigger events described above being detected, the provision management unit 360 newly assigns a cartridge identified by a cartridge ID "C11" (called a "cartridge C11" hereinafter) to the user U01. In addition, the provision management unit 360 adds a record for managing the status of the assigned cartridge C11 to the delivery management table 340. In the added record, Subscriber 341 is "U01", Cartridge ID 342 is "C11", Shipping Date 343 is the date of shipment, Status 344 is "Unused", and Usage Start Date 345 is blank.

When the authentication by the authentication unit 370 is successful and the cartridge C11 is inserted into the image-forming apparatus 1, the image-forming apparatus 1 reports to the management server 301 that the remaining amount of toner has increased. Based on the authentication being successful or the report of the increase in the remaining amount of toner, the data management unit 350 changes the value of Status 344 of the record added to the delivery management table 340 from "Unused" to "Usage Started", and it adds the date of that day to Usage Start Date 345.

<1-2-3. Example of Configuration of User Terminal>

Figure 8:
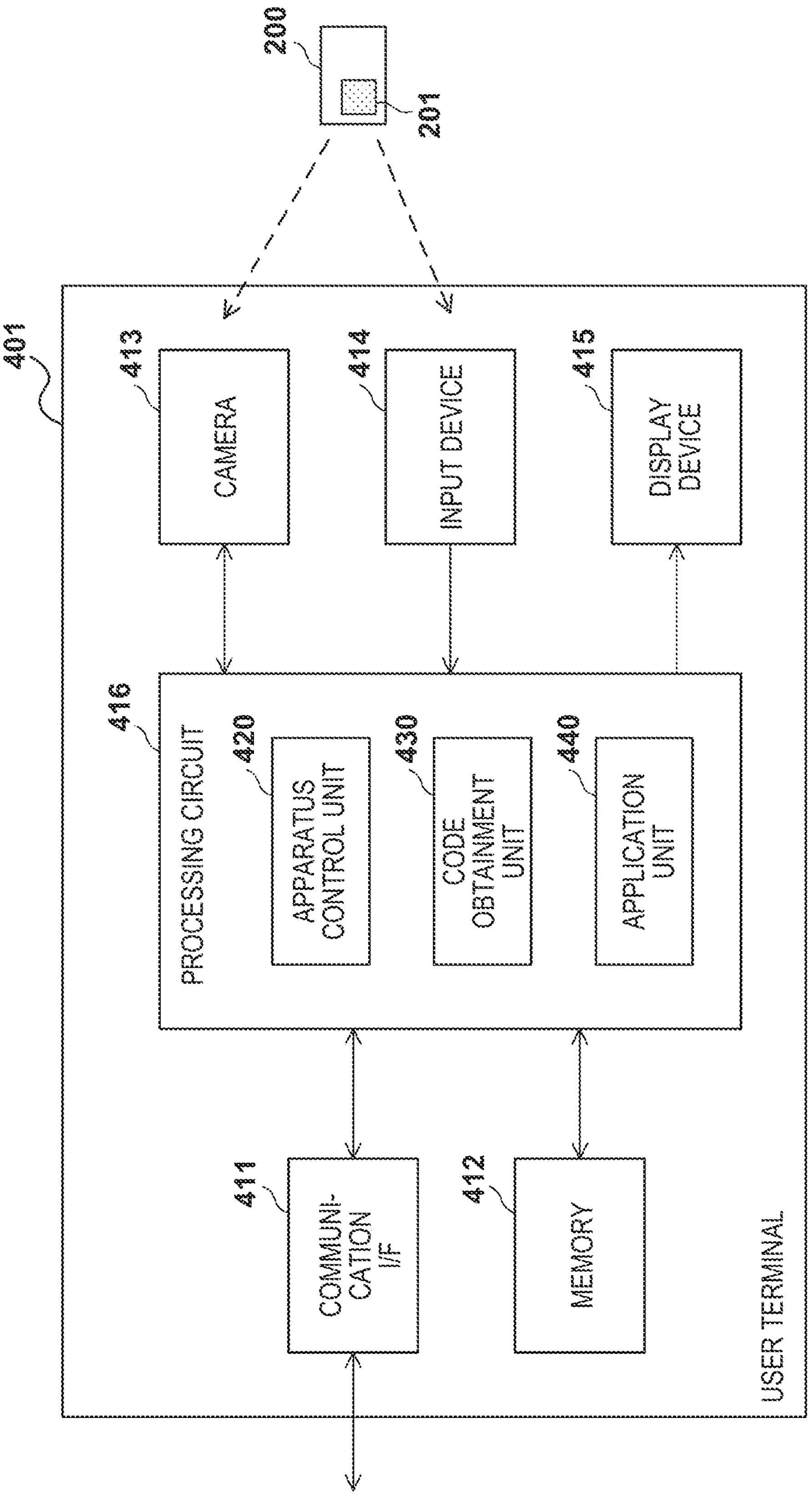
FIG. 8 is a block diagram illustrating an example of the configuration of a user terminal according to the first embodiment.

FIG. 8 is a block diagram illustrating an example of the configuration of the user terminal 401 according to the present embodiment. Referring to FIG. 8, the user terminal 401 includes a communication I/F 411, a memory 412, a camera 413, an input device 414, a display device 415, and a processing circuit 416.

The communication OF 411 is an interface for the user terminal 401 to communicate with other apparatuses. For example, the communication OF 411 communicates with the image-forming apparatus 1 present in the user environment E1 and the management server 301 present in the remote environment E2. The communication OF 411 may be a wired communication interface or a wireless communication interface. If the communication OF 411 is a wireless communication interface, the communication OF 411 may be, for example, a WLAN interface that communicates with a WLAN access point or a cellular communication interface that communicates with a cellular base station. Although only a single communication I/F 411 is illustrated in FIG. 8, the user terminal 401 may include a plurality of different communication modules for communicating with the image-forming apparatus 1 and the management server 301, respectively. The communication between the user terminal 401 and the image-forming apparatus 1 may be performed using a communication protocol for connecting peripheral devices, such as Bluetooth (registered trademark) or universal serial bus (USB), for example.

The memory 412 may include any type of storage medium, including a semiconductor memory such as a ROM or a RAM, an optical disk, or a magnetic disk. The memory 412 may include a non-transitory computer-readable storage medium. The memory 412 stores one or more computer programs executed by the processing circuit 416, as well as a variety of data.

The camera 413 is a module capable of capturing images or video of a subject. In an example described below, the camera 413 is used to optically read the code 201 specific to the cartridge 200.

The input device 414 is used as a user interface for accepting user operations and information inputs. The input device 414 can include one or more of, for example, a touch sensor, a keypad, a keyboard, a pointing device, and a microphone. In an example described below, the code 201 specific to the cartridge 200 is input by the user through the input device 414.

The display device 415 is used to display images and information. The display device 415 may be constituted by, for example, a liquid crystal display (LCD) or organic light-emitting diodes (OLED).

The processing circuit 416 may include a CPU, for example, and provides various functions of the user terminal 401 by executing computer programs stored in the memory 412. More specifically, as illustrated in FIG. 8, the processing circuit 416 can function as an apparatus control unit 420, a code obtainment unit 430, and an application unit 440. Although only the functions related to managing the use of the cartridge 200 in the image-forming apparatus 1 are mainly described here, the processing circuit 416 may also provide the user with a variety of other functions that a user terminal generally includes.

The apparatus control unit 420 controls image forming and other operations performed by the image-forming apparatus 1. The apparatus control unit 420 may include driver software for the image-forming apparatus 1. For example, the apparatus control unit 420 detects one or more apparatuses that can be used by the user terminal 401 present in the user environment E1, and presents a list of the detected apparatuses to the user on the screen of the display device 415. The apparatus control unit 420 may obtain statuses of each apparatus (e.g., power on/off, the remaining amount of toner, and the like) and present the obtained statuses to the user. When an image-forming apparatus 1 is selected by the user and printing is instructed, the apparatus control unit 420 sends a print job including image data of an image to be printed to the image-forming apparatus 1 to cause the image-forming apparatus 1 to print the image.

The code obtainment unit 430 obtains the code 201 specific to the cartridge 200 that the user attempts to insert into the image-forming apparatus 1. As an example, the code obtainment unit 430 may optically read the code 201 using the camera 413 if the code 201 is an optically-readable code printed on the cartridge 200 or a package thereof (e.g., a wrapper, a piece of paper included therein, or the like). As another example, if the code 201 is a code that can be read by a human (e.g., visually), the code obtainment unit 430 may allow the user to input the code 201 using the input device 414 and obtain the input code 201.

The application unit 440 can be an application for device management that runs in cooperation with the management server 301. The application unit 440 may be a web browser. For example, the application unit 440 causes an account information input screen to be displayed in the display device 415 in a case where a user account is newly registered, and in a case where there is a change in it. When the account information is input in the account information input screen, the application unit 440 sends the accepted account information to the management server 301 through the communication I/F 411. The application unit 440 also causes the display device 415 to display an apparatus information input screen in a case where the image-forming apparatus 1 is installed in the user environment E1. When the apparatus information is input in the apparatus information input screen, the application unit 440 sends the accepted apparatus information to the management server 301 through the communication I/F 411.

The application unit 440 may also provide a user interface for requesting the management server 301 to perform the pre-insertion authentication to a user who wishes to insert a new cartridge into, or replace the cartridge in, the image-forming apparatus 1. For example, when the user operates a button for making an authentication request, the application unit 440 activates the code obtainment unit 430 and causes it to obtain the code specific to the cartridge 200, and it sends the obtained code 201 to the management server 301 through the communication OF 411. The application unit 440 may send the code 201 to the management server 301 as part of a request for permission to use the cartridge 200. Alternatively, the application unit 440 may send the code 201 to the management server 301 as part of a request to unlock the inhibiting mechanism.

In an example, the application unit 440 may send a sending request to the image-forming apparatus 1 for sending the apparatus ID required for pre-insertion authentication by the management server 301 to the management server 301. In another example, the application unit 440 may cause the display device 415 to display a message prompting the user to perform an operation in the image-forming apparatus 1 for sending the apparatus ID.

When the pre-insertion authentication is performed by the management server 301 based on the code 201 specific to the cartridge 200, the application unit 440 receives the result of the pre-insertion authentication from the management server 301. If the authentication result indicates that the pre-insertion authentication is successful, the application unit 440 may cause the apparatus control unit 420 to send an unlock command to the image-forming apparatus 1 to unlock the inhibiting mechanism. Note that if these commands are sent directly to the image-forming apparatus 1 from the management server 301, the user terminal 401 need not send the commands to the image-forming apparatus 1.

The application unit 440 causes the display device 415 to display the result of the pre-insertion authentication received from the management server 301. If the result of the pre-insertion authentication indicates that the authentication is successful, the user can insert the new cartridge 200 into the image-forming apparatus 1 (e.g., after he or she opened the front cover 20 and extracted the old cartridge 200 as necessary). At this time, the image-forming apparatus 1 has unlocked the inhibiting mechanism, and thus the operation for inserting the cartridge 200 is not inhibited. If the result of the pre-insertion authentication indicates that the authentication has failed, the user retries the pre-insertion authentication after taking appropriate measures, or gives up on inserting the new cartridge 200 for the time being, depending on the cause of the failure, which can be displayed on the screen. At this time, the inhibiting mechanism can be kept in the locked state by the image-forming apparatus 1.

<1-2-4. Example of Configuration of Image-Forming Apparatus>

Figure 9:
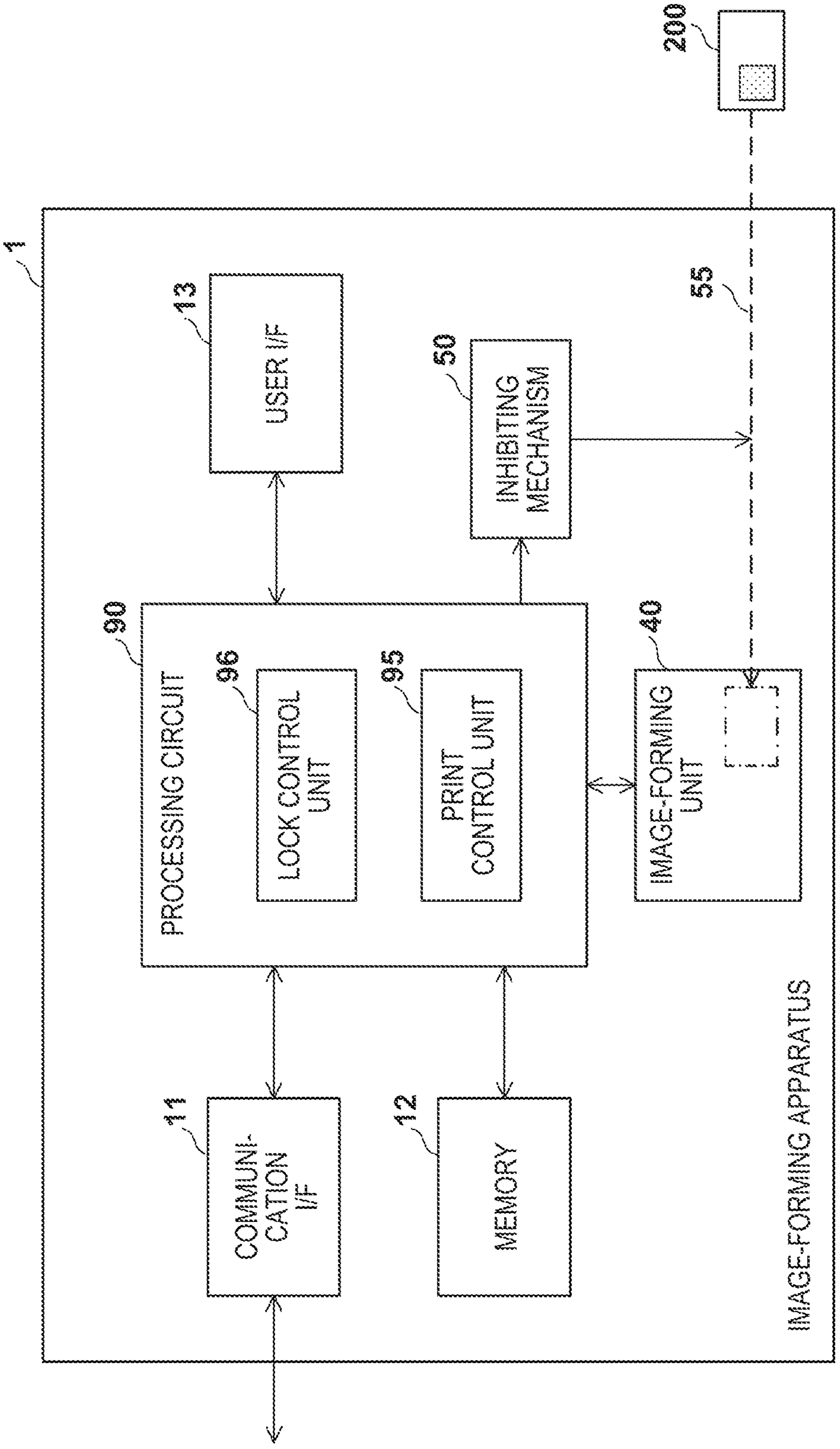
FIG. 9 is a block diagram illustrating an example of the functional configuration of the image-forming apparatus according to the first embodiment.

FIG. 9 is a block diagram illustrating an example of the functional configuration of the image-forming apparatus 1 according to the present embodiment. Referring to FIG. 9, the image-forming apparatus 1 includes a communication OF 11, a memory 12, a user I/F 13, the image-forming unit 40, the inhibiting mechanism 50, and the processing circuit 90.

The communication OF 11 is an interface for the image-forming apparatus 1 to communicate with other apparatuses. For example, the communication OF 11 communicates with the user terminal 401 present in the user environment E1 and the management server 301 present in the remote environment E2. The communication OF 11 may be a wired communication interface or a wireless communication interface. If the communication OF 11 is a wireless communication interface, the communication OF 11 may be, for example, a WLAN interface or a cellular communication interface. Although only a single communication OF 11 is illustrated in FIG. 9, the image-forming apparatus 1 may include a plurality of different communication modules for communicating with the user terminal 401 and the management server 301, respectively.

The memory 12 may include any type of storage medium, including a semiconductor memory such as a ROM or a RAM, an optical disk, or a magnetic disk. The memory 12 may include a non-transitory computer-readable storage medium. The memory 12 stores one or more computer programs executed by the processing circuit 90, as well as a variety of data. The memory 12 stores, in advance, the apparatus ID (also called "apparatus identification information") that uniquely identifies the image-forming apparatus 1, for example.

The user I/F 13 can include an input device for accepting user operations and information inputs, and a display device for displaying images and information. For example, the user I/F 13 can include one or more of a touch panel, a keypad, buttons, switches, a microphone, and a speaker. The user I/F 13 may be treated as an operation terminal integrated into the image-forming apparatus 1. In an example, the user I/F 13 may be used to accept input of the code 201 specific to the cartridge 200.

As described with reference to FIG. 2, the image-forming unit 40 forms an image on a recording medium by consuming toner contained in the cartridge 200 inserted into the image-forming apparatus 1. The image-forming unit 40 may include a cartridge sensor (not shown) that senses the presence of a cartridge. The cartridge sensor outputs, to the processing circuit 90, a sensor signal indicating whether there is a cartridge 200 inserted in a set position.

The inhibiting mechanism 50 is a mechanism capable of inhibiting the insertion of the cartridge 200 into the image-forming apparatus 1. For example, when in the locked state, the inhibiting mechanism 50 blocks an insertion path 55 for inserting the cartridge 200 into the image-forming apparatus 1 or restricts the movement of the cartridge 200 along the insertion path 55. At this time, the cartridge 200 may or may not be inhibited from being extracted from the image-forming apparatus 1. When in the unlocked state, the inhibiting mechanism 50 opens the insertion path 55 or releases the restriction on the movement of the cartridge 200 along the insertion path 55. The pin receiving member 51 and the locking pin 52 (and the solenoid, which is not shown) described with reference to FIG. 2 are examples of elements that constitute the inhibiting mechanism 50.

From a functional perspective, the above-described electronic components 91, 92, and 93 of the processing circuit 90 can function mainly as a print control unit 95 and a lock control unit 96. The print control unit 95 controls operations for image formation performed by the image-forming unit 40. For example, when a print job is received from an external apparatus via the communication OF 11, the print control unit 95 controls the image-forming unit 40 to form an image on a recording medium based on input image data included in the print job.

The lock control unit 96 controls the switching between the locked state and the unlocked state of the inhibiting mechanism 50. For example, when a predetermined input signal is detected, the lock control unit 96 sends the apparatus ID stored in the memory 12 to the management server 301. The apparatus ID sent to the management server 301 may be used to verify whether the image-forming apparatus 1 identified by the apparatus ID specified by the user for apparatus registration is actually installed in the user environment E1 of that user. The apparatus ID sent to the management server 301 may be used for the execution of the pre-insertion authentication by the management server 301. The lock control unit 96 may send the remaining amount information indicating the latest remaining amount of toner to the management server 301 along with the apparatus ID.

In an example, the aforementioned input signal that triggers the sending of the apparatus ID is a received signal (e.g., a sending request requesting the apparatus ID be sent) received from the user terminal 401 via the communication OF 11. In this case, in response to the sending request being received, the lock control unit 96 reads out the apparatus ID from the memory 12 and sends the read-out apparatus ID to the management server 301. In another example, the aforementioned input signal that triggers the sending of the apparatus ID is a user input signal (e.g., an operation signal indicating that a predetermined button has been operated) detected via the user I/F 13. In this case, in response to the user input signal being detected, the lock control unit 96 reads out the apparatus ID from the memory 12 and sends the read-out apparatus ID to the management server 301.

After sending the apparatus ID to the management server 301 for the pre-insertion authentication, the lock control unit 96 waits for the unlock command being received, which is a control signal based on the result of the pre-insertion authentication, over a predetermined standby period. Then, if the unlock command is received before expiry of the standby period, the lock control unit 96 causes the inhibiting mechanism 50 to transition from the locked state to the unlocked state in accordance with the unlock command. For example, the lock control unit 96 may stop energizing the solenoid and disengage the locking pin 52, which has been engaged with the pin receiving member 51, from the pin receiving member 51, and enable the front cover 20 to pivot. This makes it possible for the user to open the front cover 20 and insert the cartridge 200 into the image-forming apparatus 1.

If the standby period expires without the unlock command being received (i.e., in the case of a timeout), the lock control unit 96 stops standing by for the command. For example, the standing-by for the unlock command may be done by temporarily opening a particular receiving port of the communication I/F 11. The risk of unauthorized operation of the image-forming apparatus 1 by a malicious third party can be minimized by standing by for a control signal from the outside only for a limited period of time that is triggered by detection of a predetermined input signal. In addition, power consumed by the image-forming apparatus 1 can be reduced by putting the image-forming apparatus 1 or the communication I/F 11 into a sleep state during periods aside from the standby period.

If the unlock command is received before expiry of the standby period, the lock control unit 96 may keep the inhibiting mechanism 50 in the unlocked state for a predetermined unlocked period following the reception of the command, and cause the inhibiting mechanism 50 to transition back to the locked state after the unlocked period expires.

The print control unit 95 controls the remaining amount detection unit 61 to detect the remaining amount pertaining to the cartridge 200 when, for example, image-forming operations are performed and when the cartridge 200 is inserted. For example, the remaining amount detection unit 61 causes light to be emitted from the light emitter 61*a* and obtains a light detection signal from the light receiver 61*b* while the toner preserved in the preserving unit 48 is being agitated by the agitation member 60. The remaining amount detection unit 61 then estimates the remaining amount of toner based on the obtained light detection signal, and reports the estimated remaining amount of toner to the print control unit 95. The print control unit 95 reports the remaining amount information indicating the remaining amount of toner detected in this manner to the management server 301 via the communication OF 11. The report on the remaining amount of toner may be sent to the management server 301 via the user terminal 401 instead of being sent directly to the management server 301.

When an old cartridge in the image-forming apparatus 1 is replaced with a new cartridge, the remaining amount of toner increases. As described above, detecting an increase in the remaining amount of toner based on the remaining amount information makes it possible for the management server 301 to ascertain that the use of the cartridge 200 for which the pre-insertion authentication was successful has started. Note that instead of the management server 301, the image-forming apparatus 1 or the user terminal 401 may detect the increase in the remaining amount of toner and send a notification signal indicating that a new cartridge 200 has started to be used to the management server 301.

<1-3. Flow of Processing>

Figure 10:
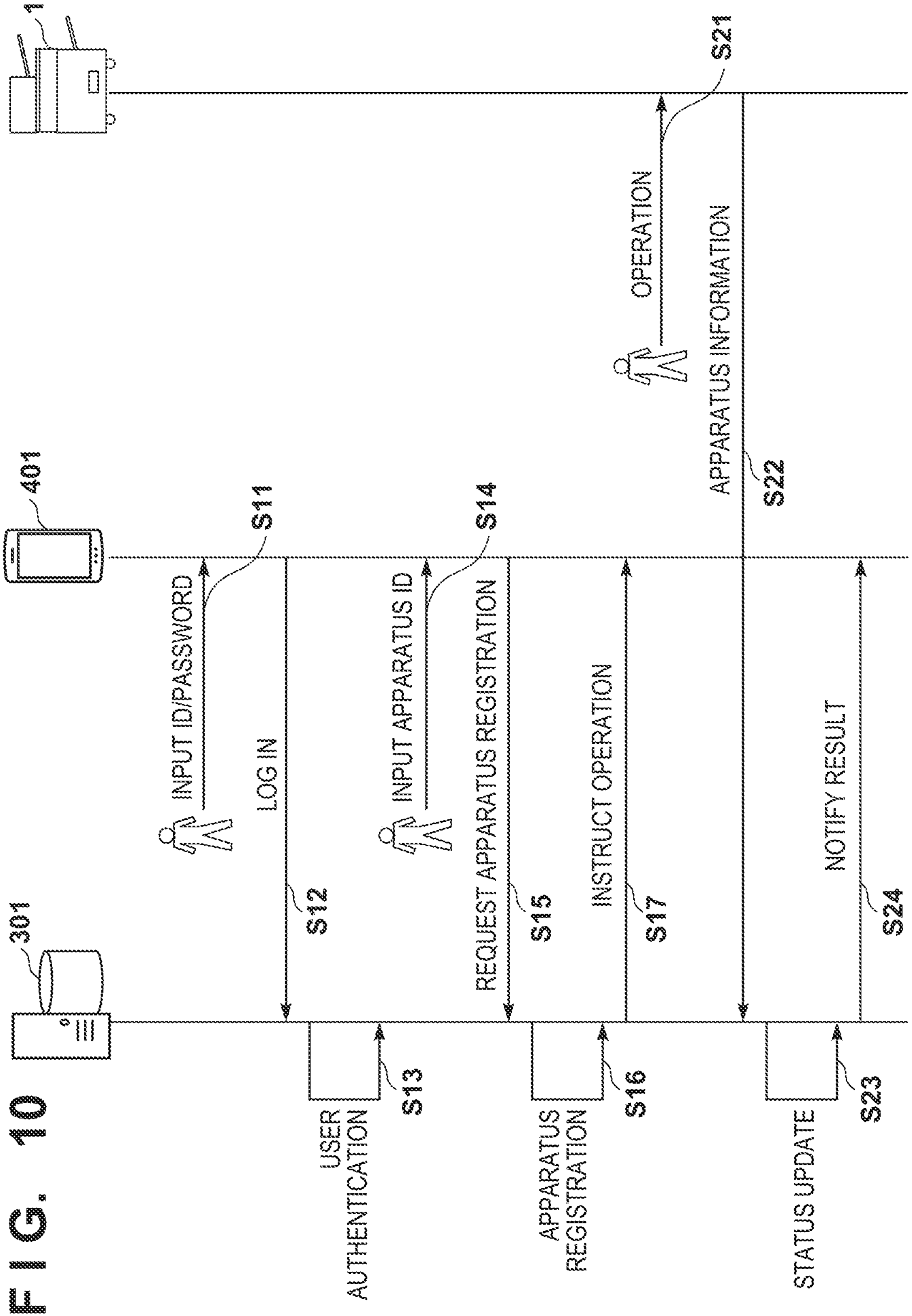
FIG. 10 is a sequence chart illustrating an example of the overall flow of processing related to device registration.
Figure 11:
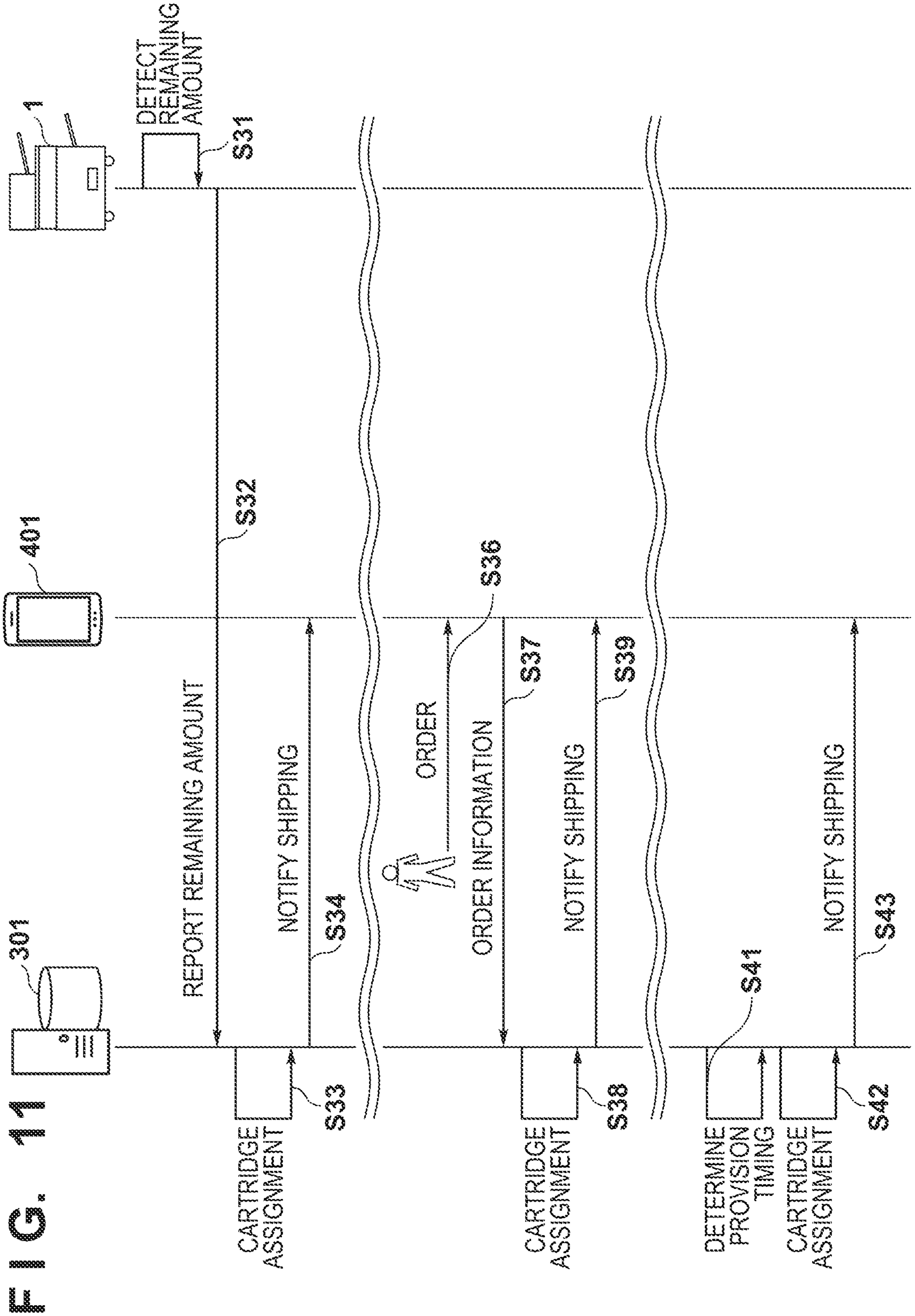
FIG. 11 is a sequence chart illustrating some examples of the overall flow of processing related to providing a cartridge to a user.
Figure 12:
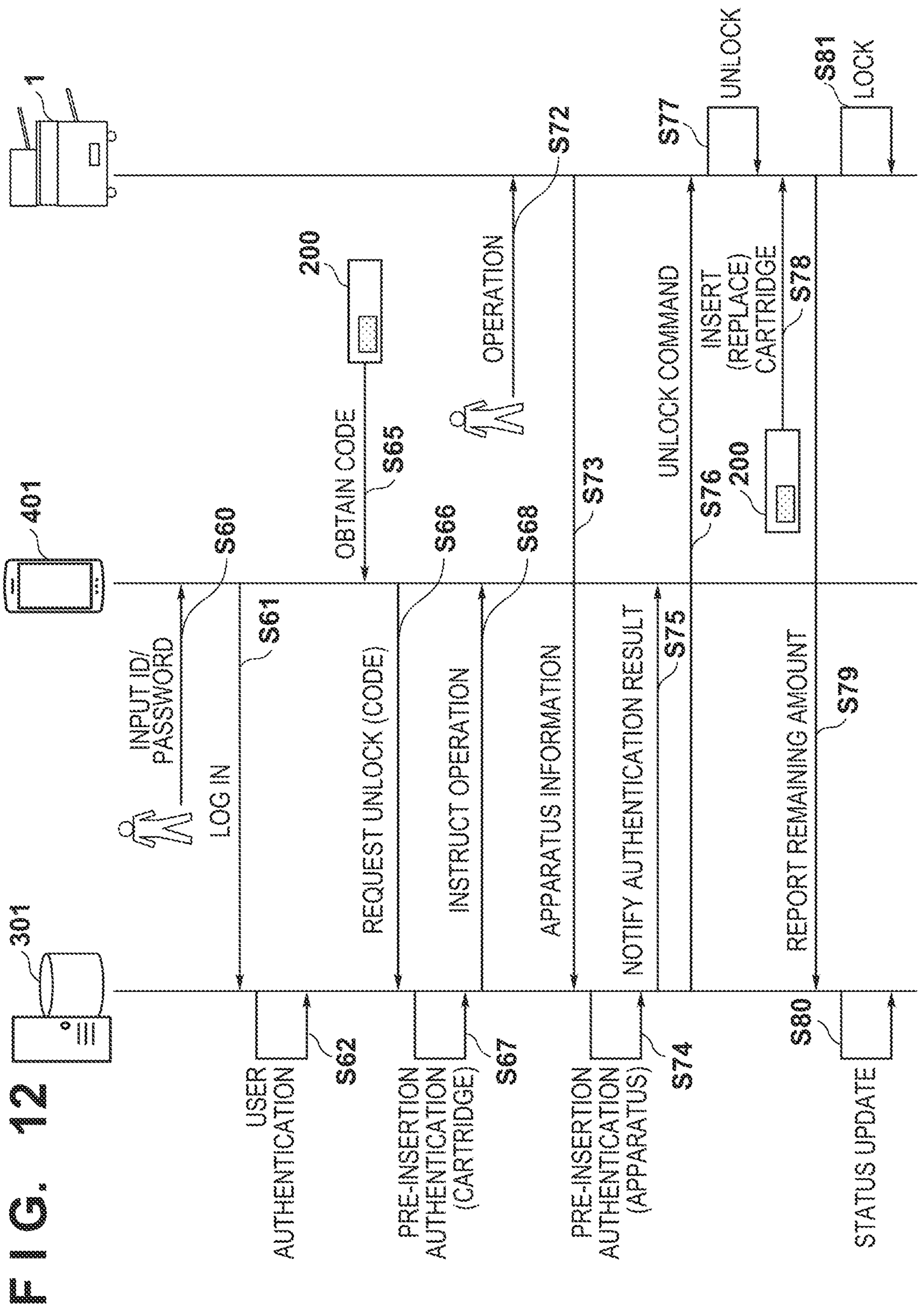
FIG. 12 is a sequence chart illustrating an example of the overall flow of processing according to a first example when inserting a cartridge.
Figure 13:
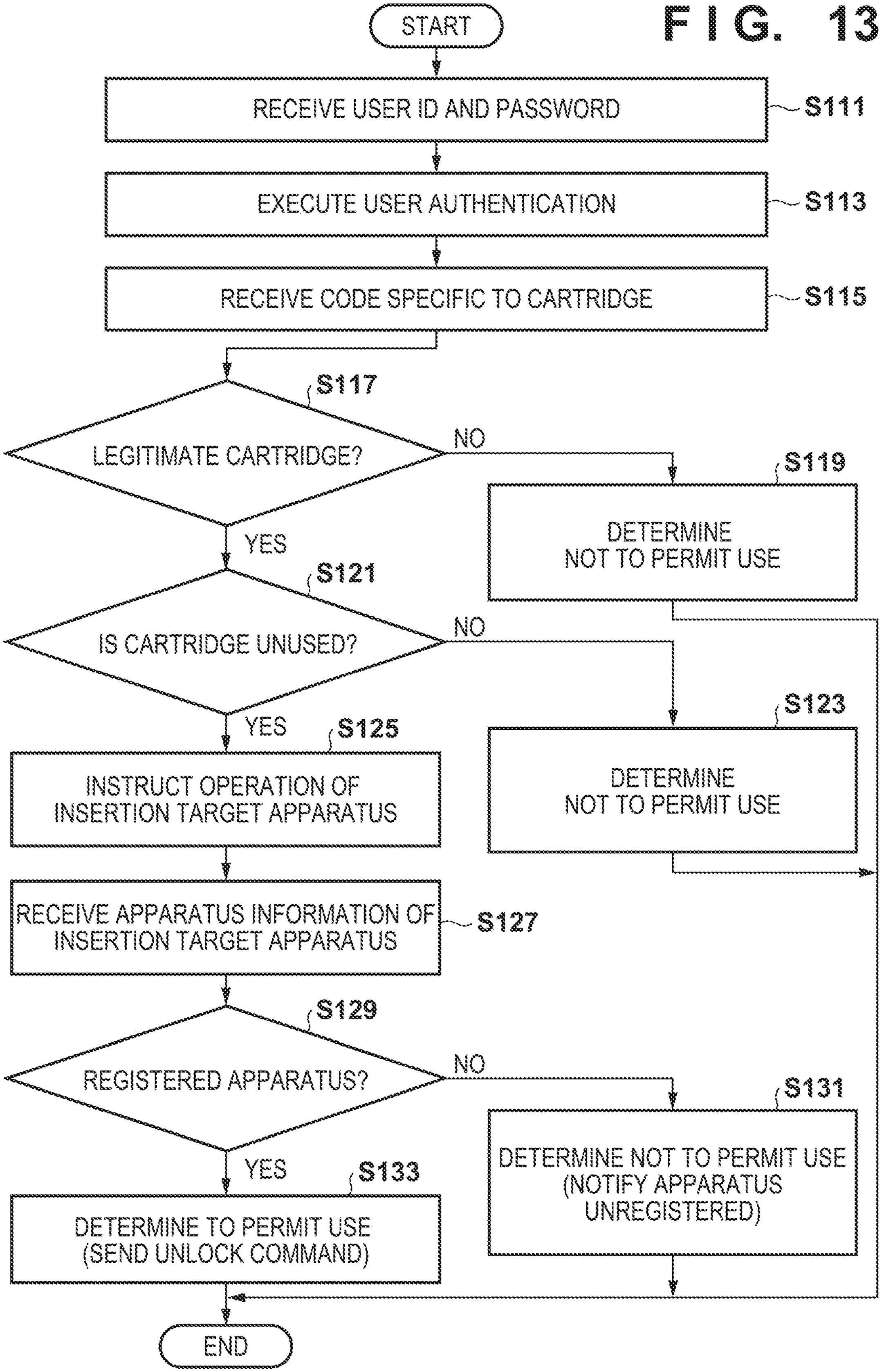
FIG. 13 is a flowchart illustrating an example of the flow of authentication processing executed by a management server according to the first embodiment.
Figure 14:
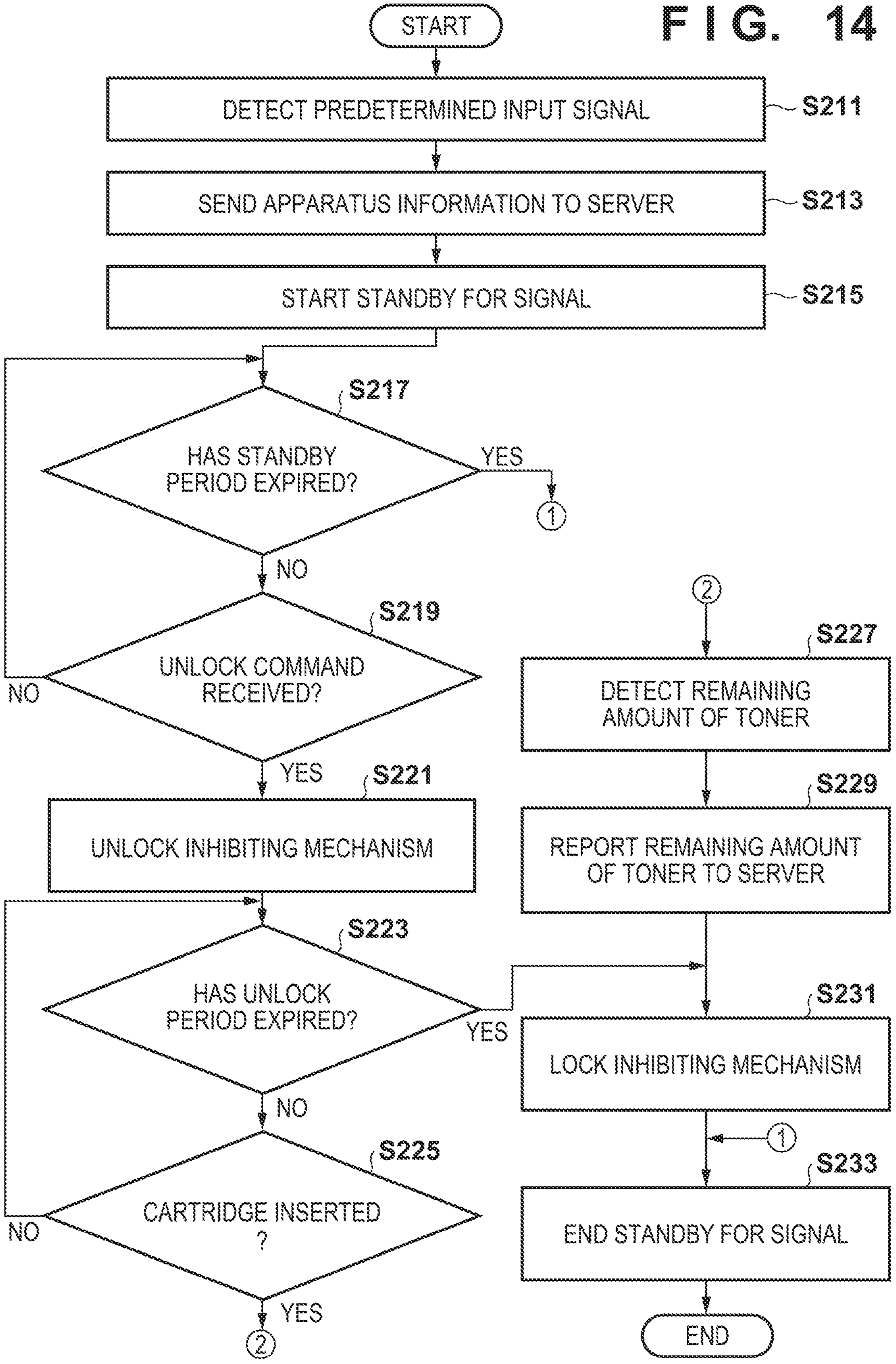
FIG. 14 is a flowchart illustrating an example of the flow of lock control processing executed by the image-forming apparatus according to the first embodiment.
Figure 15:
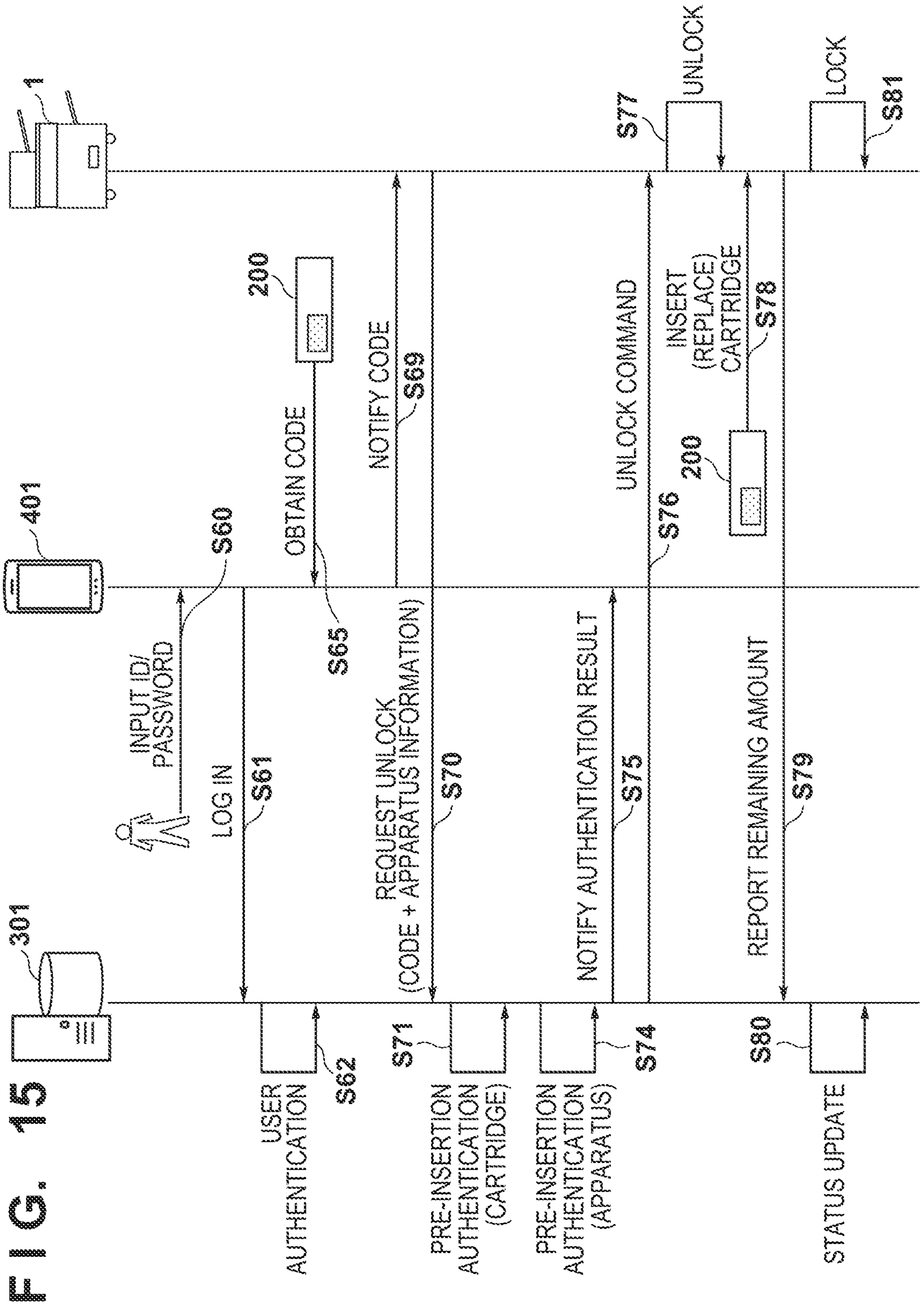
FIG. 15 is a sequence chart illustrating an example of the overall flow of processing according to a second example when inserting a cartridge.

This section will describe several examples of the flow of processing that can be executed in the device management system 300 according to the present embodiment, with reference to the sequence charts in FIGS. 10 to 12 and the flowcharts in FIGS. 13 to 15. Note that in the following descriptions, processing steps are indicated by an S, indicating “step”.

<1-3-1. Device Information Registration>

FIG. 10 is a sequence chart illustrating an example of the overall flow of processing related to device registration. The sequence illustrated in FIG. 10 mainly involves the image-forming apparatus 1, the management server 301, and the user terminal 401. It is assumed that the account information of the user is already registered in the account table 320 of the management DB 313 prior to the start of the sequence.

First, in S11, the user inputs the user ID and password in a login screen provided by the application unit 440 of the user terminal 401, for example. In S12, the application unit 440 sends the input user ID and password to the management server 301 in order to log in. In S13, the authentication unit 370 of the management server 301 executes user authentication based on the user ID and password received from the user terminal 401. It is assumed here that the user authentication is successful and the login to the system is established. The subsequent processing illustrated in FIG. 10 is performed while the login session continues.

In S14, the user inputs the apparatus information including the apparatus ID of the image-forming apparatus 1 installed in the user environment E1 into the apparatus information input screen provided by the application unit 440, for example. In S15, the application unit 440 sends an apparatus registration request including the input apparatus information to the management server 301. In S16, the data management unit 350 registers the apparatus information included in the received apparatus registration request in the apparatus registration table 330. In 517, the data management unit 350 instructs the application unit 440 to display a message prompting a predetermined operation to be performed in the image-forming apparatus 1, and that message is displayed by the display device 415.

In S21, the user performs the predetermined operation through the user OF 13 of the image-forming apparatus 1. Then, in S22, the lock control unit 96 of the image-forming apparatus 1 reads out the apparatus ID from the memory 12 and sends the apparatus information including the read-out apparatus ID to the management server 301. In S23, the data management unit 350 verifies the apparatus ID included in the apparatus information received from the image-forming apparatus 1 against the apparatus ID registered in the apparatus registration table 330 in S16. If the apparatus IDs match, the data management unit 350 updates the value of the corresponding “Status” in the apparatus registration table 330 to “Verified”. In S24, the data management unit 350 notifies the application unit 440 of the user terminal 401 of the result of the verification. The application unit 440 displays the verification result from the notification on the screen.

<1-3-2. Cartridge Provision>

FIG. 11 is a sequence chart illustrating some examples of the overall flow of processing related to providing a cartridge to a user. The sequence illustrated in FIG. 11 mainly involves the image-forming apparatus 1, the management server 301, and the user terminal 401. Note that the provision management unit 360 of the management server 301 continuously monitors for occurrence of a trigger event that triggers provision of a cartridge 200 to a user. Here, descriptions will be made for a decrease in the remaining amount of toner or the cartridge remaining amount as a first example of a trigger event; the user ordering a cartridge 200 as a second example; and a provision timing based on a regular purchase agreement arriving as a third example.

In the first example, in S31, the print control unit 95 of the image-forming apparatus 1 detects the remaining amount pertaining to the cartridge being used when, for example, an image-forming operation has been performed. It is assumed here that the remaining amount of toner is below a remaining amount threshold that triggers the provision of a new cartridge 200. In S32, the print control unit 95 reports the remaining amount information indicating the detected remaining amount of toner to the management server 301. In S33, the provision management unit 360 of the management server 301 recognizes that the remaining amount of toner in the image-forming apparatus 1 has decreased, and assigns a new cartridge 200 to the user who owns the image-forming apparatus 1. Assigning the cartridge 200 to the user can include adding a record indicating the user ID and the cartridge ID identifying the new cartridge 200 to the delivery management table 340. In addition, the provision management unit 360 sends a message to a delivery person, instructing delivery of the assigned cartridge 200. When a new cartridge 200 is shipped for the user, in S34, the provision management unit 360 sends a shipping notification to the user terminal 401.

In the second example, in S36, the user accesses a website that sells cartridges 200 using the user terminal 401, for example, and orders a new cartridge 200. In S37, the user terminal 401 sends, to the management server 301, order information indicating, for example, the type and number of cartridges 200 ordered. In S38, the provision management unit 360 of the management server 301 assigns the specified number of cartridges 200 to the user who is the purchaser in response to the order information being received. In addition, the provision management unit 360 sends a message to a delivery person, instructing delivery of the assigned cartridge 200. When a cartridge 200 is shipped for the user, in S39, the provision management unit 360 sends a shipping notification to the user terminal 401.

In the third example, in S41, the provision management unit 360 determines that the provision timing for a cartridge 200 has arrived for the user who has entered into the regular purchase agreement. In S42, the provision management unit 360 assigns a new cartridge 200 to the user for whom the provision timing has arrived. In addition, the provision management unit 360 sends a message, to a delivery person, instructing delivery of the assigned cartridge 200. When a cartridge 200 is shipped for the user, in S43, the provision management unit 360 sends a shipping notification to the user terminal 401.

<1-3-3. Authentication and Cartridge Insertion (First Example)>

FIG. 12 is a sequence chart illustrating an example of the overall flow of processing according to a first example when inserting a cartridge. The sequence illustrated in FIG. 12 mainly involves the image-forming apparatus 1, the management server 301, and the user terminal 401. Note that an unused new cartridge 200 is assumed to have been delivered to the user environment E1 prior to the start of the sequence.

First, in S60, the user inputs the user ID and password in the login screen. In S61, the application unit 440 of the user terminal 401 sends the input user ID and password to the management server 301. In S62, the authentication unit 370 of the management server 301 executes user authentication based on the user ID and password received from the user terminal 401. It is assumed here that the user authentication is successful and the login to the system is established. The subsequent processing illustrated in FIG. 12 is performed while the login session continues.

In S65, the application unit 440 activates the code obtainment unit 430 in response to an operation made by the user. The code obtainment unit 430 obtains the code 201 specific to the cartridge 200 by, for example, optically reading the code using the camera 413, or by accepting a user input. Next, in S66, the application unit 440 sends an unlock request, including the code 201 obtained by the code obtainment unit 430, to the management server 301.

The authentication unit 370 of the management server 301 starts the pre-insertion authentication in response to the unlock request being received. S67 is a first stage of the pre-insertion authentication, in which the authentication unit 370 determines whether the cartridge 200 identified by the code 201 included in the unlock request has correspondence with the account of the logged-in user by referring to the delivery management table 340. It is assumed here that the cartridge 200 has correspondence with the user account, and the first stage of the authentication is therefore successful. In response to the first stage of the authentication being successful, in S68, the authentication unit 370 instructs the application unit 440 to display a message prompting a predetermined operation to be performed in the insertion target apparatus, and that message is displayed by the display device 415.

In S72, the user performs the predetermined operation through the user OF 13 of the image-forming apparatus 1 that is the insertion target apparatus. Upon doing so, in S73, the lock control unit 96 reads out the apparatus ID from the memory 12 and sends the apparatus information, including the read-out apparatus ID, to the management server 301. S74 is a second stage of the pre-insertion authentication, in which the authentication unit 370 determines whether the image-forming apparatus 1 into which the cartridge is to be inserted has correspondence with the user account of the logged-in user by referring to the apparatus registration table 330 based on the apparatus ID included in the received apparatus information. It is assumed here that the image-forming apparatus 1 has correspondence with the user account, and the second stage of the authentication is therefore also successful. In response to the pre-insertion authentication being successful, in S75, the authentication unit 370 notifies the user terminal 401 of the result that the authentication is successful. Additionally, in S76, the authentication unit 370 sends an unlock command to the image-forming apparatus 1 to cause it to unlock the inhibiting mechanism 50 of the image-forming apparatus 1.

In S77, in response to the unlock command being received from the management server 301, the lock control unit 96 of the image-forming apparatus 1 switches the state of the inhibiting mechanism 50 from the locked state to the unlocked state. In S78, the user inserts a new cartridge 200 into the image-forming apparatus 1 (or perform cartridge replacement) in response to the insertion path 55 for the cartridge 200 being opened. In S79, the print control unit 95 detects the remaining amount of toner in the new cartridge 200 and reports the remaining amount information, which indicates the remaining amount of toner, to the management server 301. In S80, the data management unit 350 of the management server 301 updates the value of "Remaining Amount of Toner" in the record of the apparatus registration table 330 corresponding to the image-forming apparatus 1 in response to the remaining amount information being received. The data management unit 350 also changes "Status" for the record in the delivery management table 340 corresponding to the new cartridge 200 to "Usage Started".

Meanwhile, when the predetermined unlocked period has passed following the reception of the unlock command or the unlocking of the inhibiting mechanism 50, in S81, the lock control unit 96 of the image-forming apparatus 1 switches the state of the inhibiting mechanism 50 back to the locked state.

Note that as described above, it is also possible to perform only the pre-insertion authentication pertaining to the cartridge 200 in S67 and to omit the pre-insertion authentication pertaining to the image-forming apparatus 1 in S74. In this case, the user operation in S72 and the sending of the apparatus information in S73 may also be skipped. However, when the power of the image-forming apparatus 1 is off, the image-forming apparatus 1 cannot receive the unlock command from the management server 301, and thus the management server 301 may instruct the user to power on the image-forming apparatus 1 in S68.

<1-3-4. Authentication Processing>

FIG. 13 is a flowchart illustrating an example of the flow of the authentication processing executed by the management server 301 according to the present embodiment. The authentication processing in FIG. 13 corresponds to the processing executed by the authentication unit 370 of the management server 301 in S62 to S76 in FIG. 12. This authentication processing can be realized, for example, by the processing circuit 314 executing a computer program stored in advance in the memory 312 of the management server 301.

First, in S111, the authentication unit 370 receives the user ID and password entered in the login screen. Next, in S113, the authentication unit 370 executes user authentication based on the received user ID and password. It is assumed here that the user authentication is successful, and thus the flow of processing performed when the user authentication has failed will not be described.

Next, in S115, the authentication unit 370 receives the code 201 specific to the cartridge 200 obtained in the user environment E1. Next, in S117, the authentication unit 370 determines whether the cartridge 200 identified based on the received code 201 has correspondence with the user account of the logged-in user. For example, if an association between the cartridge ID based on the received code 201 and the user ID of the logged-in user is registered in the delivery management table 340, the cartridge 200 is determined to be a legitimate cartridge, and the sequence moves to S121. On the other hand, if there is no association between the cartridge ID based on the received code 201 and the user ID of the logged-in user registered in the delivery management table 340, the sequence moves to S119.

In S119, the authentication unit 370 determines that the cartridge 200 is not a genuine product provided through a legitimate route, and sends, to the user terminal 401, an authentication result notification indicating that the use of the cartridge 200 is not permitted and the pre-insertion authentication has failed.

In S121, the authentication unit 370 determines whether the status of the cartridge 200 identified by the received code 201 is "Unused" by referring to the delivery management table 340. If the status is "Unused", the sequence moves to S125. On the other hand, if the status is not "Unused", the sequence moves to S123.

In S123, since the cartridge 200 is not unused, the authentication unit 370 determines not to permit the use of the cartridge 200. In this case, the authentication unit 370 sends, to the user terminal 401, an authentication result notification indicating that the use of the cartridge 200 is not permitted and the pre-insertion authentication has failed.

If the cartridge 200 identified by the received code 201 is a genuine product and is unused, in S125, the authentication unit 370 instructs the user to perform a predetermined operation in the insertion target apparatus (e.g., by displaying a message on the screen). Next, in S127, the authentication unit 370 receives the apparatus information including the apparatus ID from the image-forming apparatus 1 that is the insertion target apparatus. Next, in S129, the authentication unit 370 determines whether the insertion target apparatus, identified by the received apparatus ID, is already registered (or both already registered and verified) as an apparatus of the logged-in user. For example, if there is an association between the received apparatus ID and the user ID of the logged-in user registered in the apparatus registration table 330, the insertion target apparatus is already registered as an apparatus of the logged-in user, and thus the sequence moves to S133. On the other hand, if there is no association between the received apparatus ID and the user ID of the logged-in user registered in the apparatus registration table 330, the insertion target apparatus is not registered as an apparatus of the logged-in user, and thus the sequence moves to S131.

In S131, the authentication unit 370 determines that the insertion target apparatus is not registered as an apparatus of the logged-in user, and thus determines not to permit the cartridge 200 to be used in the insertion target apparatus. In this case, the authentication unit 370 sends, to the user terminal 401, an authentication result notification indicating that the pre-insertion authentication has failed due to the apparatus being unregistered.

In S133, since the insertion target apparatus is already registered as an apparatus of the logged-in user, the authentication unit 370 determines to permit the cartridge 200 to be used in the insertion target apparatus. In this case, the authentication unit 370 sends an unlock command to switch the inhibiting mechanism 50 of the image-forming apparatus 1 to the unlocked state, and sends, to the user terminal 401, an authentication result notification indicating that the authentication is successful. Although not illustrated, in S133, the authentication unit 370 may permit the use of the cartridge 200 in the insertion target apparatus only if the remaining amount information indicates that the remaining amount of toner in the existing cartridge in the insertion target apparatus is less than the predetermined remaining amount threshold, as described above.

<1-3-5. Lock Control Processing>

FIG. 14 is a flowchart illustrating an example of the flow of lock control processing executed by the image-forming apparatus 1 according to the present embodiment. The lock control processing in FIG. 14 corresponds to the processing executed by the lock control unit 96 of the image-forming apparatus 1 in S72 to S81 in FIG. 12.

First, in S211, the lock control unit 96 detects a predetermined input signal. Here, the input signal may be, for example, an ID sending request received from the user terminal 401 via the communication OF 11, or a user input signal detected via the user I/F 13. In S213, in response to the predetermined input signal being detected, the lock control unit 96 reads out the apparatus ID from the memory 12 and sends the apparatus information, including the read-out apparatus ID, to the management server 301. Next, in S215, the lock control unit 96 starts standing by for the unlock command, which is a control signal based on the result of the pre-insertion authentication.

In S217, the lock control unit 96 determines whether the predetermined standby period has expired by referring to the value of a timer that starts when the standby starts, for example. If the standby period has expired, the sequence moves to S233. On the other hand, if the standby period has not expired, the sequence moves to S219.

In S219, the processing branches depending on whether an unlock command has been received from the management server 301. If an unlock command has been received from the management server 301, the sequence moves to S221. If an unlock command is not received, the sequence returns to S217.

In S221, the lock control unit 96 switches the state of the inhibiting mechanism 50 from the locked state to the unlocked state in accordance with the unlock command received from the management server 301. Next, in S223, the lock control unit 96 stands by until the unlocked period expires by using a timer that starts when the inhibiting mechanism 50 is unlocked, for example. In the meantime, in S225, the lock control unit 96 monitors for the user extracting the existing cartridge and inserting a new cartridge. Upon a new cartridge 200 being inserted by the user, the sequence moves to S227.

In S227, the remaining amount detection unit 61 detects the remaining amount of toner in the new cartridge 200. Then, in S229, the print control unit 95 reports the remaining amount of toner detected by the remaining amount detection unit 61 to the management server 301. Then, in S231, the lock control unit 96 switches the state of the inhibiting mechanism 50 back to the locked state. Additionally, in S233, the lock control unit 96 ends the standby for the control signal from an external apparatus. The lock control processing illustrated in FIG. 14 then ends.

<1-3-6. Authentication and Cartridge Insertion (Second Example)>

FIG. 15 is a sequence chart illustrating an example of the overall flow of processing according to a second example when inserting a cartridge. The sequence illustrated in FIG. 15 mainly involves the image-forming apparatus 1, the management server 301, and the user terminal 401. Note that an unused new cartridge 200 is assumed to have been delivered to the user environment E1 prior to the start of the sequence.

S60 to S62, which are processing steps related to login and user authentication, may be the same as in the first example illustrated in FIG. 12, and will therefore not be described again here.

In S65, the code obtainment unit 430 of the user terminal 401 is activated in response to an operation made by the user, and obtains the code 201 specific to the cartridge 200. Next, in S69, the apparatus control unit 420 sends a code notification, including the code 201 obtained by the code obtainment unit 430, to the image-forming apparatus 1. In response to the code notification being received, in S70, the lock control unit 96 of the image-forming apparatus 1 sends an unlock request, which can include the notified code 201 and the apparatus information including the apparatus ID of the image-forming apparatus 1, to the management server 301.

Note that instead of sending the code notification including the code 201 to the image-forming apparatus 1 in S69, the user terminal 401 may send an unlock request including the code 201 to the management server 301 and send an ID sending request (which does not include the code 201) to the image-forming apparatus 1. In this case, in response to the ID sending request being received, the lock control unit 96 of the image-forming apparatus 1 sends the apparatus information including the apparatus ID of the image-forming apparatus 1 to the management server 301, as in S73 in FIG. 12.

The authentication unit 370 of the management server 301 starts the pre-insertion authentication in response to the unlock request being received. In S71, the authentication unit 370 determines whether the cartridge 200 identified by the code 201 included in the unlock request has correspondence with the account of the logged-in user by referring to the delivery management table 340. It is assumed here that the cartridge 200 has appropriate correspondence with the user account. Next, in S74, the authentication unit 370 determines whether the image-forming apparatus 1 into which the cartridge is to be inserted has correspondence with the user account of the logged-in user by referring to the apparatus registration table 330 based on the apparatus ID included in the unlock request. It is assumed here that the image-forming apparatus 1 has appropriate correspondence with the user account. The pre-insertion authentication is therefore successful. In response to the pre-insertion authentication being successful, in S75, the authentication unit 370 notifies the user terminal 401 of the result that the authentication is successful. Additionally, in S76, the authentication unit 370 sends an unlock command to the image-forming apparatus 1 to cause it to unlock the inhibiting mechanism 50 of the image-forming apparatus 1.

S77 to S81, which are processing steps performed after the unlock command has been sent, may be the same as in the first example illustrated in FIG. 12, and will therefore not be described again here.

In the first example illustrated in FIG. 12, the code 201 specific to the cartridge 200 is sent to the management server 301 from the user terminal 401, whereas the apparatus ID identifying the image-forming apparatus 1 that is the insertion target apparatus is sent to the management server 301 from the image-forming apparatus 1. Accordingly, there is no need to send and receive the code 201 between the user terminal 401 and the image-forming apparatus 1, and thus the above-described mechanism can be realized at a relatively low development cost. In the second example illustrated in FIG. 15, the code 201 specific to the cartridge 200 is transferred from the user terminal 401 that obtained the code 201 to the image-forming apparatus 1, and is relayed to the management server 301 along with the apparatus information of the image-forming apparatus 1. Accordingly, the user does not need to operate the image-forming apparatus 1 in order to trigger the sending of the apparatus ID, which reduces the workload on the user for pre-insertion authentication.

1-4. Summary of First Embodiment

According to the embodiment described above, an inhibiting mechanism capable of inhibiting the insertion of a cartridge-type device into an image-forming apparatus is disposed in at least one of the image-forming apparatus and the cartridge. A code specific to the device is obtained by a terminal present in the user environment, and the obtained code is sent to a server apparatus in a remote environment. Authentication for permitting the use of the device in the image-forming apparatus is then performed by the server apparatus based on the aforementioned code. If the authentication is successful, the inhibiting mechanism is switched to a state in which the device can be inserted. Accordingly, the use of a cartridge-type device can be permitted or inhibited in light of conditions not easily determined by the image-forming apparatus alone, such as correspondence between the device and the user account, correspondence between the insertion target apparatus and the user account, or the like.

Additionally, according to the embodiment described above, a new device is not inserted into the image-forming apparatus unless the authentication based on the code specific to the device is successful. Accordingly, while a technique in which authentication is performed after a device is inserted to a set position of an image-forming apparatus requires a mechanism for ejecting or invalidating an unauthorized device when the unauthorized device has been inserted, such a mechanism is not necessary in the above-described embodiment. This makes it possible to simplify the configuration of the apparatus and reduce the cost of implementation. Additionally, the insertion of a device that is not compatible with the image-forming apparatus is inhibited, which reduces the risk of physical failures in the apparatus.

Additionally, according to the embodiment described above, the aforementioned code that is specific to the device is an optically-readable code or a code which can be read visually by the user, printed on the device or the package thereof. Accordingly, the code can be easily obtained using a user interface or a camera of a terminal before the device is inserted into the image-forming apparatus. This eliminates the need to provide a memory for storing the code in each of the devices, which are consumed one after another, and this makes it possible to reduce running costs borne by users.

1-5. Variations

<1-5-1. First Variation (Unlocking when Anomaly Detected)>

When the inhibiting mechanism 50 of the image-forming apparatus 1 described in the previous section is in a locked state (a state in which the front cover 20 cannot be opened or closed), the cartridge 200 cannot be inserted into or extracted from the image-forming apparatus 1. When the inhibiting mechanism 50 is in an unlocked state (a state in which the front cover 20 can be opened or closed), the cartridge 200 can be inserted into or extracted from the image-forming apparatus 1. When such a mechanism is employed, in a first variation, the lock control unit 96 of the image-forming apparatus 1 may monitor whether the functions of the image-forming unit 40 can operate normally while the inhibiting mechanism 50 is kept in the locked state. Then, when the image-forming apparatus 1 has a cartridge 200 inserted and an anomaly in the functions of the image-forming unit 40 is detected, the lock control unit 96 may switch the inhibiting mechanism 50 from the locked state to the unlocked state. Through this, if, for example, the image-forming unit 40 has experienced a failure, the user can open the unlocked front cover 20, extract the cartridge 200, and transfer the extracted cartridge 200 to another image-forming apparatus that can operate normally.

After switching the inhibiting mechanism 50 to the unlocked state in a case where an anomaly in the functions of the image-forming unit 40 has been detected, the lock control unit 96 may switch the inhibiting mechanism 50 from the unlocked state to the locked state upon detecting that the cartridge 200 has been extracted from the image-forming apparatus 1. This makes it possible to prevent unauthorized cartridges from being inserted into the image-forming apparatus 1 and used (after the anomaly has been resolved).

Figure 16:
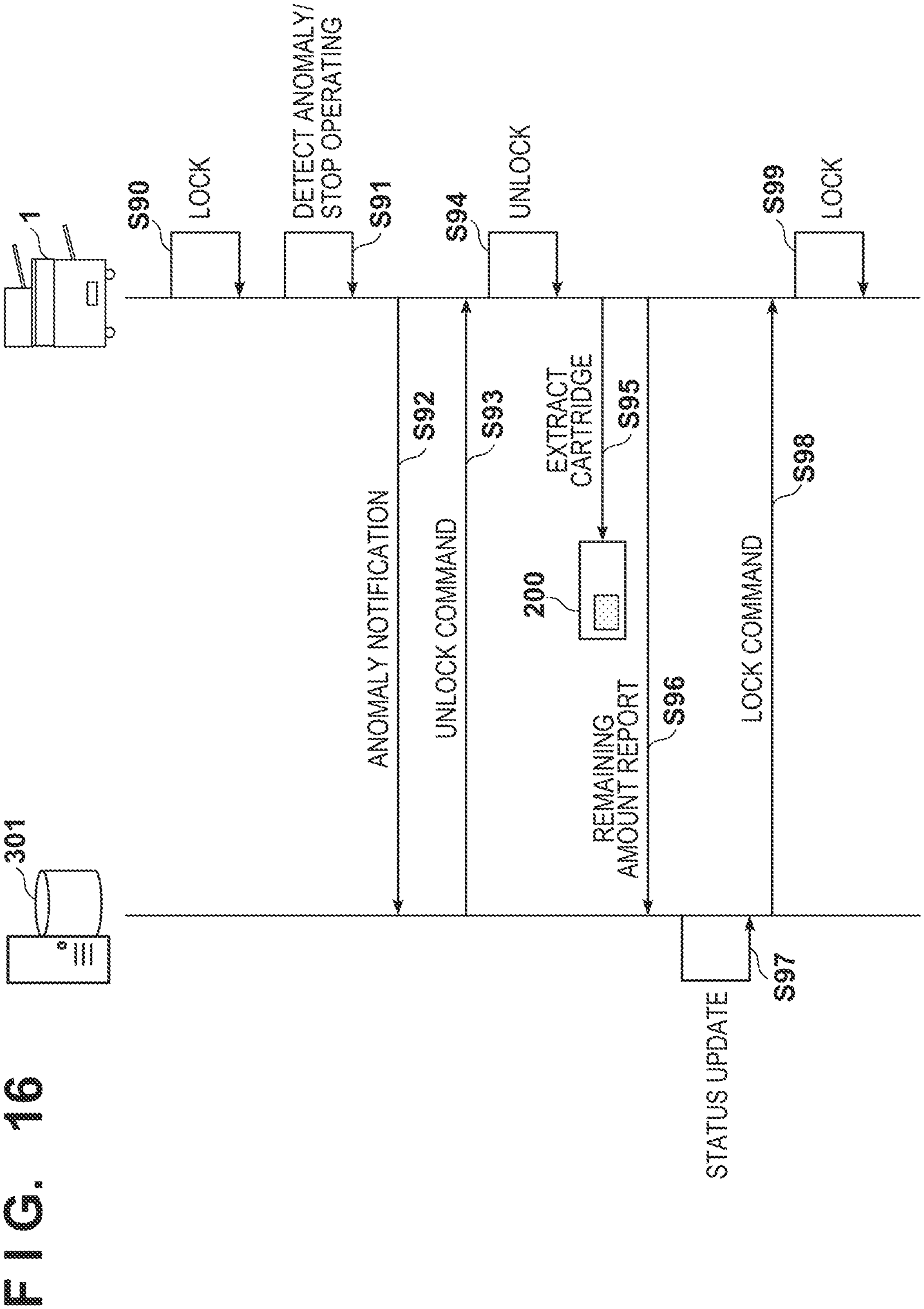
FIG. 16 is a sequence chart illustrating an example of the overall flow of processing according to a first variation.

FIG. 16 is a sequence chart illustrating an example of the overall flow of processing according to the first variation. The sequence illustrated in FIG. 16 mainly involves the image-forming apparatus 1 and the management server 301. Note that the cartridge 200 is assumed to have been inserted into the image-forming apparatus 1 prior to the start of the sequence.

In S90, the lock control unit 96 of the image-forming apparatus 1 switches the state of the inhibiting mechanism 50 to the locked state. The lock control unit 96 continuously monitors whether the image-forming function of the image-forming apparatus 1 can operate normally while the inhibiting mechanism 50 is kept in the locked state. It is assumed here that the print control unit 95 has a state diagnosis function for diagnosing the state of the image-forming unit 40.

In S91, the print control unit 95 detects an anomaly (e.g., the occurrence of a failure) in the image-forming unit 40. The print control unit 95 causes the image-forming unit 40 to stop operating in response to the anomaly being detected. The print control unit 95 does not permit the image-forming unit 40 to execute a new job unless the anomaly is resolved. The print control unit 95 notifies the lock control unit 96 that the anomaly has been detected.

The lock control unit 96 determines whether a cartridge 200 has been inserted into the image-forming apparatus 1 in response to the anomaly in the image-forming unit 40 being detected (e.g., based on the sensor signal from the cartridge sensor). Upon determining that the cartridge 200 has been inserted, in S92, the lock control unit 96 sends an anomaly notification to the management server 301. The anomaly notification sent here includes at least the apparatus ID of the image-forming apparatus 1.

In response to the anomaly notification being received, in S93, the authentication unit 370 of the management server 301 sends, to the image-forming apparatus 1, an unlock command for unlocking the inhibiting mechanism 50 of the image-forming apparatus 1.

In S94, in response to the unlock command being received from the management server 301, the lock control unit 96 of the image-forming apparatus 1 switches the state of the inhibiting mechanism 50 from the locked state to the unlocked state. In S95, the user opens the front cover 20, extracts the cartridge 200 from the image-forming apparatus 1, and closes the front cover 20.

In S96, the print control unit 95 sends a remaining amount report indicating that there is no cartridge to the management server 301 in response to the cartridge sensor no longer sensing the cartridge 200. In S97, the data management unit 350 of the management server 301 updates the value of "Remaining Amount of Toner" in the record of the apparatus registration table 330 corresponding to the image-forming apparatus 1 to blank in response to the remaining amount report being received.

Then, in S98, the authentication unit 370 of the management server 301 sends, to the image-forming apparatus 1, a lock command for locking the inhibiting mechanism 50 of the image-forming apparatus 1. In S99, in response to the lock command being received from the management server 301, the lock control unit 96 of the image-forming apparatus 1 switches the state of the inhibiting mechanism 50 from the unlocked state to the locked state.

Here, an example has been described in which the lock control unit 96 switches the state of the inhibiting mechanism 50 between the locked state and the unlocked state in response to a command being received from the management server 301. However, if an anomaly is detected in the image-forming unit 40 and the image-forming apparatus 1 is determined to already have a cartridge 200 inserted, the lock control unit 96 may actively switch the state of the inhibiting mechanism 50 to the unlocked state without waiting for a command from the management server 301. Likewise, when the cartridge 200 is detected as having been extracted from the image-forming apparatus 1, the lock control unit 96 may actively switch the state of the inhibiting mechanism 50 to the locked state.

<1-5-2. Second Variation (Integration of Operation Terminal with Image-Forming Apparatus)>

Figure 17:
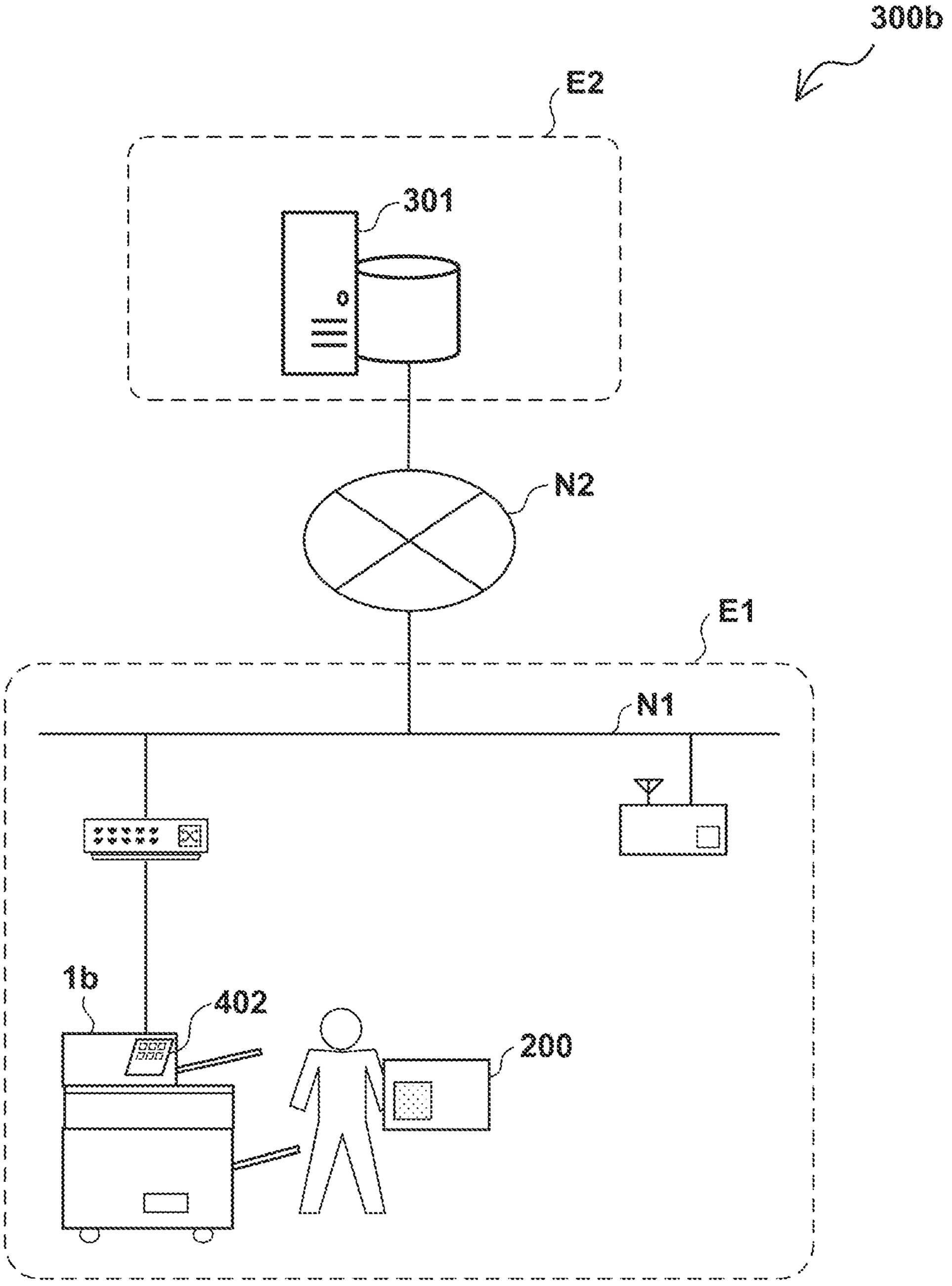
FIG. 17 is a schematic diagram illustrating an example of the configuration of a device management system according to a second variation.

Although the previous section mainly described an embodiment in which a user terminal separate from the image-forming apparatus provides UI functions to a user, an operation terminal integrated with the image-forming apparatus may provide the same UI functions. FIG. 17 is a schematic diagram illustrating an example of the configuration of a device management system **300*b* according to a second variation. Referring to FIG. 17, the device management system 300*b* includes an image-forming apparatus 1*b* and the management server 301**.

The image-forming apparatus **1*b* is installed in the user environment E1 in which a user is present. The image-forming apparatus 1*b* may basically have the same configuration as the image-forming apparatus 1 described above, but further includes an operation terminal 402. The operation terminal 402 provides code obtainment functions similar to those of the code obtainment unit 430 of the user terminal 401, and UI functions similar to those of the application unit 440 of the user terminal 401. The operation terminal 402 may be used, for example, for accepting the input of account information, and accepting input of the code 201 specific to the cartridge 200. When the operation terminal 402 accepts the input of the code 201, the lock control unit 96 of the image-forming apparatus 1*b* sends an unlock request, which can include the input code 201 and the apparatus information including the apparatus ID of the image-forming apparatus 1*b*, to the management server 301** via the communication OF 11. Then, based on the result of the pre-insertion authentication performed by the management server 301, the lock control unit 96 switches the state of the inhibiting mechanism 50 from the locked state to the unlocked state, which enables the cartridge 200 to be inserted into the image-forming apparatus 1*b*.

According to this variation, both of reduction of development costs by eliminating the sending and receiving of the code 201 between the user terminal 401 and the image-forming apparatus 1, and mitigation of the workload for the user by eliminating operations for triggering the sending of the apparatus ID can be achieved.

<1-5-3. Other Variations>

Although the present embodiment mainly described an example in which the management server 301 performs the pre-insertion authentication in response to the reception of an unlock request from the user terminal 401 or the image-forming apparatus 1, and sends an unlock command when the authentication is successful, the technology according to the present disclosure is not limited to such a configuration. For example, the management server 301 may perform the pre-insertion authentication (e.g., verify the association between the user account and the cartridge) in response to the reception of an authentication request, which can include a code specific to the cartridge, and return an authentication result notification when the authentication is successful. In this case, the user terminal 401 or the image-forming apparatus 1 that has received the authentication result notification may determine whether the inhibiting mechanism 50 should be unlocked based on the result in the notification. At the time of this determination, the user terminal 401 or the image-forming apparatus 1 may further determine whether supplementary conditions for unlocking the inhibiting mechanism 50 (e.g., a decrease in the remaining amount of toner or the cartridge remainder) are satisfied.

Additionally, although the previous section mainly described an example in which "Status" in the corresponding record in the delivery management table 340 is changed to "Usage Started" in response to the remaining amount report sent to the management server 301 after the cartridge is inserted, the technology according to the present disclosure is not limited to such a configuration. For example, the trigger for changing the status may be a predetermined user operation being detected. To be more specific, first, the user terminal 401 or the image-forming apparatus 1 displays, on the screen, a message asking the user whether the insertion of the cartridge is complete. When the insertion of the cartridge is complete, the user operates the input device 414 of the user terminal 401 or a button (physical or in the GUI) of the image-forming apparatus 1 to make a response indicating that the insertion is complete. In response to such a user operation being detected, the user terminal 401 or the image-forming apparatus 1 sends an insertion complete notification to the management server 301. In response to the reception of this insertion complete notification, the management server 301 can change "Status" for the corresponding record in the delivery management table 340 to "Usage Started".

2. Second Embodiment

<2-1. Replenishment-Type Image-Forming Apparatus>

A second embodiment assumes that an image-forming apparatus 2 is a replenishment-type black-and-white laser printer. Note that, as described with respect to the first embodiment, the technology according to the present disclosure is not limited to this example, and can be applied in other types of printers, such as color laser printers and inkjet printers, for example. Again, the technology according to the present disclosure can be broadly applied in image-forming apparatuses such as photocopiers, printers, facsimile receivers, and multifunction peripherals.

<2-1-1. Internal Configuration of Apparatus>

Figure 18:
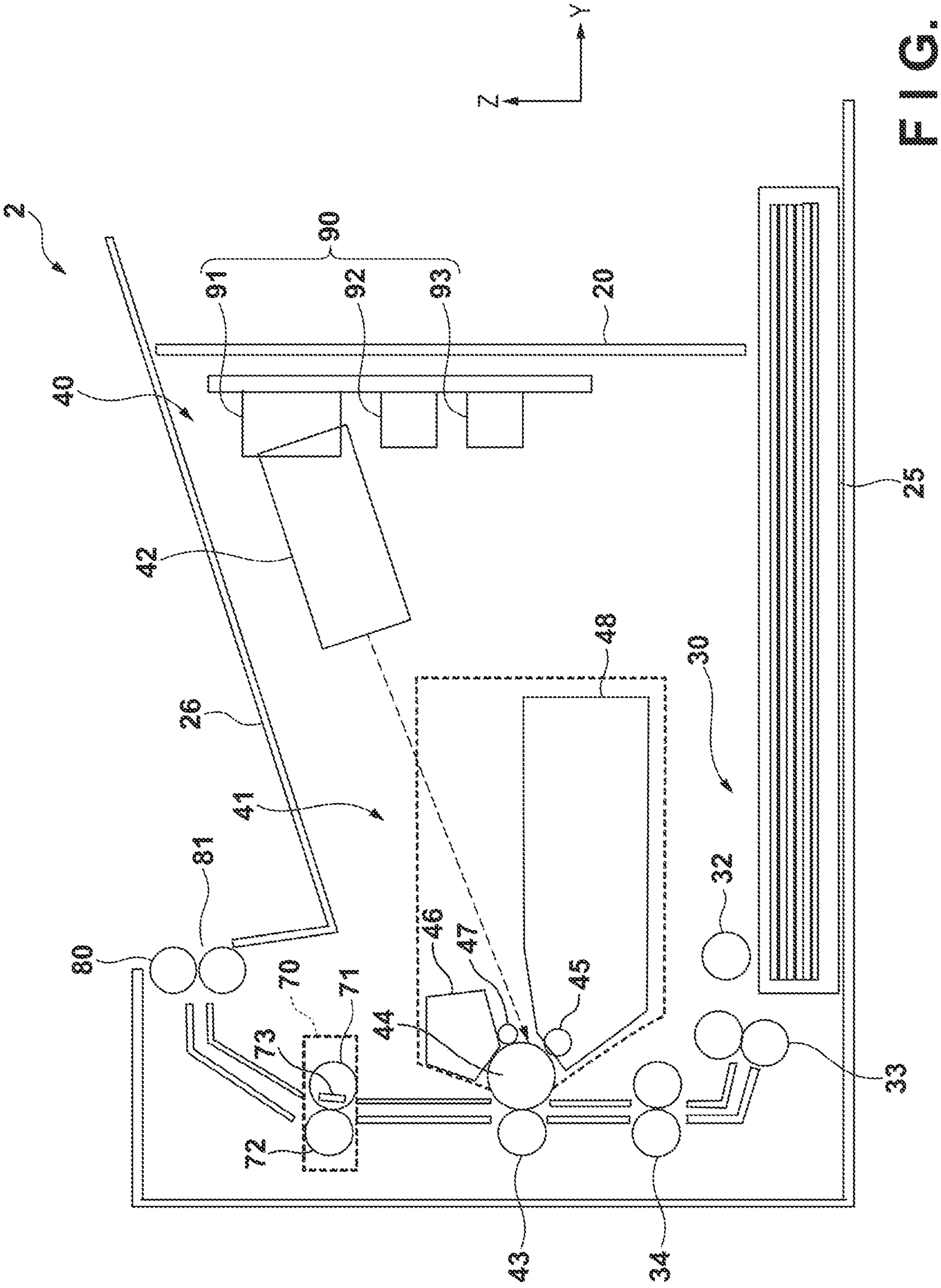
FIG. 18 is a schematic cross-sectional view illustrating an example of the physical configuration of the interior of an image-forming apparatus according to a second embodiment.

FIG. 18 is a schematic cross-sectional view illustrating an example of the physical configuration of the interior of the image-forming apparatus 2. Referring to FIG. 18, the image-forming apparatus 2 includes the feed unit 30, the image-forming unit 40, the fixing unit 70, the discharge roller pair 80, and the processing circuit 90, similar to the image-forming apparatus 1 according to the first embodiment. The feed unit 30 feeds the recording medium toward the image-forming unit 40. The image-forming unit 40 forms an image (a toner image) on the recording medium by consuming toner, which is a consumable agent. The fixing unit 70 fixes the image formed by the image-forming unit 40 onto the recording medium. The discharge roller pair 80 discharges the recording medium processed by the fixing unit 70 to the discharge tray 26. In the present embodiment, a process unit 41 of the image-forming unit 40 may be fixed to the main body of the image-forming apparatus 2, or may be removable. The processing circuit 90 functions as a controller for controlling the image-forming process executed by the image-forming unit 40.

<2-1-2. Detailed Configuration of Preserving Unit>

Figure 19:
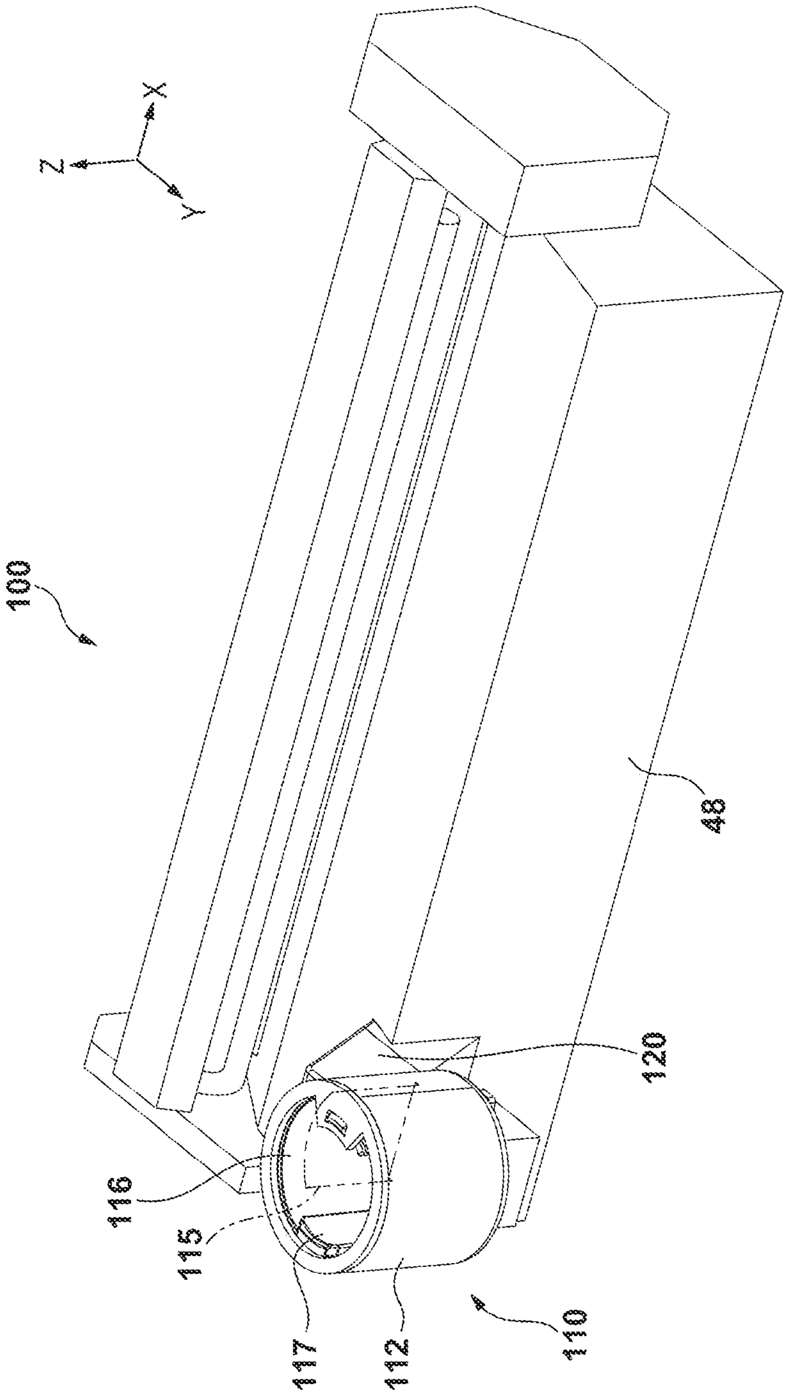
FIG. 19 is a schematic perspective view illustrating an example of the configuration of a consumable agent replenishment path according to the second embodiment.
Figure 20:
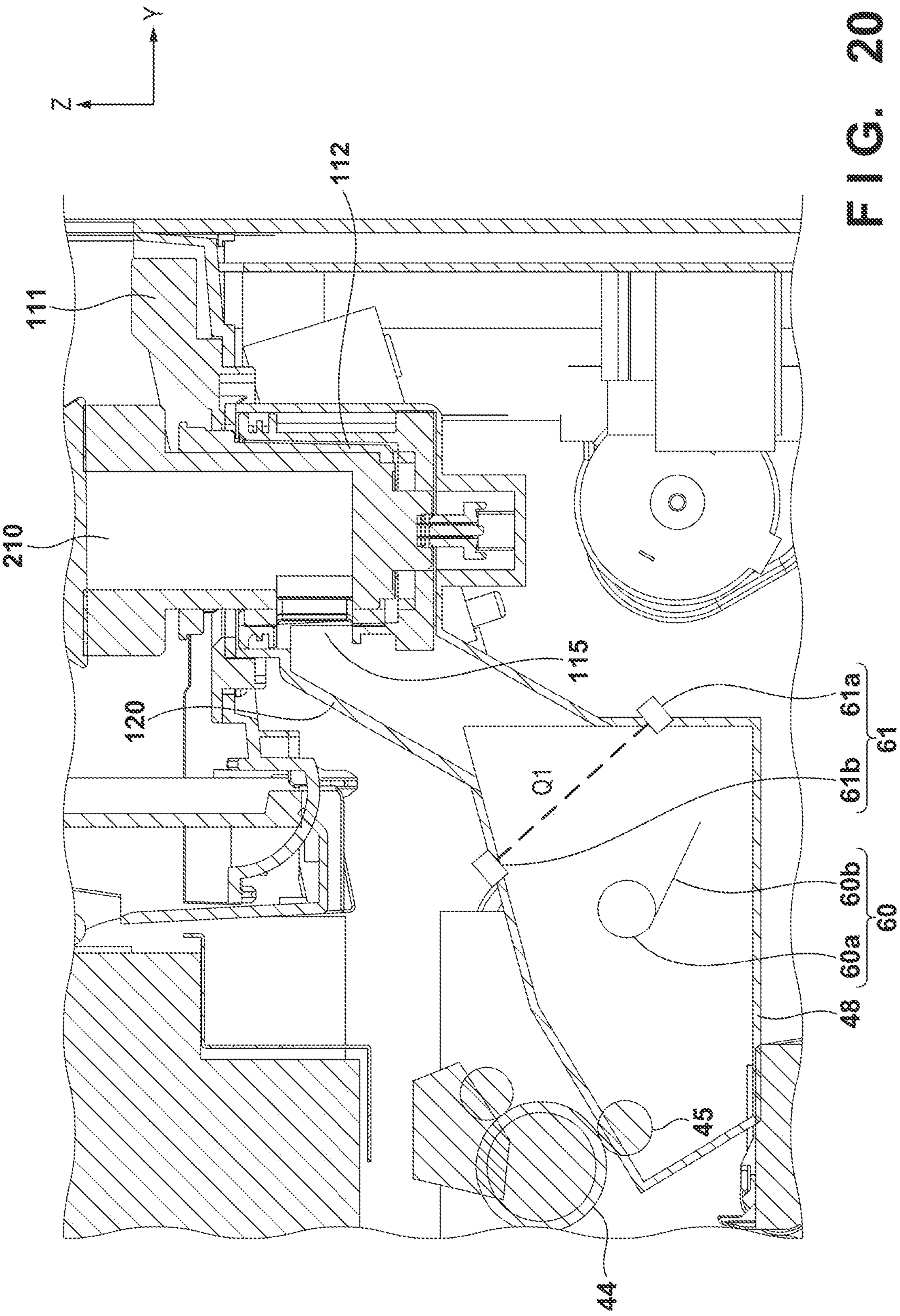
FIG. 20 is a schematic cross-sectional view illustrating an example of the configuration of a preserving unit and the periphery thereof according to the second embodiment.

A more detailed example of the configuration related to the preserving unit 48 of the image-forming apparatus 2 will be described next. FIG. 19 is a schematic perspective view illustrating an example of the configuration of a consumable agent replenishment path of the image-forming apparatus 2. FIG. 20 is a schematic cross-sectional view illustrating an example of the configuration of the preserving unit 48 and the periphery thereof. Referring to FIG. 19, the preserving unit 48 constitutes a part of a toner replenishing unit 100. The toner replenishing unit 100 includes the preserving unit 48 and a toner receiving unit 110. The toner receiving unit 110 includes a cylindrical member 112, a main body shutter 116, and a connecting member 120. Although the toner receiving unit 110 further includes a ring member 111, which will be described in detail with reference to FIGS. 22A to 24B, the ring member 111 is not illustrated in FIG. 19 for the purpose of illustrating other constituent elements. An inner space of the cylindrical member 112 communicates with the preserving unit 48 via a side opening 115 and the connecting member 120, which is hollow. The main body shutter 116 serves as an opening and closing mechanism capable of opening and closing the replenishment path of the consumable agent (toner, here) from a replenishment pack 210 (described below) to the preserving unit 48. A protruding part 117 is formed on an inner-side surface of the main body shutter 116.

FIG. 20 illustrates a state in which the replenishment pack 210 is connected to the toner receiving unit 110, along with a cross-section of the configuration of the preserving unit 48 and the periphery thereof. The replenishment pack 210 is an example of a container device that contains a consumable agent consumed for image formation. When the main body shutter 116 is opened, a replenishment path extending from the replenishment pack 210 to the preserving unit 48 through the connecting member 120 is opened. With the replenishment path open, the preserving unit 48 is replenished with toner released from the replenishment pack 210 through the replenishment path. The agitation member 60 and the remaining amount detection unit 61 are disposed within the preserving unit 48 in the present embodiment as well.

<2-1-3. Configuration of Replenishment Pack>

Figure 21A:
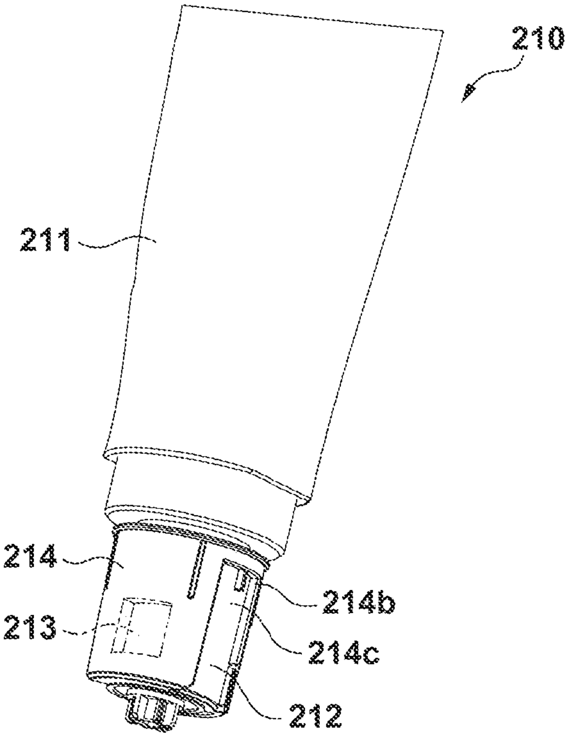
FIG. 21A is a first schematic perspective view illustrating an example of the overall configuration of a replenishment pack according to the second embodiment.
Figure 21B:
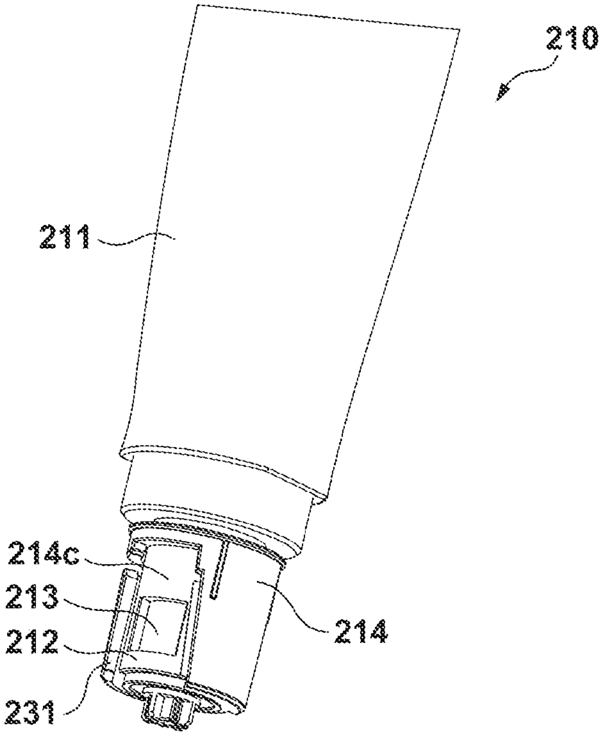
FIG. 21B is a second schematic perspective view illustrating an example of the overall configuration of the replenishment pack according to the second embodiment.

FIGS. 21A and 21B illustrate an example of the overall configuration of the replenishment pack 210. In this configuration example, the replenishment pack 210 includes a containing part 211, a nozzle 212, and a pack shutter 214. The containing part 211 can be configured as, for example, a hollow tube or pouch for containing toner, which is a consumable agent. The containing part 211 is filled with toner in advance. The containing part 211 may be a plastic bag that can easily deform, for example. However, the containing part 211 is not limited to such examples, and may be formed from any material, such as resin, paper, or vinyl, and may have any shape, such as a bottle, cylinder, or box.

The nozzle 212 is an interface with the toner receiving unit 110 of the image-forming apparatus 2. The inside of the nozzle 212 communicates with the inside of the containing part 211. An opening 213 for releasing the toner to the exterior is formed in a side surface of the nozzle 212. The opening 213 is normally blocked by the pack shutter 214.

The pack shutter 214 is a cylindrical member concentric with the nozzle 212, and is disposed on an outer side of the nozzle 212 in a radial direction. The pack shutter 214 has an opening 214*c*. A part of an edge that forms the opening 214*c* constitutes a drive transmission surface 214*b*. When replenishing toner, the pack shutter 214 rotates relative to the nozzle 212 such that the opening 213 in the nozzle 212 overlaps the opening 214*c* in the pack shutter 214, which makes it possible to open a path for releasing the toner which has been blocked by the pack shutter 214. As will be described below, the drive transmission surface 214*b* is a surface that receives a force which rotates the pack shutter 214. FIG. 21A illustrates a state in which the toner release path is blocked, and FIG. 21B illustrates a state in which the toner release path is open. A sealing member 231, which normally shuts off the opening 213 in the nozzle 212, can further be provided on the inner circumferential surface of the pack shutter 214. The sealing member 231 prevents toner from leaking from the replenishment pack 210 when toner is not being replenished.

<2-1-4. Replenishment of Consumable Agent>

Figure 22A:
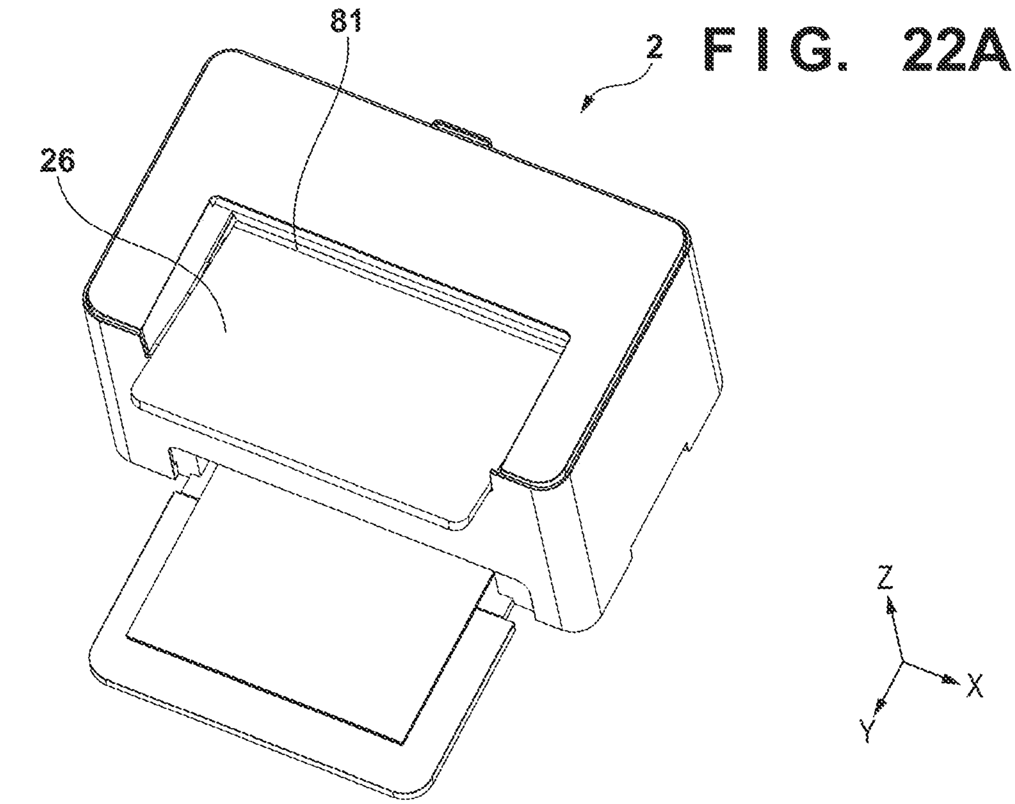
FIG. 22A is a first explanatory diagram illustrating the opening and closing of a discharge tray according to the second embodiment.
Figure 22B:
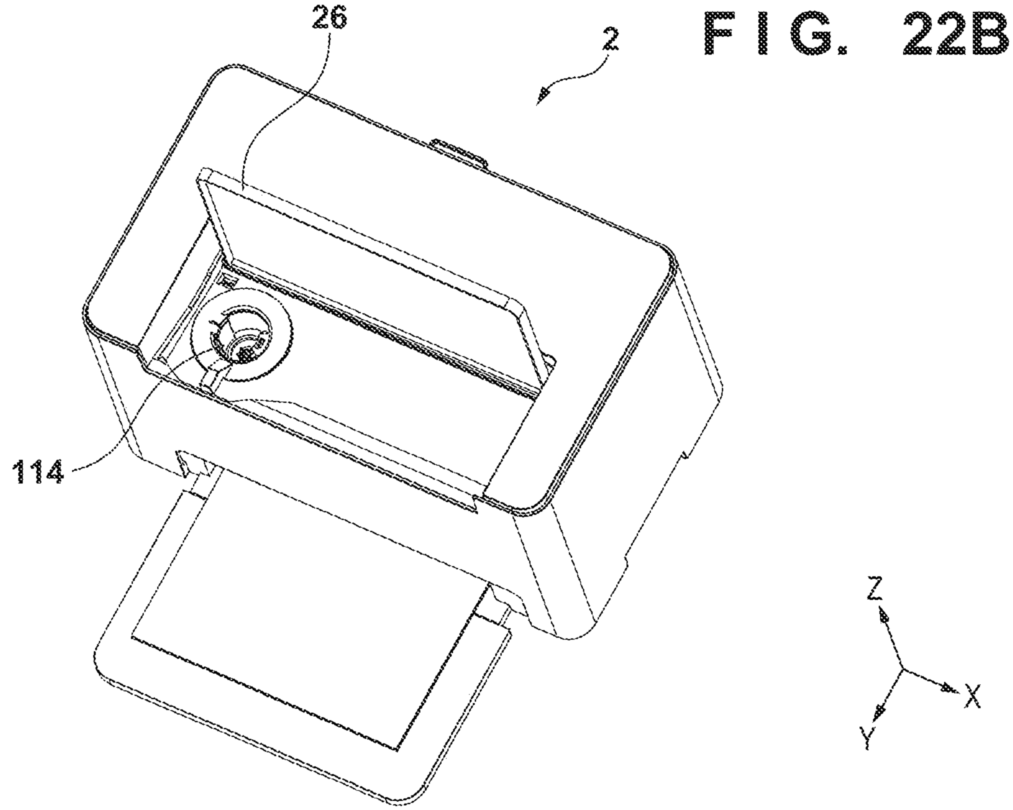
FIG. 22B is a second explanatory diagram illustrating the opening and closing of the discharge tray according to the second embodiment.

Next, the connection of the replenishment pack 210 to the toner receiving unit 110 will be described with reference to FIGS. 22A, 22B, and 23. As illustrated in FIGS. 22A and 22B, the discharge tray 26 is configured to be capable of being opened and closed about an opening and closing shaft provided in the housing along the X direction. In the example illustrated in FIG. 22A, the discharge tray 26 is in a closed state, and a recording medium discharged from the discharge port 81 is discharged onto the discharge tray 26 in this state. In the example illustrated in FIG. 22B, the discharge tray 26 is in an open state, and a replenishment port 114 of the toner receiving unit 110 is exposed in this state. In other words, in this configuration example, the discharge tray 26 also functions as a shutting member that shuts off the replenishment port 114. The user can connect the replenishment pack 210 to the toner receiving unit 110 by lifting and opening the discharge tray 26 as illustrated in FIG. 22B, and inserting the nozzle 212 of the replenishment pack 210 into the exposed replenishment port 114, as illustrated on the left in FIG. 23.

Figure 23:
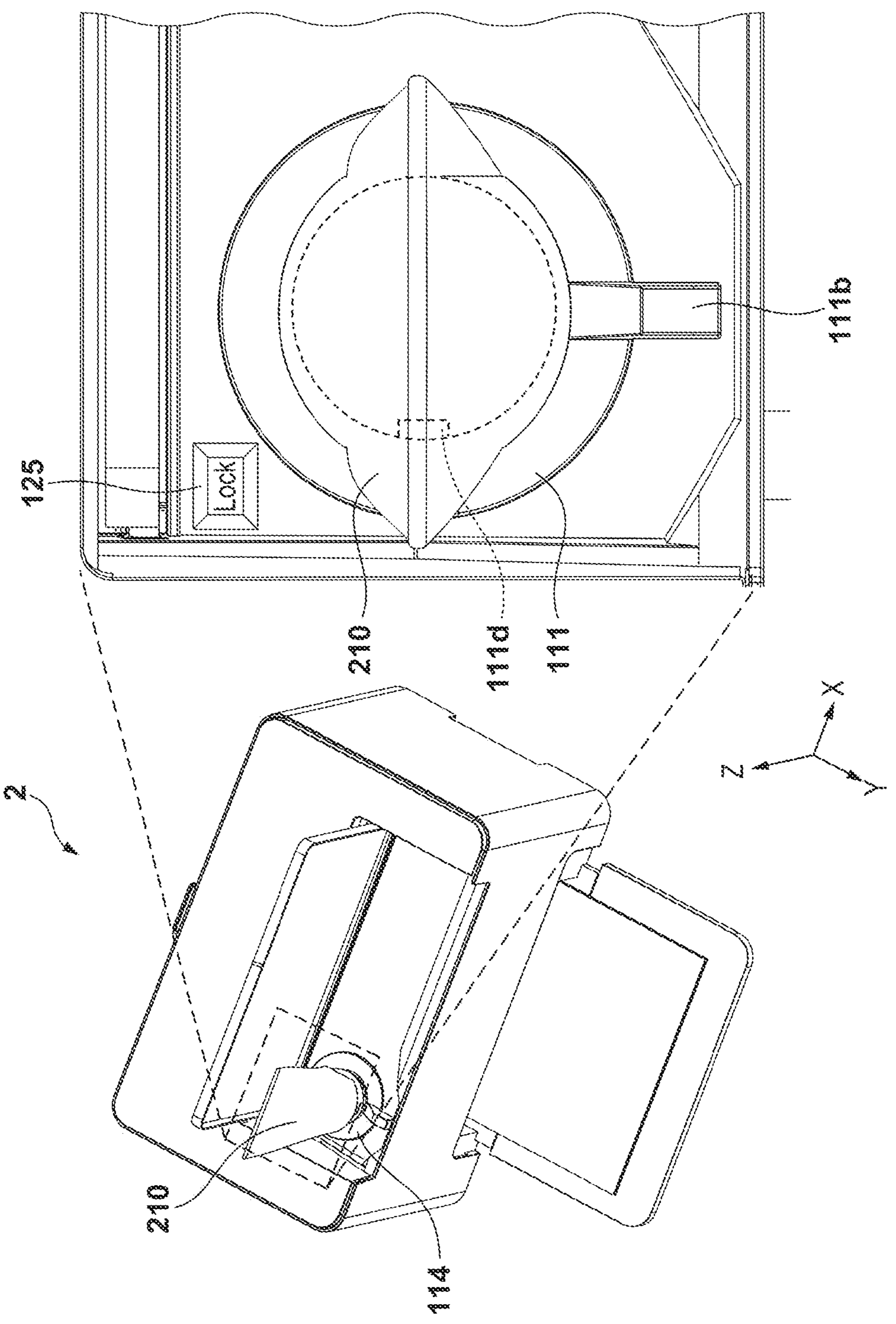
FIG. 23 is an explanatory diagram illustrating a state in which a replenishment pack is connected to a toner receiving unit.

The right side of FIG. 23 illustrates an enlarged view of a state in which the replenishment pack 210 is connected to the toner receiving unit 110. The ring member 111 surrounding the periphery of the replenishment port 114 is rotatably supported on the top surface of the cylindrical member 112. The ring member 111 has a lever 111*b* that is gripped by the user, and a protruding part 111*d* indicated by a dotted line in the figure. The protruding part 111*d* engages with the drive transmission surface 214*b* of the pack shutter 214 in the replenishment pack 210 inserted into the toner receiving unit 110. The drive transmission surface 214*b* also engages with the protruding part 117 of the main body shutter 116 (see FIG. 19). When the user manipulates the lever 111*b* to rotate the ring member 111 around a center axis, force produced in the rotational direction is transmitted from the protruding part 111*d* to the drive transmission surface 214*b* of the pack shutter 214, and further from the drive transmission surface 214*b* to the protruding part 117 of the main body shutter 116. As a result, the main body shutter 116 and the pack shutter 214 of the replenishment pack 210 can rotate in tandem with the ring member 111, and for example, the toner replenishment path can be opened after 90 degrees of rotation. When the replenishment path is opened, the toner contained in the containing part 211 of the replenishment pack 210 is injected into the toner receiving unit 110 from the opening 213 in the nozzle 212, and the preserving unit 48 is replenished with the toner through the connecting member 120. Note that the rotation of the ring member 111 can be restricted by a restricting member (not shown) such that a rotation exceeding a predetermined upper limit angle is not performed.

Although the above describes an example in which the toner replenishment path is opened by the force in the direction of rotation produced when the user manipulates the lever 111*b*, the replenishment path may be closed and opened without relying on user operations. As an example, the image-forming apparatus 2 may include a pack sensor that detects the replenishment pack 210 being connected to the toner receiving unit 110, and a drive motor that generates driving force for rotating the ring member 111. In this example, the processing circuit 90 may activate the drive motor and rotate the ring member 111 with the rotational force of the drive motor to open the replenishment path under the condition that the replenishment pack 210 being connected to the toner receiving unit 110 has been detected by the pack sensor.

The opening and closing mechanism for opening and closing the replenishment path is not limited to the mechanism that uses the rotation of the shutter as described above. Instead of a rotating shutter, a shutter that is movable in a linear direction may be employed, or a mechanism different from a shutter, such as a valve, may be employed. It is sufficient for the opening and closing mechanism to be provided in at least one of the container device, such as the replenishment pack 210, and the image-forming apparatus. In other words, the replenishment path from the container device to the image-forming apparatus may always be open in one of the container device and the image-forming apparatus, and may be opened and closed only in the other. Alternatively, the replenishment path may be opened and closed by both the container device and the image-forming apparatus, as in the example described above. In addition, a sensor for detecting a user's operation on the opening and closing mechanism or detecting the state of the opening and closing mechanism (the open state or the closed state) may be provided as well.

The action of the opening and closing mechanism (either by a user operation or automatically) described above can be inhibited by a locking mechanism, which will be described below. Like the opening and closing mechanism, it is sufficient for the locking mechanism to be provided in at least one of the container device and the image-forming apparatus. The replenishment port 114 of the image-forming apparatus 2 or the opening 213 of the replenishment pack 210 may be equipped with to a leak prevention member, such as a lid or a cap, to prevent the toner from leaking. Such a leak prevention member may be freely removable by the user.

<2-1-5. Locking and Unlocking of Opening and Closing Mechanism>

Figure 24A:
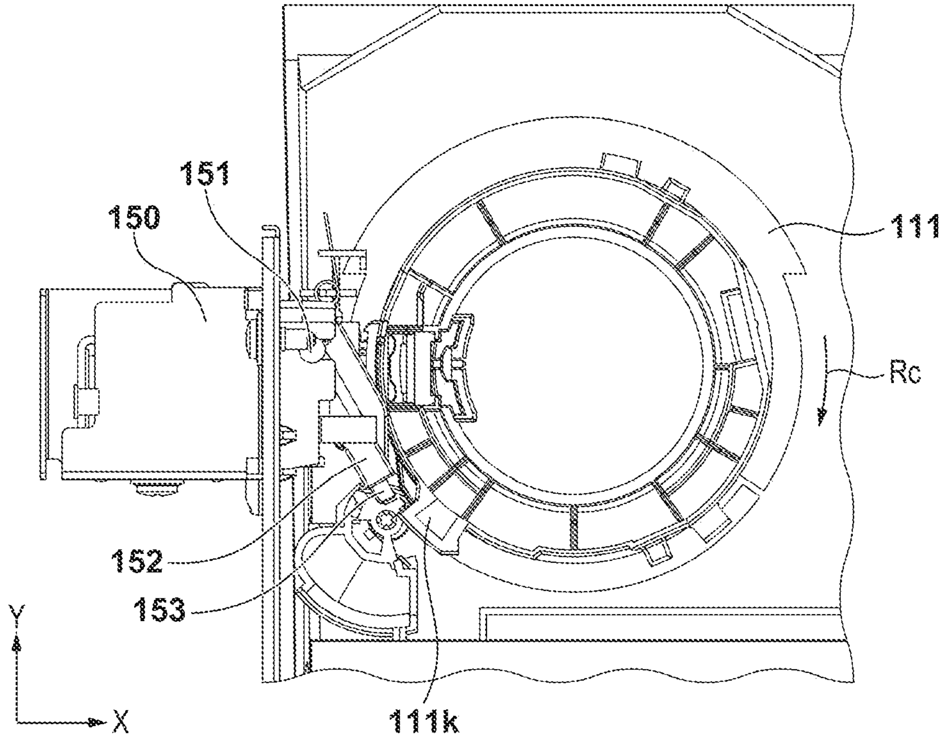
FIG. 24A is a first explanatory diagram illustrating an example of a locking mechanism for locking the action of an opening and closing mechanism.
Figure 24B:
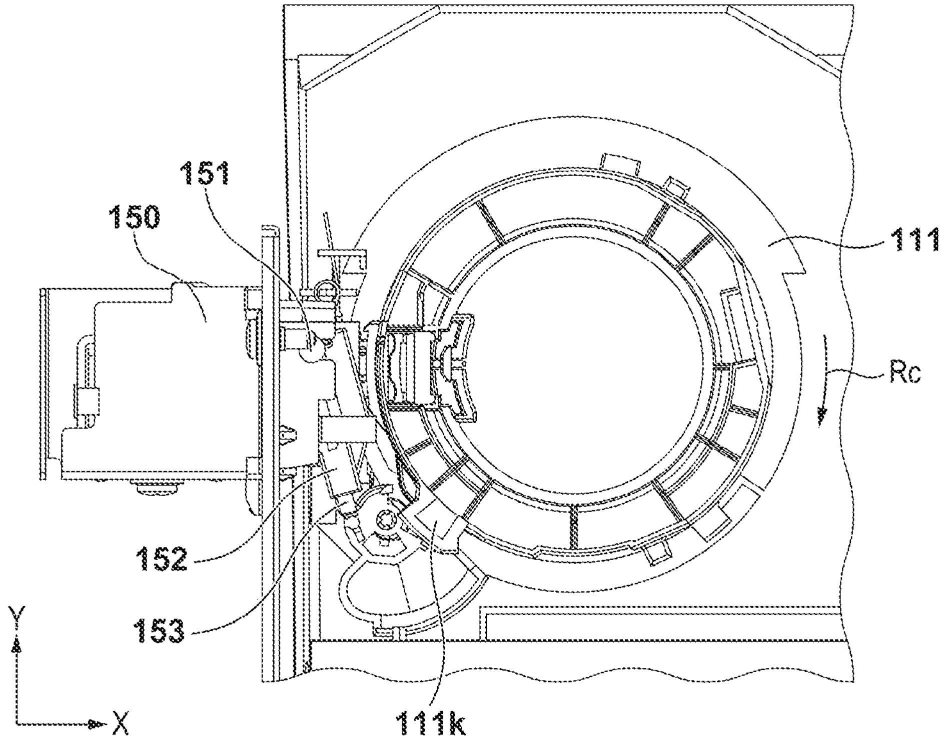
FIG. 24B is a second explanatory diagram illustrating an example of the locking mechanism for locking the action of the opening and closing mechanism.

The ring member 111 of the image-forming apparatus 2 may be locked so as not to rotate even if the user applies a force thereto. FIGS. 24A and 24B are explanatory diagrams illustrating an example of a locking mechanism for locking the rotation of the ring member 111. These explanatory diagrams illustrate the toner receiving unit 110 from the inside of the apparatus (toward the Z direction) such that an example of the configuration within the toner receiving unit 110 can be understood in more detail. The toner receiving unit 110 includes, for example, a locking unit 150. The locking unit 150 has a rod-shaped locking member 152, which is supported at one end by a shaft 151 and is capable of pivoting about the shaft 151. The ring member 111 has a protrusion 111*k*. The locking member 152 is normally biased, by the elastic force of a spring (not shown) within the locking unit 150, in a direction in which a tip 153 on the side opposite from the shaft 151 moves away from the locking unit 150, which positions the tip 153 on the rotational trajectory of the protrusion 111*k* of the ring member 111. Accordingly, even if the user attempts to rotate the ring member 111 in the what is the clockwise direction in the figure (the direction Rc in the figure), the tip 153 of the locking member 152 obstructs the protrusion 111*k*, which inhibits the rotation of the ring member 111, i.e., locks the opening and closing mechanism of the replenishment path in the closed state (see FIG. 24A).

The locking unit 150 further includes a solenoid (not shown) for, for example, pivoting the locking member 152 in a direction opposite from the elastic force of the spring. The solenoid is temporarily energized during the period when the replenishment of the toner from the replenishment pack 210 to the image-forming apparatus 2 is permitted, and the locking member 152 is rotated by the attraction force thereof. When the solenoid is energized and the locking member 152 rotates, the tip 153 of the locking member 152 retracts from the rotational trajectory of the protrusion 111*k* of the ring member 111 (see FIG. 24B). As a result, the user can rotate the ring member 111 in what is the clockwise direction in the figure, i.e., the opening and closing mechanism of the replenishment path is unlocked. The locking and unlocking of such an opening and closing mechanism can be controlled by the processing circuit 90. Various examples of the conditions under which the opening and closing mechanism is unlocked will be described in the following sections.

Note that the configuration of the locking mechanism that locks and unlocks the opening and closing mechanism is not limited to the example described above, and may be any mechanical, electromagnetic, electrical, or software-based mechanism. For example, the locking member 152 may be driven by a motor or other type of actuator rather than a solenoid. If an opening and closing mechanism activated by computer control is employed rather than relying on operations made by the user, the locking and unlocking of the opening and closing mechanism may be realized simply by a certain program code.

As illustrated on the right side of FIG. 23, an indicator 125 is provided in the vicinity of the ring member 111. The indicator 125 indicates to the user whether the state of the opening and closing mechanism described above is the locked state or the unlocked state. The indicator 125 may be constituted by, for example, a light-emitting diode (LED) disposed within the housing and a window that transmits light from the LED. When the indicator 125 indicates that the opening and closing mechanism is in the unlocked state, the user can rotate the ring member 111 to open the replenishment path.

<2-2. Device Management System>

The replenishment-type image-forming apparatus described in PTL 1 determines whether to start replenishing the toner from the container device connected to the image-forming apparatus as a result of local authentication. However, with simple local authentication, it is only possible to verify the compatibility between the image-forming apparatus and the container device, and it is difficult to permit or inhibit the replenishment considering other conditions, such as whether replenishment is being performed by a registered user based on a given contract, for example. In replenishment-type image-forming apparatuses, which are attracting attention due to their low costs and small environmental impact, expanding the conditions for verification through local authentication leads to a more complex and expensive device, which may defeat the original purpose of the replenishment-type apparatus. Accordingly, in the second embodiment described in this section, the management server 301 and the user terminal 401 described in connection with the first embodiment are used to manage the replenishment of the consumable agent in the image-forming apparatus 2.

<2-2-1. System Overview>

Figure 25:
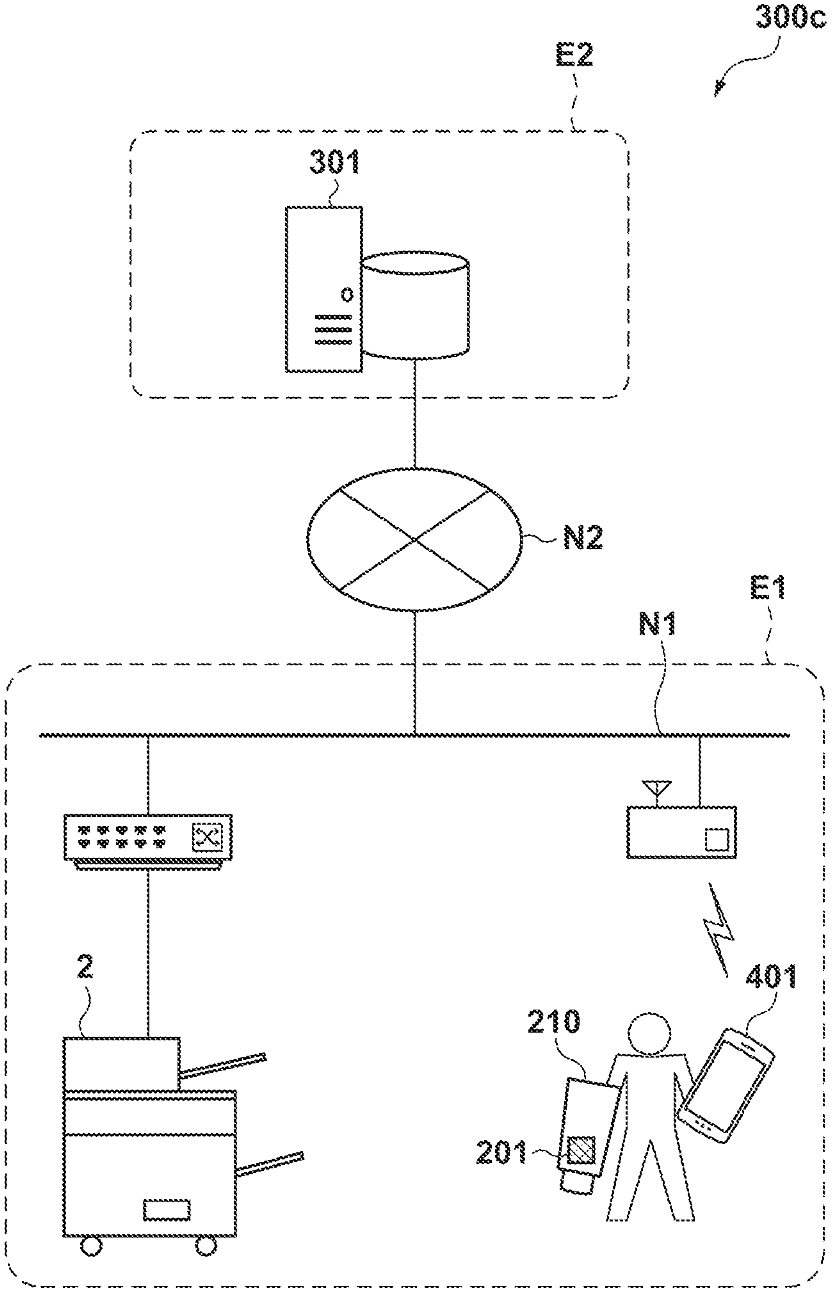
FIG. 25 is a schematic diagram illustrating an example of the configuration of a device management system according to the second embodiment.

FIG. 25 is a schematic diagram illustrating an example of the configuration of a device management system 300*c* according to the second embodiment. Referring to FIG. 25, the device management system 300*c* includes the image-forming apparatus 2, the management server 301, and the user terminal 401.

The image-forming apparatus 2 is installed in the user environment E1 in which a user is present. The image-forming apparatus 2 and the user terminal 401 are connected to the local network N1. The management server 301 is installed in the remote environment E2. The remote environment E2 is connected to the local network N1 via the external network N2.

The user uses the image-forming apparatus 2 in the user environment E1. As described above, the image-forming apparatus 2 forms an image on a recording medium by consuming toner, which serves as a consumable agent. When the toner preserved in the image-forming apparatus 2 is depleted, the user connects the replenishment pack 210, which is a container device that contains the toner, to the image-forming apparatus 2, and replenishes the toner into the image-forming apparatus 2 from the replenishment pack 210. If the replenishment pack 210 is empty and there is no spare replenishment pack 210 in the user environment E1, the image-forming apparatus 2 cannot be used the next time the toner is depleted. In the present embodiment, the management server 301 remotely manages the usage status of the image-forming apparatus 2 and the replenishment pack 210 by each user in order to prevent such a situation from arising.

In the present embodiment too, each replenishment pack 210 is provided with a unique code 201 for uniquely identifying that replenishment pack 210. For example, the code 201 is printed on the surface of the containing part 211 of the replenishment pack 210, or on the package of the replenishment pack 210, in a format that can be read visually by the user or optically by the user terminal 401. The code 201 read by the user or by the user terminal 401 can be sent to the management server 301 and used to manage the replenishment.

<2-2-2. Example of Configuration of Management Server>

The configuration of the management server 301 according to the present embodiment may be similar to the configuration described with reference to FIG. 5. For example, the management DB 313 of the management server 301 includes the account table 320, the apparatus registration table 330, and the delivery management table 340 as tables for managing the replenishment of the consumable agent for one or more image-forming apparatuses being managed by the device management system 300*c*. The term "cartridge" in the descriptions pertaining to these tables in the first embodiment may be replaced with "pack", "device", or the like as appropriate in the present embodiment. For example, in the present embodiment, the delivery management table 340 includes an information item called "Pack ID" instead of "Cartridge ID".

As in the first embodiment, the processing circuit 314 of the management server 301 can function as the data management unit 350, the provision management unit 360, and the authentication unit 370.

As in the first embodiment, the data management unit 350 manages registration and updating of data in the management DB 313. For example, the data management unit 350 manages the registration of the account information in the account table 320, the registration of the apparatus information in the apparatus registration table 330, the verification of the registered apparatus information, and the updating of the value of "Remaining Amount of Toner" in the apparatus registration table 330.

The provision management unit 360 manages provision of replenishment packs 210 to users of the device management system 300*c*. For example, the provision management unit 360 monitors occurrence of a trigger event that triggers provision of a replenishment pack 210 to a user. Examples of trigger events that trigger the provision of the replenishment pack 210 may be similar to the examples of the trigger events that trigger the provision of the cartridge 200 described in the first embodiment.

In addition to user authentication when the user logs in to the system, the authentication unit 370 performs authentication for permitting replenishment for the replenishment pack 210 from which the user is attempting to replenish the toner (called "pre-replenishment authentication" hereinafter). The pre-replenishment authentication may include a determination as to whether the replenishment pack 210 can be permitted to be used (e.g., whether the replenishment pack 210 has been provided to the user through a legitimate route). In the present embodiment, as described with reference to FIG. 25, each replenishment pack 210 is provided with a specific code 201 for uniquely identifying that replenishment pack 210. The authentication unit 370 receives the code of the replenishment pack 210 that is to be used from code obtaining means present in the user environment E1, and it performs the pre-replenishment authentication based on the received code. As an example, the code 201 may be equivalent to a Pack ID of each replenishment pack 210, in which case the authentication unit 370 can use the received code as-is for the pre-replenishment authentication. As another example, the code 201 may be generated by encoding the Pack ID of each replenishment pack 210, in which case the authentication unit 370 can use the Pack ID derived by decoding the code 201 for the pre-replenishment authentication.

The pre-replenishment authentication may be performed in the same manner as the pre-insertion authentication described in connection with the first embodiment. Specifically, the pre-replenishment authentication may include a determination as to whether the replenishment pack 210 identified based on the code 201 has correspondence with the user account of the logged-in user. For example, the authentication unit 370 checks whether there is an association between the Pack ID based on the code 201 and the user ID of the logged-in user registered in the delivery management table 340. If there is the association registered in the delivery management table 340, the authentication unit 370 can determine that the replenishment pack 210 to be used for the replenishment has correspondence with the user account of the user attempting to perform the replenishment. Verifying the correspondence between the replenishment pack 210 and the user account in this manner makes it possible to prevent a replenishment pack 210 obtained without a contract from being used to replenish the consumable agent.

In addition to or instead of this, the pre-replenishment authentication may include a determination as to whether the image-forming apparatus 2 to be replenished with the consumable agent has correspondence with the user account of the logged-in user. For example, the authentication unit 370 presents a message to the user who attempts to perform the replenishment, prompting the user to perform a predetermined operation in the image-forming apparatus 2 which is to be replenished. Here, too, the predetermined operation may be, for example, pressing a particular physical button of the image-forming apparatus 2 or touching a button on a GUI. When the user performs the prompted operation in the image-forming apparatus 2, the image-forming apparatus 2 sends the apparatus ID that identifies that apparatus itself to the management server 301. The authentication unit 370 stands by to receive the apparatus ID from the image-forming apparatus 2 until a predetermined period of time has passed following the presentation of the aforementioned message. Then, the authentication unit 370 checks whether there is an association between the apparatus ID received from the image-forming apparatus 2 prior to a timeout and the user ID of the logged-in user registered in the apparatus registration table 330. If there is an association registered in the apparatus registration table 330, the authentication unit 370 can determine that the image-forming apparatus 2 which is to be replenished has correspondence with the user account of the logged-in user. Taking the replenishment target apparatus having been registered as the user's apparatus as a condition for the authentication to succeed in this manner makes it possible to facilitate registration of apparatus information in the database. In addition, by receiving the apparatus ID from the image-forming apparatus 2, the management server 301 can reliably recognize the apparatus for which the user is attempting to replenish the toner, and can send control commands (e.g., an unlock command or an open command, which will be described below) to that replenishment target apparatus thereafter.

The authentication unit 370 may receive remaining amount information indicating the latest remaining amount of toner along with the apparatus ID from the image-forming apparatus 2 in response to the aforementioned predetermined operation. Then, the authentication unit 370 may reject the replenishment of toner in the image-forming apparatus 2 if the received remaining amount information indicates that a sufficient amount of toner remains. This makes it possible to prevent the image-forming apparatus 2 from being replenished with excessive toner.

In addition to or instead of this, the pre-replenishment authentication may include a determination as to whether the replenishment pack 210 identified based on the code 201 has already been used based on the value of "Status" in the delivery management table 340. For example, the authentication unit 370 can refer to the record of the pack ID based on the code 201 in the delivery management table 340 and permit the replenishment pack 210 to be used for replenishment if the value of "Status" is "Unused". On the other hand, the authentication unit 370 can reject the use of the replenishment pack 210 for replenishment if the value of "Status" in the referenced record is "Used". Taking the replenishment pack 210 being unused as a condition for the authentication to succeed in this manner makes it possible to prevent the unauthorized or accidental reuse of the replenishment pack 210.

In addition to or instead of this, the pre-replenishment authentication may include a determination as to whether the replenishment pack 210 identified based on the code 201 is a genuine product compatible with the replenishment target apparatus. To determine whether a product is genuine, the apparatus registration table 330 may include a model number for each image-forming apparatus, and the delivery management table 340 may include a model number for each replenishment pack, as additional data items. Additionally, the management DB 313 may include an additional table indicating model numbers of one or more replenishment packs that match for each image-forming apparatus model number. In this case, the authentication unit 370 may permit a replenishment pack 210 to be used for replenishment only when respective model numbers of the replenishment target apparatus and the replenishment pack 210 are determined to be compatible with each other.

As described above, at least one of the replenishment pack 210 and the image-forming apparatus 2 includes the opening and closing mechanism capable of opening and closing the consumable agent replenishment path. The opening and closing mechanism is normally locked by the locking mechanism so as not to open. When the above-described pre-replenishment authentication is successful, the authentication unit 370 sends a result indicating that the authentication is successful to the image-forming apparatus 2 through the communication OF 311, and causes the image-forming apparatus 2 to enable the replenishment path to be opened by the opening and closing mechanism (i.e., causes the locking mechanism to unlock the opening and closing mechanism). Note if the opening and closing mechanism is activated by computer control rather than relying on user operations in the image-forming apparatus 2, the authentication unit 370 may cause the opening and closing mechanism of the image-forming apparatus 2 to open the consumable agent replenishment path, instead of unlocking the opening and closing mechanism. The unlock command (or the open command) to the image-forming apparatus 2 may be sent directly from the management server 301 to the image-forming apparatus 2. Alternatively, the user terminal 401 that has received the result indicating that the authentication is successful from the management server 301 may send the unlock command (or the open command) to the image-forming apparatus 2. When the pre-replenishment authentication fails due to any of the above-described conditions not being met, the authentication unit 370 sends a result indicating that the authentication has failed to the image-forming apparatus 2 or the user terminal 401 through the communication OF 311. The authentication unit 370 may cause a message indicating the cause of the authentication failure (e.g., an unauthorized pack, an unregistered apparatus, or a used pack) to be displayed in the screen of any of the apparatuses.

When the opening and closing mechanism is unlocked based on the authentication result, the replenishment path is opened, and the image-forming apparatus 2 is replenished with toner from the replenishment pack 210, the remaining amount of toner in the preserving unit 48 of the image-forming apparatus 2 increases. As will be described below, the image-forming apparatus 2 detects the remaining amount of toner in the preserving unit 48 and sends the remaining amount information to the management server 301. The data management unit 350 receives this remaining amount information through the communication OF 311 and updates the value of "Remaining Amount of Toner" in the apparatus registration table 330. In addition, if the received remaining amount information indicates that the remaining amount of toner has increased, the data management unit 350 changes "Status" for the replenishment pack 210 in the delivery management table 340 to "Used". Accordingly, it is possible for the authentication unit 370 to not permit the replenishment pack 210 to be reused based on the status information if an attempt is made to reuse the same replenishment pack 210 thereafter. In addition, the provision management unit 360 can assign a new replenishment pack 210 to the user in response to the use of the replenishment pack 210 being detected.

<2-2-3. Example of Configuration of User Terminal>

The configuration of the user terminal 401 according to the present embodiment may be similar to the configuration described with reference to FIG. 8. For example, the processing circuit 416 of the user terminal 401 can function as the apparatus control unit 420, the code obtainment unit 430, and the application unit 440. Although only the functions related to managing the replenishment of the image-forming apparatus 2 with the consumable agent are mainly described here, the processing circuit 416 may also provide the user with a variety of other functions that a user terminal generally includes.

As in the first embodiment, the apparatus control unit 420 controls image forming and other operations performed by the image-forming apparatus 2. For example, the apparatus control unit 420 detects one or more apparatuses that can be used by the user terminal 401 present in the user environment E1, and presents a list of the detected apparatuses to the user in the screen of the display device 415. The apparatus control unit 420 may obtain statuses of each apparatus (e.g., power on/off, the remaining amount of toner, and the like) and present the obtained statuses to the user. When an image-forming apparatus 2 is selected by the user and printing is instructed, the apparatus control unit 420 sends a print job including image data of an image to be printed to the image-forming apparatus 2, and causes the image-forming apparatus 2 to print the image.

The code obtainment unit 430 obtains a code 201 specific to a replenishment pack 210 that the user attempts to use for replenishing the consumable agent. As an example, the code obtainment unit 430 may optically read the code 201 using the camera 413 if the code 201 is an optically-readable code printed on the replenishment pack 210 or a package thereof. As another example, if the code 201 is a code that can be read by a human, the code obtainment unit 430 may allow the user to input the code 201 using the input device 414 and obtain the input code 201.

The application unit 440 can be an application for device management that runs in cooperation with the management server 301. For example, as in the first embodiment, the application unit 440 accepts the input of account information or apparatus information, and it sends the accepted information to the management server 301 via the communication I/F 411.

The application unit 440 may also provide a user interface for requesting the management server 301 to execute the pre-replenishment authentication to a user who wishes to replenish the image-forming apparatus 2 with the consumable agent from the replenishment pack 210. For example, when the user operates a button for making an authentication request, the application unit 440 activates the code obtainment unit 430 and causes it to obtain the code specific to the replenishment pack 210, and it sends the obtained code 201 to the management server 301 through the communication OF 411. The application unit 440 may send the code 201 to the management server 301 as part of a request for permission to replenish the consumable agent. Alternatively, the application unit 440 may send the code 201 to the management server 301 as part of a request to open the replenishment path (or unlock the opening and closing mechanism).

In an example, the application unit 440 may send a sending request to the image-forming apparatus 2 to send the apparatus ID required for pre-replenishment authentication by the management server 301 to the management server 301. In another example, the application unit 440 may cause the display device 415 to display a message prompting the user to perform an operation in the image-forming apparatus 2 for sending the apparatus ID.

When the pre-replenishment authentication is performed by the management server 301 based on the code 201 specific to the replenishment pack 210, the application unit 440 receives the result of the pre-replenishment authentication from the management server 301. If the authentication result indicates that the pre-replenishment authentication is successful, the application unit 440 may cause the apparatus control unit 420 to send an unlock command for unlocking the opening and closing mechanism, or an open command for opening the replenishment path, to the image-forming apparatus 2. Note that if these commands are sent directly to the image-forming apparatus 2 from the management server 301, the user terminal 401 need not send the commands to the image-forming apparatus 2.

The application unit 440 causes the display device 415 to display the result of the pre-replenishment authentication received from the management server 301. For example, if the result of the pre-replenishment authentication indicates that the authentication is successful, the user can connect the replenishment pack 210 to the image-forming apparatus 2, open the consumable agent replenishment path by operating the opening and closing mechanism that has been blocking the replenishment path, and replenish the image-forming apparatus 2 with the consumable agent from the replenishment pack 210. At this time, the opening and closing mechanism is unlocked by the image-forming apparatus 2, and thus the user is not inhibited from performing an operation to open the replenishment path. Note that the replenishment pack 210 may be connected to the image-forming apparatus 2 before the request for the pre-replenishment authentication, or after the authentication is successful. As described above, the image-forming apparatus 2 may automatically activate the opening and closing mechanism instead of the user operating the opening and closing mechanism. If the result of the pre-replenishment authentication indicates that the authentication has failed, the user retries the pre-replenishment authentication after taking appropriate measures, or gives up on replenishing the consumable agent for the time being, depending on the cause of the failure, which can be displayed on the screen. At this time, the opening and closing mechanism remains locked by the image-forming apparatus 2, or the opening and closing mechanism is not automatically activated and the replenishment path remains blocked.

<2-2-4. Example of Configuration of Image-Forming Apparatus>

Figure 26:
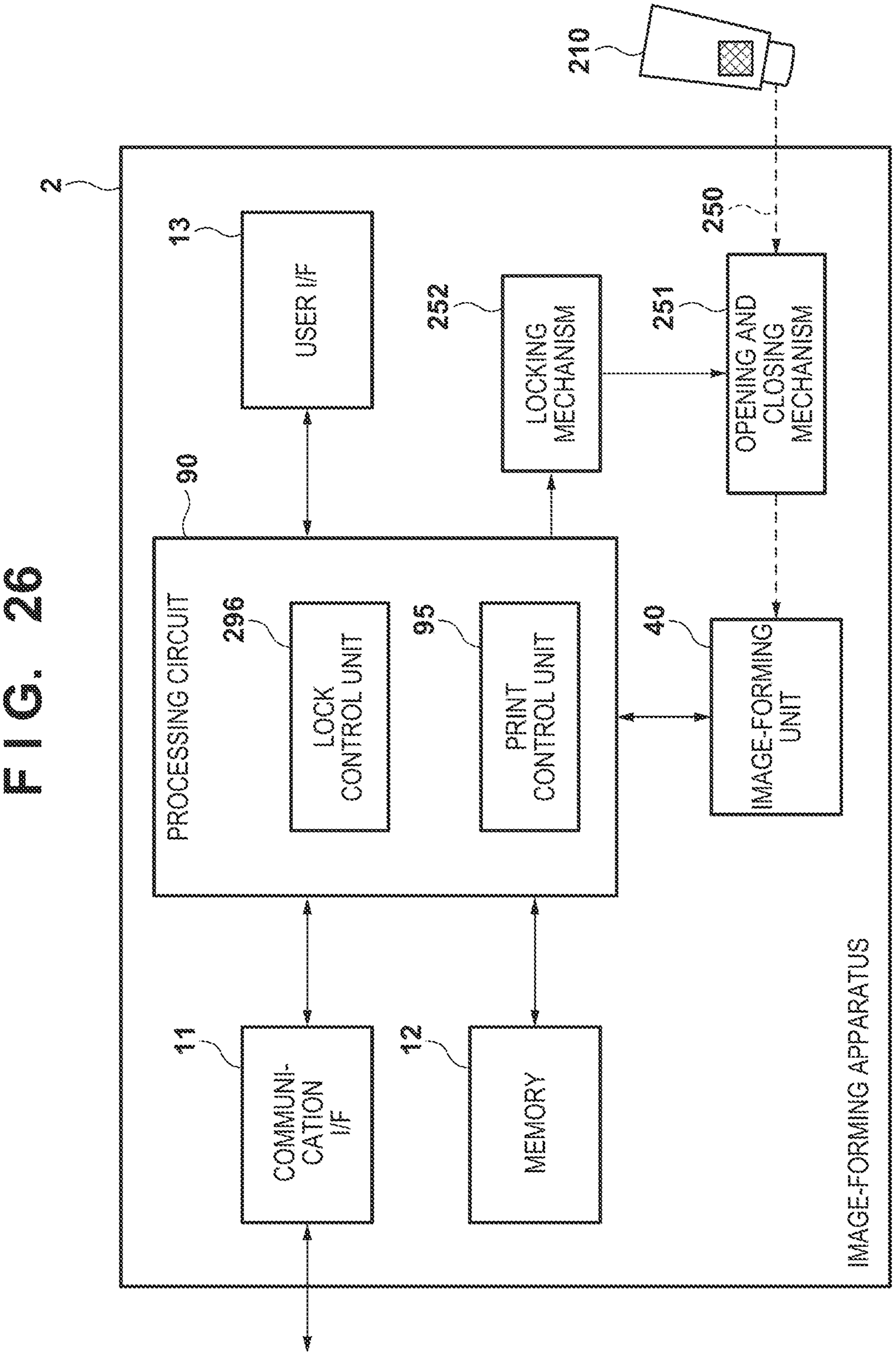
FIG. 26 is a block diagram illustrating an example of the functional configuration of the image-forming apparatus according to the second embodiment.

FIG. 26 is a block diagram illustrating an example of the functional configuration of the image-forming apparatus 2 according to the present embodiment. Referring to FIG. 26, the image-forming apparatus 2 includes the communication OF 11, the memory 12, the user I/F 13, the image-forming unit 40, an opening and closing mechanism 251, a locking mechanism 252, and the processing circuit 90.

In the present embodiment, the image-forming unit 40 forms an image on a recording medium by consuming toner preserved in the preserving unit 48. The opening and closing mechanism 251 is a mechanism that can open and close a replenishment path 250 to the preserving unit 48 from the replenishment pack 210 connected to the toner receiving unit 110. The above-described ring member 111 including the lever 111*b* and the protruding part 111*d*, the pack shutter 214 of the replenishment pack 210, and the main body shutter 116 are an example of the opening and closing mechanism 251. The locking mechanism 252 is a mechanism for inhibiting (i.e., locking) and canceling the inhibiting (unlocking) the operation of the opening and closing mechanism 251 performed by the user or the automatic action of the opening and closing mechanism 251. The above-described locking unit 150 is an example of the locking mechanism 252.

From a functional perspective, the processing circuit 90 of the image-forming apparatus 2 can function mainly as the print control unit 95 and a lock control unit 296. The lock control unit 296 controls the locking and unlocking of the opening and closing mechanism 251 by the locking mechanism 252. For example, when a predetermined input signal is detected, the lock control unit 296 sends the apparatus ID stored in the memory 12 to the management server 301. The apparatus ID sent to the management server 301 may be used to verify whether the image-forming apparatus 2 identified by the apparatus ID specified by the user for apparatus registration is actually installed in the user environment E1 of that user. The apparatus ID sent to the management server 301 may be used for the execution of the pre-replenishment authentication by the management server 301. The lock control unit 296 may send the remaining amount information indicating the latest remaining amount of toner to the management server 301 along with the apparatus ID.

In an example, the aforementioned input signal that triggers the sending of the apparatus ID is a received signal (e.g., a sending request requesting the apparatus ID to be sent) received from the user terminal 401 via the communication OF 11. In this case, in response to the sending request being received, the lock control unit 296 reads out the apparatus ID from the memory 12 and sends the read-out apparatus ID to the management server 301. In another example, the aforementioned input signal that triggers the sending of the apparatus ID is a user input signal (e.g., an operation signal indicating that a predetermined button has been operated) detected via the user I/F 13. In this case, in response to the user input signal being detected, the lock control unit 296 reads out the apparatus ID from the memory 12 and sends the read-out apparatus ID to the management server 301.

After sending the apparatus ID to the management server 301 for the pre-replenishment authentication, the lock control unit 296 waits for reception of an unlock command, which is a control signal based on the result of the pre-replenishment authentication, over a predetermined standby period. Then, if the unlock command is received before the standby period expires, the lock control unit 296 causes the locking mechanism 252 to unlock the opening and closing mechanism 251 in accordance with the unlock command. For example, the lock control unit 296 may energize the solenoid of the locking unit 150 to pivot the locking member 152 as in the example illustrated in FIG. 24B. This makes it possible for the user to open the replenishment path 250 by rotating the main body shutter 116 and the pack shutter 214 of the replenishment pack 210 along with the ring member 111. Note that if a configuration is employed in which the image-forming apparatus 2 automatically activates the opening and closing mechanism 251, the lock control unit 296 may stand by for the reception of an open command instead of an unlock command, and open the replenishment path 250 by activating the opening and closing mechanism 251 in accordance with the received open command.

If the standby period expires without the unlock command or the open command being received (i.e., in the case of a timeout), the lock control unit 296 stops standing by for the command. For example, the standing-by for the unlock command or the open command may be done by temporarily opening a particular receiving port of the communication OF 11. The risk of unauthorized operation of the image-forming apparatus 2 by a malicious third party can be minimized by standing by for a control signal from the outside only for a limited period of time that is triggered by detection of a predetermined input signal. In addition, power consumed by the image-forming apparatus 2 can be reduced by putting the image-forming apparatus 2 into a sleep state during periods aside from the standby period.

If the unlock command or the open command is received before expiry of the standby period, the lock control unit 296 may keep the opening and closing mechanism 251 in the unlocked state for a predetermined unlocked period following the reception of the command, and lock the opening and closing mechanism 251 again after the unlocked period expires. In the example illustrated in FIGS. 24A and 24B, even if the energizing of the solenoid is ended while the opening and closing mechanism 251 is in the open state, the ring member 111 can be rotated counterclockwise. For example, after the opening and closing mechanism 251 is unlocked, the user rotates the ring member 111 in what is the clockwise direction in the figure to open the replenishment path so that the replenishment of the consumable agent is started. After the replenishment of the consumable agent is complete, the user rotates the ring member 111 counterclockwise to block the replenishment path. When the energizing of the solenoid ends and the rotational position of the ring member 111 is returned to the original position, the tip 153 of the locking member 152 returns to the position illustrated in FIG. 24A under the elastic force of the spring. As a result, even if the user attempts to open the replenishment path by rotating the ring member 111 clockwise again, the rotation of the ring member 111 is inhibited by the locking member 152. The relocking of the opening and closing mechanism 251 can be achieved in this manner. Again, note that the configuration illustrated in FIGS. 24A and 24B is merely an example of the opening and closing mechanism 251 and the locking mechanism 252, and any other configuration may be employed.

The print control unit 95 controls the remaining amount detection unit 61 to detect the remaining amount of toner in the preserving unit 48 when, for example, an image-forming operation is performed and when the consumable agent is replenished. For example, the remaining amount detection unit 61 causes light to be emitted from the light emitter 61*a* and obtains a light detection signal from the light receiver 61*b* while the toner preserved in the preserving unit 48 is being agitated by the agitation member 60. The remaining amount detection unit 61 then estimates the remaining amount of toner based on the obtained light detection signal, and it reports the estimated remaining amount of toner to the print control unit 95. The print control unit 95 reports the remaining amount information indicating the remaining amount of toner detected in this manner to the management server 301 via the communication OF 11. The report on the remaining amount of toner may be sent to the management server 301 via the user terminal 401 instead of being sent directly to the management server 301.

When the toner is replenished, the remaining amount of toner increases. As described above, detecting an increase in the remaining amount of toner based on the remaining amount information makes it possible for the management server 301 to ascertain that the replenishment pack 210 for which the pre-replenishment authentication was successful has been used by the user. Note that instead of the management server 301, the image-forming apparatus 2 or the user terminal 401 may detect the increase in the remaining amount of toner and send a notification signal indicating that the replenishment pack 210 has been used to the management server 301.

<2-3. Flow of Processing>

Figure 27:
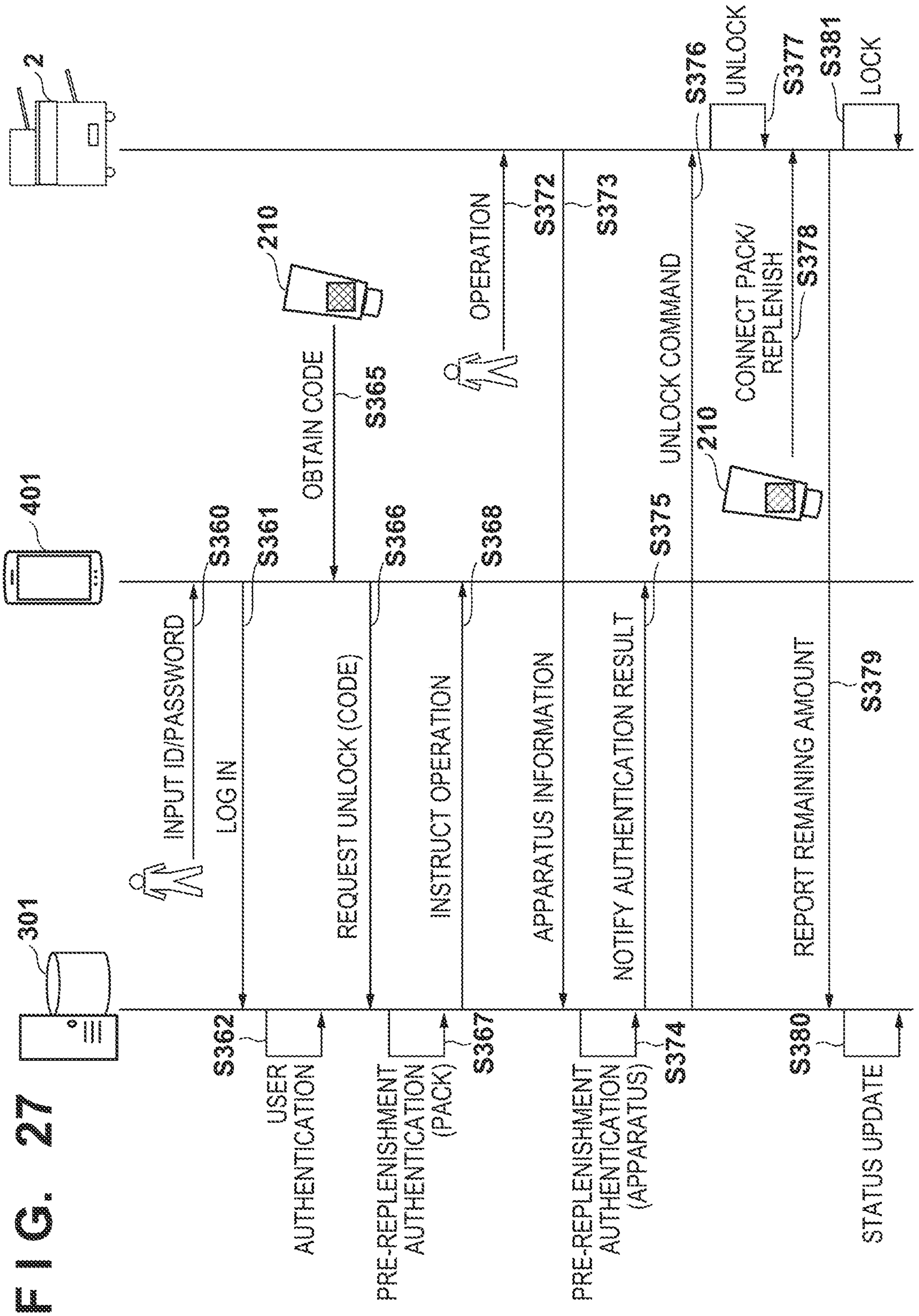
FIG. 27 is a sequence chart illustrating an example of the overall flow of processing according to a first example when replenishing a consumable agent.
Figure 28:
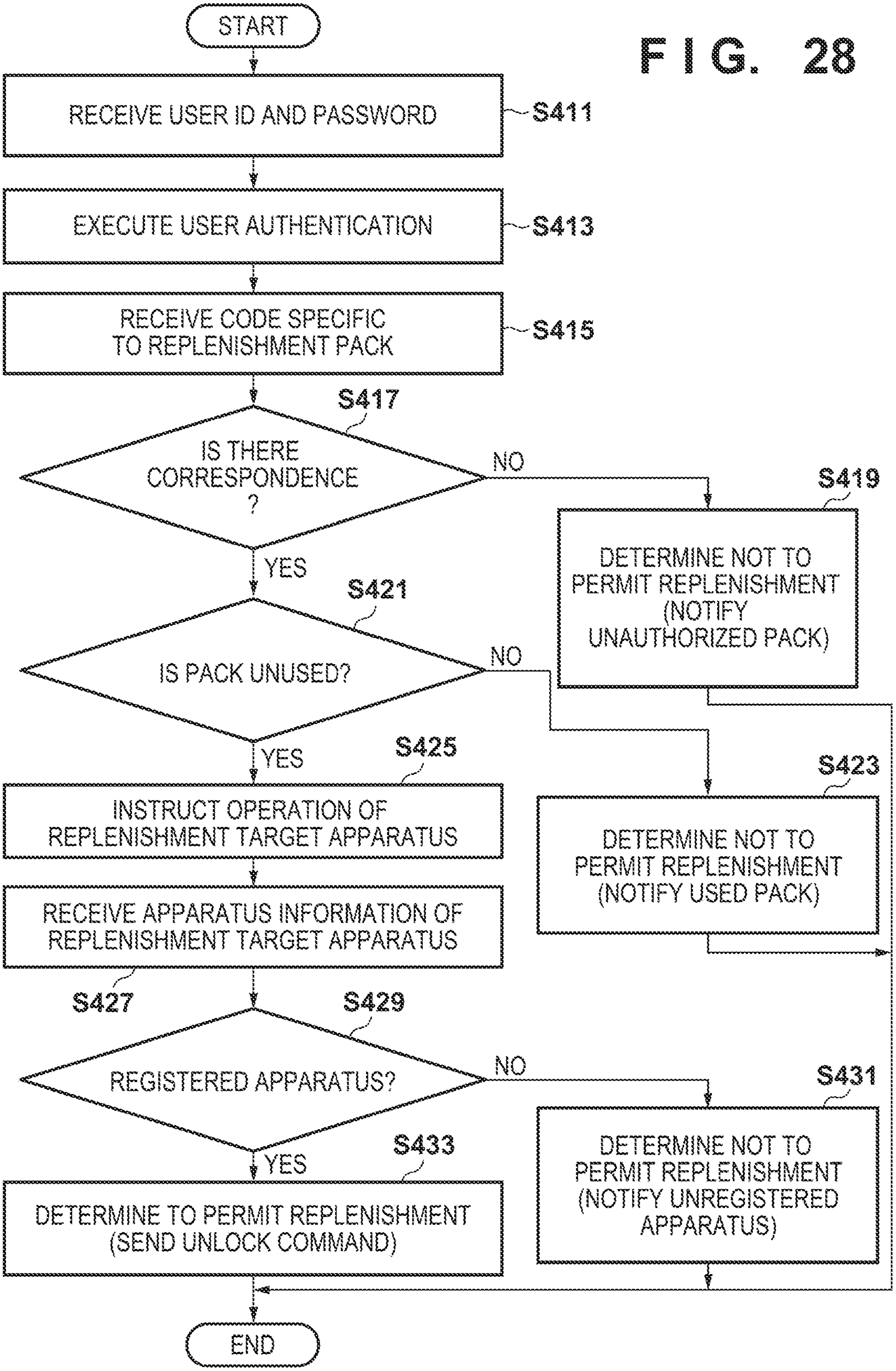
FIG. 28 is a flowchart illustrating an example of the flow of authentication processing executed by a management server according to the second embodiment.
Figure 29:
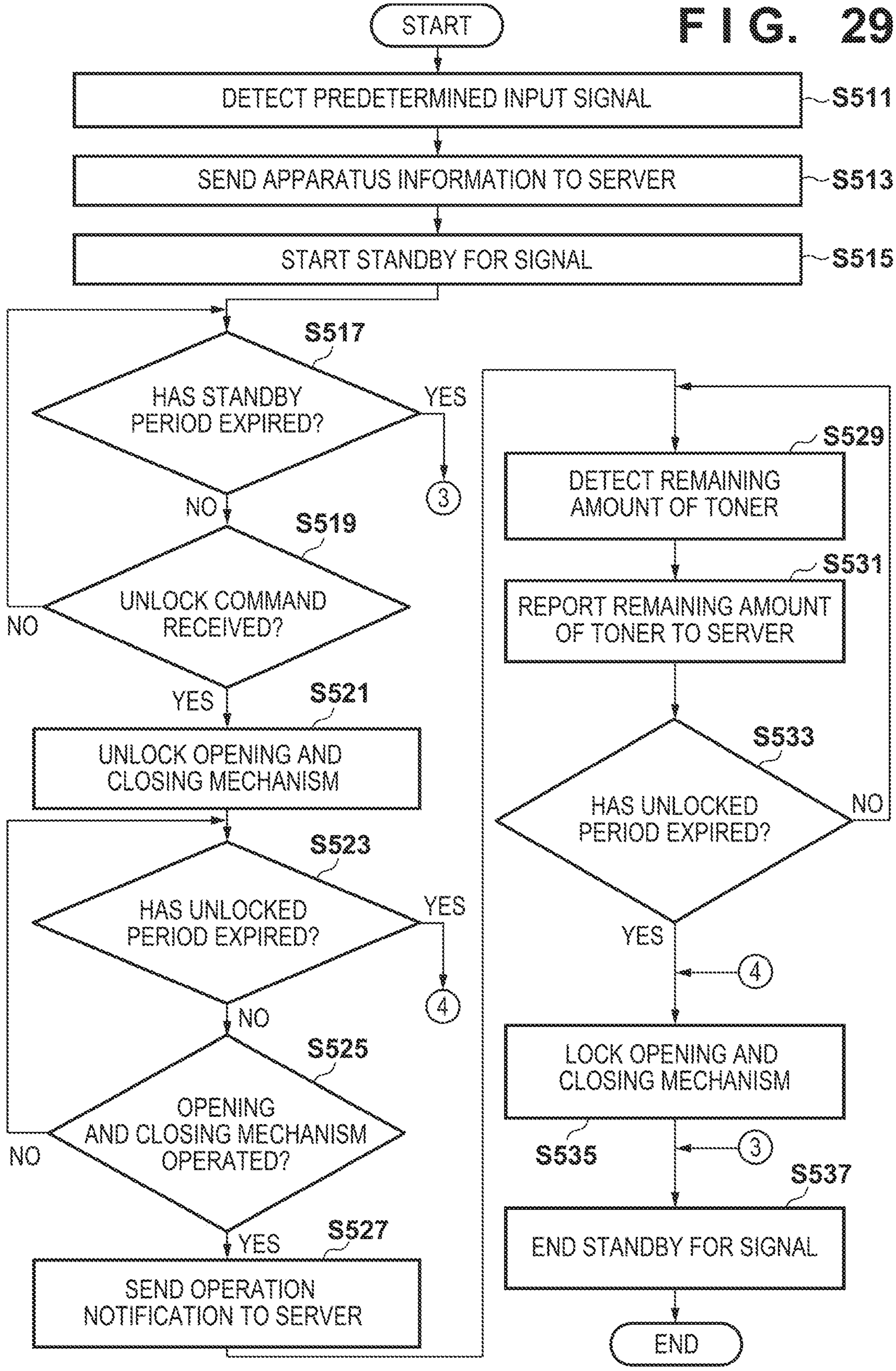
FIG. 29 is a flowchart illustrating an example of the flow of lock control processing executed by the image-forming apparatus according to the second embodiment.
Figure 30:
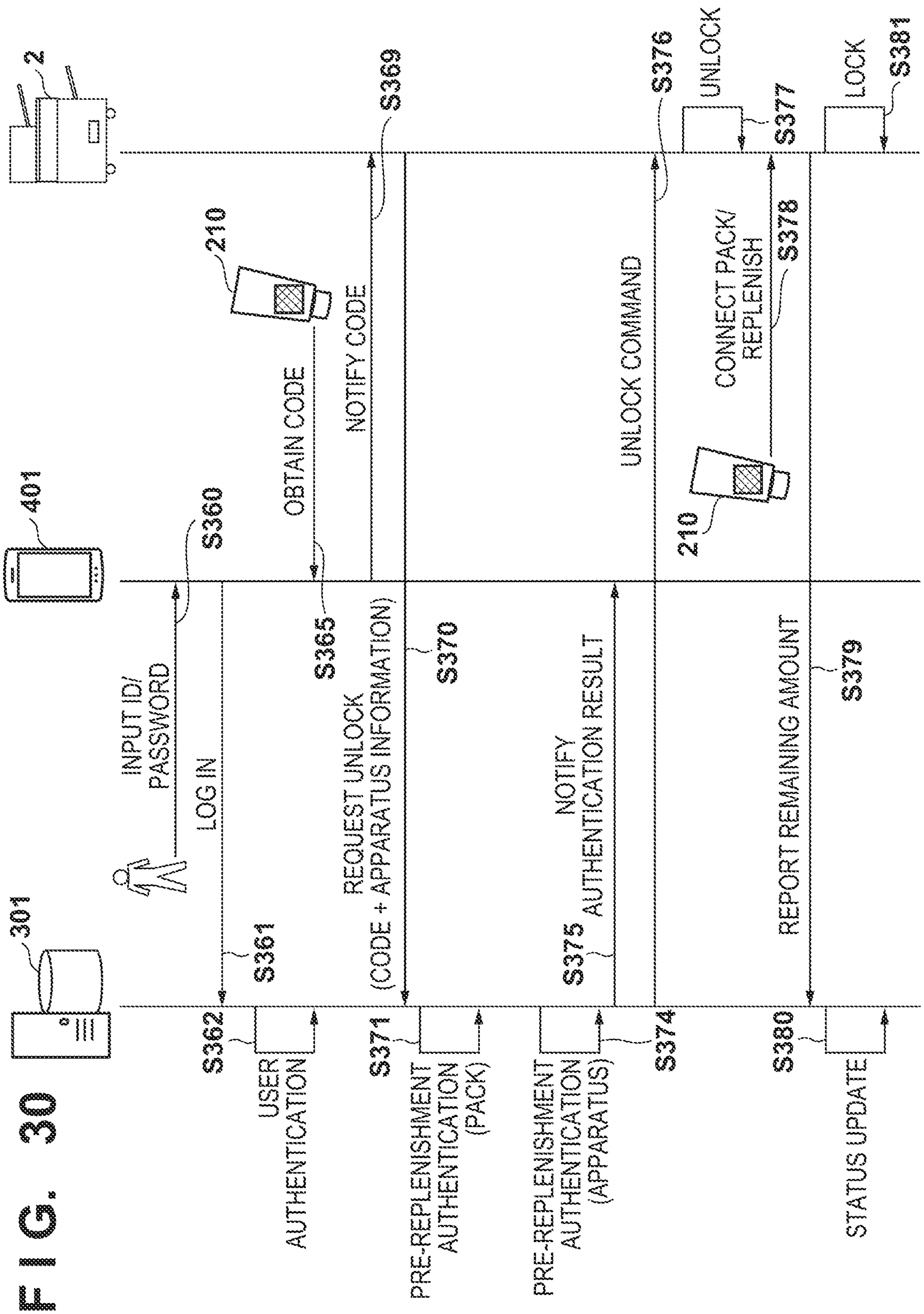
FIG. 30 is a sequence chart illustrating an example of the overall flow of processing according to a second example when replenishing a consumable agent.

This section will describe several examples of the flow of processing that can be executed in the device management system 300*c* according to the present embodiment, with reference to the sequence chart in FIG. 27 and the flowcharts in FIGS. 28 to 30.

<2-3-1. Authentication and Replenishment of Consumable Agent (First Example)>

FIG. 27 is a sequence chart illustrating an example of the overall flow of processing according to a first example when replenishing the consumable agent. The sequence illustrated in FIG. 27 mainly involves the image-forming apparatus 2, the management server 301, and the user terminal 401. Note that an unused new replenishment pack 210 is assumed to have been delivered to the user environment E1 prior to the start of the sequence.

First, in S360, the user inputs the user ID and password in the login screen. In S361, the application unit 440 of the user terminal 401 sends the input user ID and password to the management server 301. In S362, the authentication unit 370 of the management server 301 executes user authentication based on the user ID and password received from the user terminal 401. It is assumed here that the user authentication is successful and the login to the system is established. The subsequent processing illustrated in FIG. 27 is performed while the login session continues.

In S365, the application unit 440 activates the code obtainment unit 430 in response to an operation made by the user. The code obtainment unit 430 obtains the code 201 specific to the replenishment pack 210 by, for example, optically reading the code using the camera 413, or by accepting a user input. Next, in S366, the application unit 440 sends an unlock request, including the code 201 obtained by the code obtainment unit 430, to the management server 301.

The authentication unit 370 of the management server 301 starts the pre-replenishment authentication in response to the unlock request being received. S367 is a first stage of the pre-replenishment authentication, in which the authentication unit 370 determines whether the replenishment pack 210 identified by the code 201 included in the unlock request has correspondence with the account of the logged-in user by referring to the delivery management table 340. It is assumed here that the replenishment pack 210 has correspondence with the user account, and the first stage of the authentication is therefore successful. In response to the first stage of the authentication being successful, in S368, the authentication unit 370 instructs the application unit 440 to display a message prompting a predetermined operation to be performed in the replenishment target apparatus, and that message is displayed by the display device 415.

In S372, the user performs the predetermined operation through the user OF 13 of the image-forming apparatus 2 that is the replenishment target apparatus. Upon doing so, in S373, the lock control unit 296 reads out the apparatus ID from the memory 12 and sends the apparatus information, including the read-out apparatus ID, to the management server 301. S374 is a second stage of the pre-replenishment authentication, in which the authentication unit 370 determines whether the image-forming apparatus 2 which is to be replenished has correspondence with the user account of the logged-in user by referring to the apparatus registration table 330 based on the apparatus ID included in the received apparatus information. It is assumed here that the image-forming apparatus 2 has correspondence with the user account, and the second stage of the authentication is therefore also successful. In response to the pre-replenishment authentication being successful, in S375, the authentication unit 370 notifies the user terminal 401 of the result that the authentication is successful. Additionally, in S376, the authentication unit 370 sends an unlock command to the image-forming apparatus 2 to cause the locking mechanism 252 of the image-forming apparatus 2 to unlock the opening and closing mechanism 251.

In S377, in response to the unlock command from the management server 301 being received, the lock control unit 296 of the image-forming apparatus 2 causes the locking mechanism 252 to unlock the opening and closing mechanism 251. In S378, the unlocked opening and closing mechanism 251 is operated by the user (or is automatically activated), the replenishment path 250 is opened, and the image-forming apparatus 2 is replenished with the consumable agent from the replenishment pack 210. In S379, the print control unit 95 detects the remaining amount of toner in the preserving unit 48 and reports the remaining amount information, which indicates the remaining amount of toner, to the management server 301. In S380, the data management unit 350 of the management server 301 updates the value of "Remaining Amount of Toner" in the record of the apparatus registration table 330 corresponding to the image-forming apparatus 2 in response to the remaining amount information being received. In addition, the data management unit 350 changes "Status" for the record in the delivery management table 340 corresponding to the used replenishment pack 210 to "Used".

Meanwhile, when the predetermined unlocked period has passed following the reception of the unlock command or the unlocking of the opening and closing mechanism 251, in S381, the lock control unit 296 of the image-forming apparatus 2 locks the opening and closing mechanism 251 again.

Note that as described above, it is also possible to perform only the pre-replenishment authentication pertaining to the replenishment pack 210 in S367 and to omit the pre-replenishment authentication pertaining to the image-forming apparatus 2 in S374. In this case, the user operation in S372 and the sending of the apparatus information in S373 may also be skipped. However, when the power of the image-forming apparatus 2 is off, the image-forming apparatus 2 cannot receive the unlock command from the management server 301, and thus the management server 301 may instruct the user to power on the image-forming apparatus 2 in S368.

<2-3-2. Authentication Processing>

FIG. 28 is a flowchart illustrating an example of the flow of the authentication processing executed by the management server 301 according to the present embodiment. The authentication processing in FIG. 28 corresponds to the processing executed by the authentication unit 370 of the management server 301 in S362 to S376 in FIG. 27. This authentication processing can be realized, for example, by the processing circuit 314 executing a computer program stored in advance in the memory 312 of the management server 301.

First, in S411, the authentication unit 370 receives the user ID and password entered in the login screen. Next, in S413, the authentication unit 370 executes user authentication based on the received user ID and password. It is assumed here that the user authentication is successful, and thus the flow of processing performed when the user authentication has failed will not be described.

Next, in S415, the authentication unit 370 receives the code 201 specific to the replenishment pack 210 obtained in the user environment E1. Next, in S417, the authentication unit 370 determines whether the replenishment pack 210 identified based on the received code 201 has correspondence with the user account of the logged-in user. For example, if an association between the Pack ID based on the received code 201 and the user ID of the logged-in user is registered in the delivery management table 340, it is determined that the replenishment pack 210 can be permitted to be used (e.g., has been provided through a legitimate route), and the sequence moves to S421. On the other hand, if there is no association between the Pack ID based on the received code 201 and the user ID of the logged-in user registered in the delivery management table 340, it is determined that the replenishment pack 210 cannot be permitted to be used, and the sequence moves to S419.

In S419, because it has been determined that the replenishment pack 210 is not a pack that can be permitted to be used, the authentication unit 370 determines not to permit the replenishment of the consumable agent from the replenishment pack 210. In this case, the authentication unit 370 sends, to the user terminal 401, an authentication result notification indicating that the use of the replenishment pack 210 is not permitted and the pre-replenishment authentication has failed.

In S421, the authentication unit 370 determines whether the status of the replenishment pack 210 identified by the received code 201 is "Unused" by referring to the delivery management table 340. If the status is "Unused", the sequence moves to S425. On the other hand, if the status is "Used", the sequence moves to step S423.

In S423, since the replenishment pack 210 has already been used, the authentication unit 370 determines not to permit the replenishment of the consumable agent from the replenishment pack 210. In this case, the authentication unit 370 sends, to the user terminal 401, an authentication result notification indicating that the pre-replenishment authentication has failed because the replenishment pack 210 has already been used.

If the replenishment pack 210 identified by the received code 201 is a pack that can be permitted to be used and is unused, in S425, the authentication unit 370 instructs the user to perform a predetermined operation in the replenishment target apparatus (e.g., by displaying a message on the screen). Next, in S427, the authentication unit 370 receives the apparatus information including the apparatus ID from the image-forming apparatus 2 that is the replenishment target apparatus. Next, in S429, the authentication unit 370 determines whether the replenishment target apparatus, identified by the received apparatus ID, is already registered as an apparatus of the logged-in user. For example, if there is an association between the received apparatus ID and the user ID of the logged-in user registered in the apparatus registration table 330, the replenishment target apparatus is already registered as an apparatus of the logged-in user, and thus the sequence moves to S433. On the other hand, if there is no association between the received apparatus ID and the user ID of the logged-in user registered in the apparatus registration table 330, the replenishment target apparatus is not registered as an apparatus of the logged-in user, and thus the sequence moves to S431.

In S431, since the replenishment target apparatus is not registered as an apparatus of the logged-in user, the authentication unit 370 determines not to permit the replenishment of the replenishment target apparatus with the consumable agent. In this case, the authentication unit 370 sends, to the user terminal 401, an authentication result notification indicating that the pre-replenishment authentication has failed due to the apparatus being unregistered.

In S433, since the replenishment target apparatus is already registered as an apparatus of the logged-in user, the authentication unit 370 determines to permit the replenishment of the image-forming apparatus 2, which is the replenishment target apparatus, with the consumable agent from the replenishment pack 210. In this case, the authentication unit 370 sends an unlock command to cause the locking mechanism 252 of the image-forming apparatus 2 to unlock the opening and closing mechanism 251, and sends, to the user terminal 401, an authentication result notification indicating that the authentication is successful. Although not illustrated in FIG. 28, in S433, the authentication unit 370 may permit the replenishment of the replenishment target apparatus with the consumable agent only if the remaining amount information indicates that the remaining amount of toner in the replenishment target apparatus is less than a predetermined remaining amount threshold, as described above.

<2-3-3. Lock Control Processing>

FIG. 29 is a flowchart illustrating an example of the flow of lock control processing executed by the image-forming apparatus 2 according to the present embodiment. The lock control processing in FIG. 29 corresponds to the processing executed by the lock control unit 296 of the image-forming apparatus 2 in S372 to S381 in FIG. 27. This lock control processing can be realized by, for example, the processing circuit 90 executing a computer program stored in advance in the memory 12 of the image-forming apparatus 2.

First, in S511, the lock control unit 296 detects a predetermined input signal. Here, the input signal may be, for example, an ID sending request received from the user terminal 401 via the communication OF 11, or a user input signal detected via the user I/F 13. In S513, in response to the predetermined input signal being detected, the lock control unit 296 reads out the apparatus ID from the memory 12 and sends the apparatus information, including the read-out apparatus ID, to the management server 301. Next, in S515, the lock control unit 296 starts standing by for the unlock command, which is a control signal based on the result of the pre-replenishment authentication.

In S517, the lock control unit 296 determines whether the predetermined standby period has expired by referring to the value of a timer that starts when the standby starts, for example. If the standby period has expired, the sequence moves to S537. On the other hand, if the standby period has not expired, the sequence moves to S519.

In S519, the processing branches depending on whether an unlock command has been received from the management server 301. If an unlock command has been received from the management server 301, the sequence moves to S521. If an unlock command is not received, the sequence returns to S517.

In S521, the lock control unit 296 causes the locking mechanism 252 to unlock the opening and closing mechanism 251 in accordance with the unlock command received from the management server 301. Next, in S523, the lock control unit 296 stands by until the unlocked period expires by using a timer that starts when the opening and closing mechanism 251 is unlocked, for example. In the meantime, in S525, the lock control unit 296 monitors an operation of the opening and closing mechanism 251 by the user. When the opening and closing mechanism 251 is operated by the user and the replenishment path 250 is opened, the sequence moves to step S527.

In S527, the lock control unit 296 sends, to the management server 301, an operation notification indicating that the replenishment path 250 has been opened. In addition, in S529, the remaining amount detection unit 61 detects the remaining amount of toner in the preserving unit 48. Then, in S531, the print control unit 95 reports the remaining amount of toner detected by the remaining amount detection unit 61 to the management server 301. The detection and reporting of the remaining amount of toner in S529 and S531 may be repeated until it is determined in S533 that the unlocked period has expired.

If it is determined in S523 or S533 that the unlocked period has expired, in S535, the lock control unit 296 causes the locking mechanism 252 to lock the opening and closing mechanism 251 again. Additionally, in S537, the lock control unit 296 ends the standby for the control signal from an external apparatus. The lock control processing illustrated in FIG. 29 then ends.

<2-3-4. Authentication and Replenishment of Consumable Agent (Second Example)>

FIG. 30 is a sequence chart illustrating an example of the overall flow of processing according to a second example when replenishing the consumable agent. The sequence illustrated in FIG. 30 mainly involves the image-forming apparatus 2, the management server 301, and the user terminal 401. Note that an unused new replenishment pack 210 is assumed to have been delivered to the user environment E1 prior to the start of the sequence.

S360 to S362, which are processing steps related to login and user authentication, may be the same as in the first example illustrated in FIG. 27, and will therefore not be described again here.

In S365, the code obtainment unit 430 of the user terminal 401 is activated in response to an operation made by the user, and it obtains the code 201 specific to the replenishment pack 210. Next, in S369, the apparatus control unit 420 sends a code notification, including the code 201 obtained by the code obtainment unit 430, to the image-forming apparatus 2. In response to the code notification being received, in S370, the lock control unit 296 of the image-forming apparatus 2 sends an unlock request, which can include the notified code 201 and the apparatus information including the apparatus ID of the image-forming apparatus 2, to the management server 301.

Note that instead of sending the code notification including the code 201 to the image-forming apparatus 2 in S369, the user terminal 401 may send an unlock request including the code 201 to the management server 301 and send an ID sending request (which does not include the code 201) to the image-forming apparatus 2. In this case, in response to the ID sending request being received, the lock control unit 296 of the image-forming apparatus 2 sends the apparatus information including the apparatus ID of the image-forming apparatus 2 to the management server 301, as in S373 in FIG. 27.

The authentication unit 370 of the management server 301 starts the pre-replenishment authentication in response to the unlock request being received. In S371, the authentication unit 370 determines whether the replenishment pack 210 identified by the code 201 included in the unlock request has correspondence with the account of the logged-in user by referring to the delivery management table 340. It is assumed here that the replenishment pack 210 has appropriate correspondence with the user account. Next, in S374, the authentication unit 370 determines whether the image-forming apparatus 2 which is the replenishment target has correspondence with the user account of the logged-in user by referring to the apparatus registration table 330 based on the apparatus ID included in the unlock request. It is assumed here that the image-forming apparatus 2 has appropriate correspondence with the user account. The pre-replenishment authentication is therefore successful. In response to the pre-replenishment authentication being successful, in S375, the authentication unit 370 notifies the user terminal 401 of the result that the authentication is successful. Additionally, in S376, the authentication unit 370 sends an unlock command to the image-forming apparatus 2 to cause the locking mechanism 252 of the image-forming apparatus 2 to unlock the opening and closing mechanism 251.

S377 to S381, which are processing steps performed after the unlock command has been sent, may be the same as in the first example illustrated in FIG. 27, and will therefore not be described again here.

In the first example illustrated in FIG. 27, the code 201 specific to the replenishment pack 210 is sent to the management server 301 from the user terminal 401, whereas the apparatus ID identifying the image-forming apparatus 2 which is the replenishment target apparatus is sent to the management server 301 from the image-forming apparatus 2. Accordingly, there is no need to send and receive the code 201 between the user terminal 401 and the image-forming apparatus 2, and thus the above-described mechanism can be realized at a relatively low development cost. In the second example illustrated in FIG. 30, the code 201 specific to the replenishment pack 210 is transferred from the user terminal 401 that obtained the code 201 to the image-forming apparatus 2, and it is relayed to the management server 301 along with the apparatus information of the image-forming apparatus 2. Accordingly, the user does not need to operate the image-forming apparatus 2 in order to trigger the sending of the apparatus ID, which reduces the workload on the user for pre-replenishment authentication.

<2-4. Variation>

Figure 31:
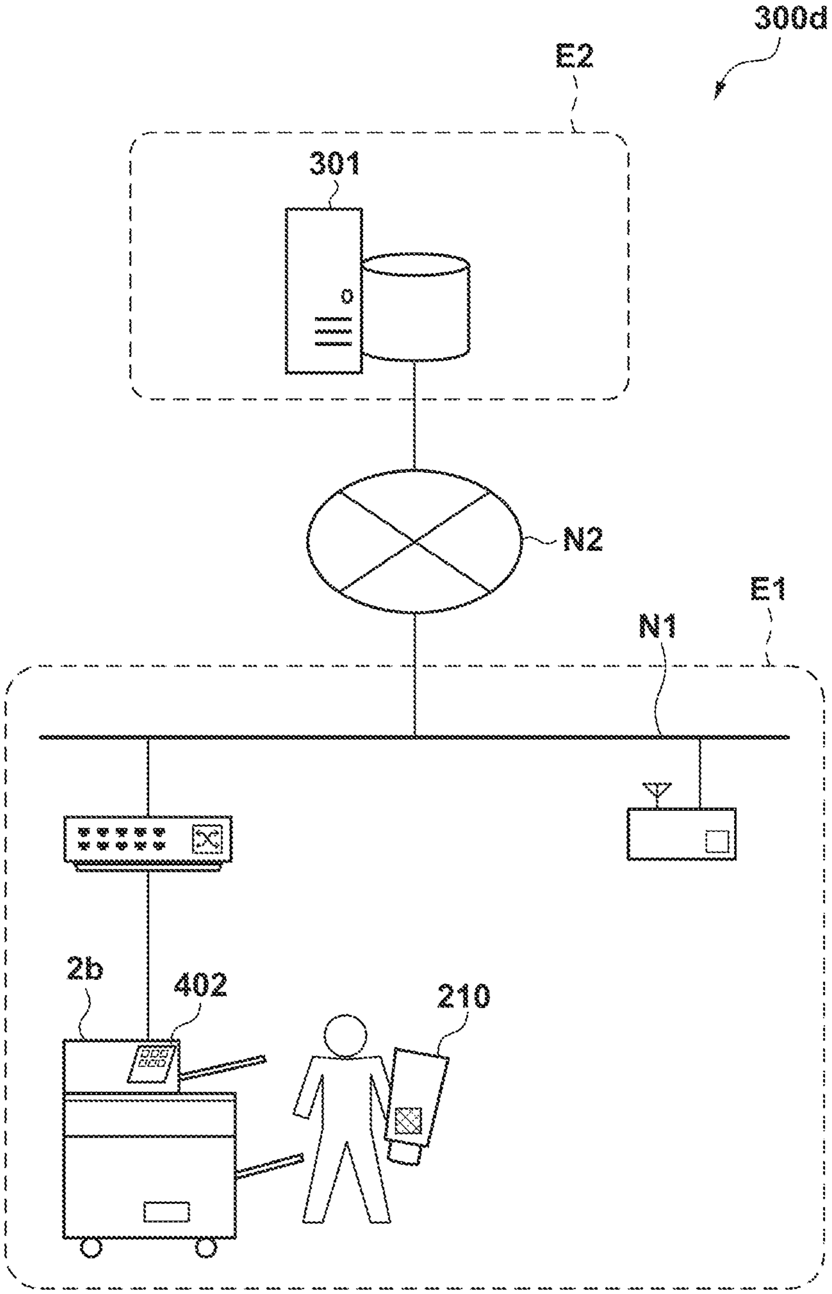
FIG. 31 is a schematic diagram illustrating an example of the configuration of a device management system according to a variation on the second embodiment.

FIG. 31 is a schematic diagram illustrating an example of the configuration of a device management system 300*d* according to a variation on the second embodiment. In this variation, the functions of the user terminal 401 described above are substantially integrated into the image-forming apparatus 2. Referring to FIG. 31, the device management system 300*d* includes an image-forming apparatus 2*b* and the management server 301.

The image-forming apparatus 2*b* is installed in the user environment E1 in which a user is present. The image-forming apparatus 2*b* may basically have the same configuration as the image-forming apparatus 2 described above, but further includes the operation terminal 402. The operation terminal 402 provides code obtainment functions similar to those of the code obtainment unit 430 of the user terminal 401, and UI functions similar to those of the application unit 440 of the user terminal 401. The operation terminal 402 may be used, for example, for accepting the input of account information, and accepting input of the code 201 specific to the replenishment pack 210. When the operation terminal 402 accepts the input of the code 201, the lock control unit 296 of the image-forming apparatus 2*b* sends an unlock request, which can include the input code 201 and the apparatus information including the apparatus ID of the image-forming apparatus 2*b*, to the management server 301 via the communication OF 11. Then, based on the result of the pre-replenishment authentication performed by the management server 301, the lock control unit 296 causes the opening and closing mechanism 251 to open the consumable agent replenishment path 250, or unlocks the opening and closing mechanism 251 so as to allow the replenishment path 250 to be opened.

According to this variation, both of reduction of development costs by eliminating the sending and receiving of the code 201 between the user terminal 401 and the image-forming apparatus 2, and mitigation of the workload for the user by eliminating operations for triggering the sending of the apparatus ID can be achieved.

<2-5. Summary of Second Embodiment>

According to the second embodiment described in this section, an opening and closing mechanism capable of opening and closing a consumable agent replenishment path from a container device containing a consumable agent consumed for image formation to an image-forming apparatus is provided in at least one of the container device and the image-forming apparatus. A code specific to the container device which is to be used to replenish the consumable agent is obtained by a terminal present in the user environment, and the obtained code is sent to a server apparatus in a remote environment. Authentication for permitting the replenishment of the consumable agent from the container device is then performed by the server apparatus based on the aforementioned code. If the authentication is successful, the consumable agent replenishment path is opened by the opening and closing mechanism, or the opening and closing mechanism is allowed to open the replenishment path. Accordingly, the replenishment of the consumable agent can be permitted or inhibited in light of conditions not easily determined by the image-forming apparatus alone, such as correspondence between the container device and the user account, correspondence between the replenishment target apparatus and the user account, or the like.

Additionally, according to the second embodiment, the aforementioned code that is specific to the container device is an optically-readable code or a code which can be read visually by the user, printed on the device or the package thereof. Accordingly, the code can be easily obtained using a user interface or a camera of a terminal. This eliminates the need to provide a memory for storing the code in each of the container devices, which are consumed one after another, and this makes it possible to reduce running costs borne by users.

Although this section mainly described an example in which the management server 301 performs the pre-replenishment authentication in response to the reception of an unlock request from the user terminal 401 or the image-forming apparatus 2 present in the user environment E1, the present embodiment is not limited to this example. For example, the management server 301 may verify the association between the user account and the replenishment pack 210 in response to the reception of a verification request, which can include a code specific to the replenishment pack 210, and send a verification result notification to the user terminal 401 or the image-forming apparatus 2. In this case, the user terminal 401 or the image-forming apparatus 2 that has received the verification result notification may determine whether the opening and closing mechanism 251 should be unlocked based on the verification result in the notification.

Additionally, although this section mainly described an example in which "Status" in the corresponding record in the delivery management table 340 is changed to "Used" in response to the remaining amount report sent from the image-forming apparatus 2 to the management server 301 after the toner is replenished, the present embodiment is not limited to this example. For example, the trigger for changing the status may be a predetermined user operation being detected. To be more specific, in one variation, first, the user terminal 401 or the image-forming apparatus 2 displays, on the screen, a message asking the user whether the replenishment of the toner is complete. When the replenishment of the toner is complete, the user operates the input device 414 of the user terminal 401 or a button (physical or in the GUI) of the image-forming apparatus 2 to make a response indicating that the replenishment is complete. In response to such a user operation being detected, the user terminal 401 or the image-forming apparatus 2 sends a replenishment complete notification to the management server 301. In response to the reception of this replenishment complete notification, the management server 301 can change "Status" for the corresponding record in the delivery management table 340 to "Used". In another variation, a lever position sensor that detects the position of the lever 111*b* may be additionally provided in the image-forming apparatus 2. Then, when the lever position sensor detects that the lever 111*b* has returned to its original position, the image-forming apparatus 2 may send the replenishment complete notification to the management server 301. In response to the reception of this replenishment complete notification, the management server 301 can change "Status" for the corresponding record in the delivery management table 340 to "Used".

3. Third Embodiment

The foregoing second embodiment described an example in which a code that is specific to the container device is provided in a format that is optically readable or visually readable by the user. A third embodiment, described in this section, will describe an example in which a code that is specific to the container device is stored in a memory installed in the container device.

<3-1. System Overview>

Figure 32:
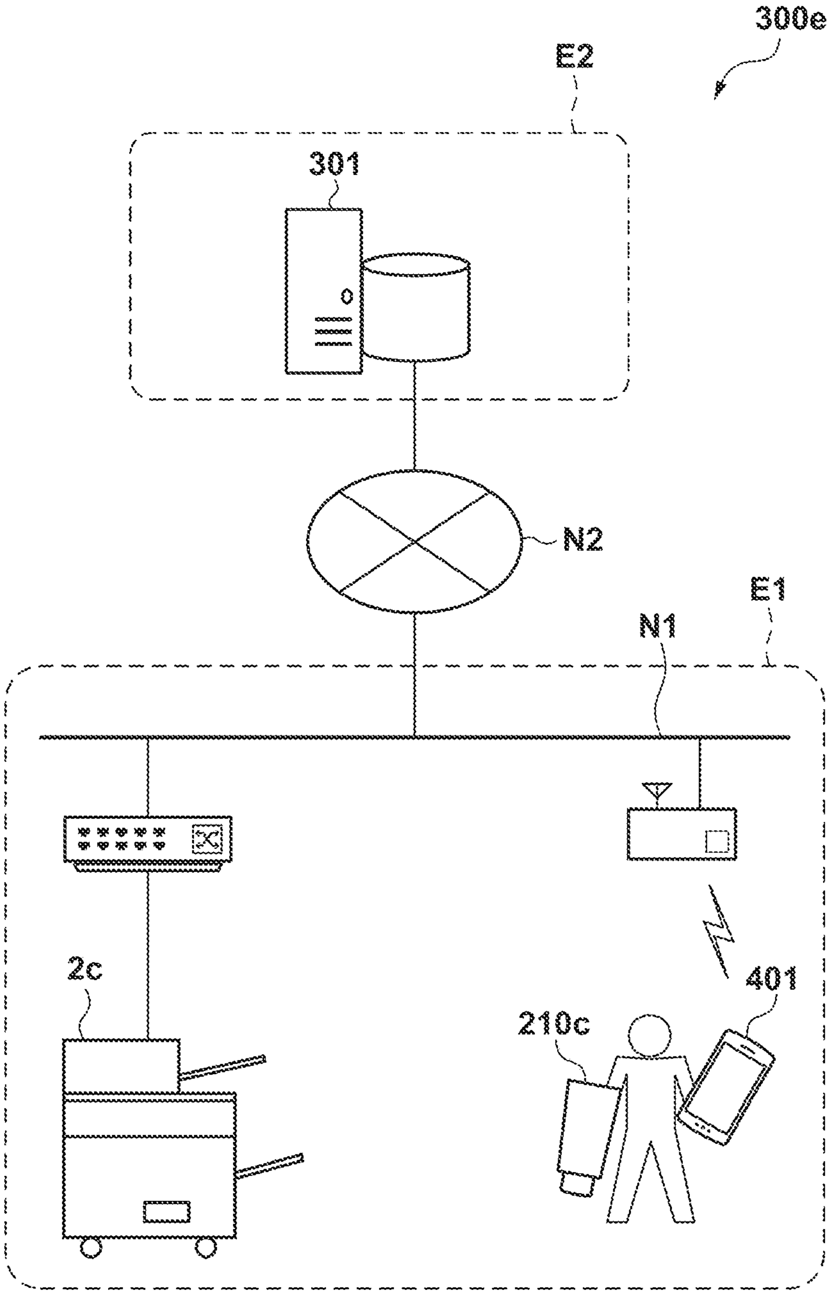
FIG. 32 is a schematic diagram illustrating an example of the configuration of a device management system according to a third embodiment.

FIG. 32 is a schematic diagram illustrating an example of the configuration of a device management system 300*e* according to the third embodiment. Referring to FIG. 32, the device management system 300*e* includes an image-forming apparatus 2*c*, the management server 301, and the user terminal 401.

The image-forming apparatus 2*c* is installed in the user environment E1 in which a user is present. The user terminal 401 is also present in the user environment E1, and is owned by a user. The image-forming apparatus 2*c* and the user terminal 401 are connected to the local network N1, which can be a LAN, for example.

The user uses the image-forming apparatus 2*c* in the user environment E1. As described above, the image-forming apparatus 2*c* forms an image on a recording medium by consuming toner, which serves as a consumable agent. When the toner preserved in the image-forming apparatus 2*c* is depleted, the user connects a replenishment pack 210*c*, which is a container device that contains the toner, to the image-forming apparatus 2*c*, and replenishes the image-forming apparatus 2*c* with the toner from the replenishment pack 210*c*. In the present embodiment, each replenishment pack 210*c* is provided with a specific code for uniquely identifying that replenishment pack 210*c*. With the exception of including a memory chip (called a "memory tag" hereinafter) that stores the code assigned to the replenishment pack, the replenishment pack 210*c* may be configured in the same manner as the replenishment pack 210 described above. Aside from additionally including a configuration for reading the code from the memory tag of the replenishment pack 210*c*, the image-forming apparatus 2*c* may be configured in the same manner as the image-forming apparatus 2 described above.

Figure 33:
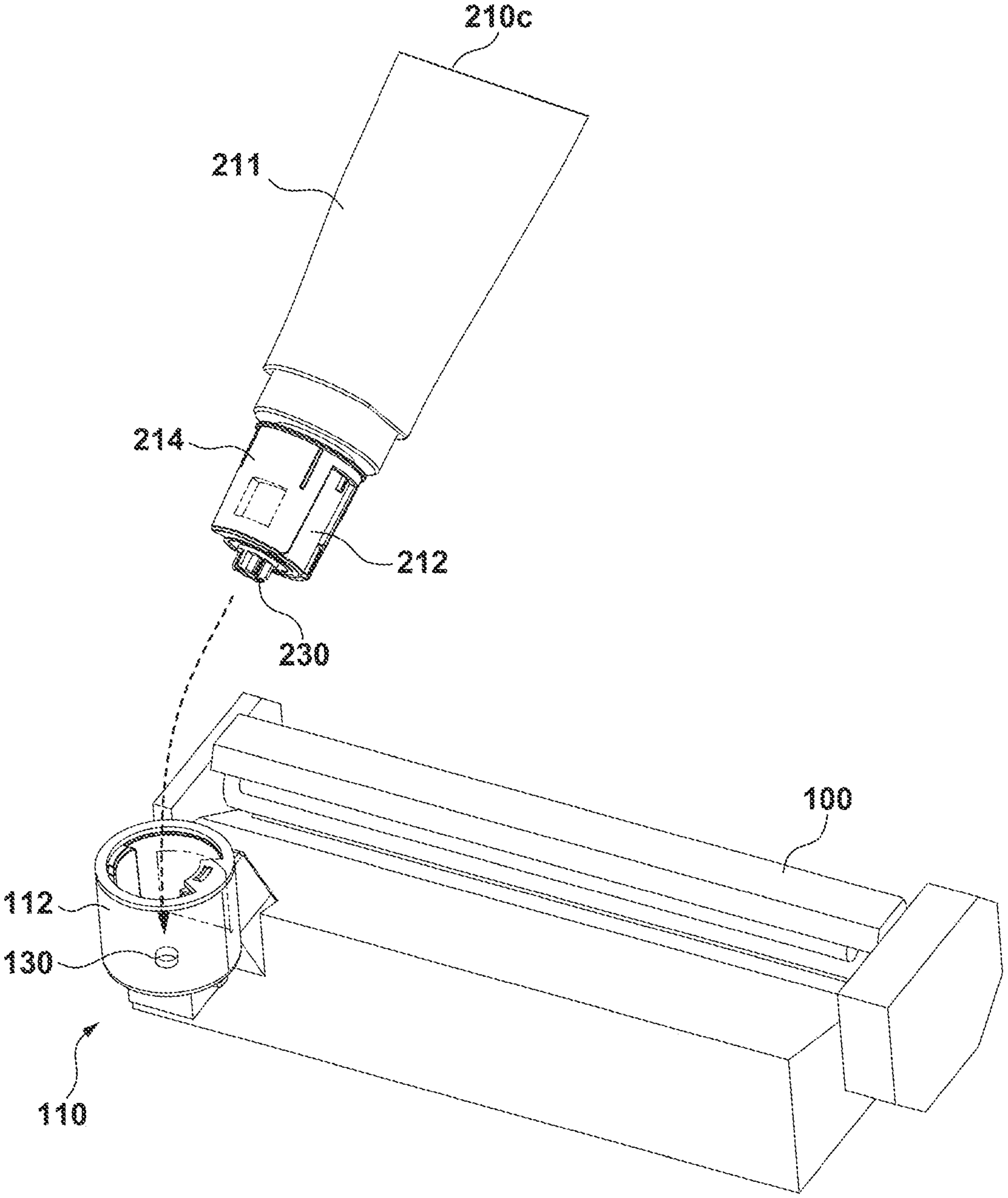
FIG. 33 is a schematic diagram illustrating a connection between a replenishment pack and an image-forming apparatus according to the third embodiment.

FIG. 33 is a schematic diagram illustrating a connection between the replenishment pack 210*c* and the image-forming apparatus 2*c* according to the present embodiment. As illustrated in FIG. 33, the replenishment pack 210*c* includes the containing part 211, the nozzle 212, the pack shutter 214, and a memory tag 230. The memory tag 230 is disposed, for example, at the tip of the nozzle 212. Meanwhile, a tag terminal 130 is disposed on a bottom surface of the cylindrical member 112 of the toner receiving unit 110 of the image-forming apparatus 2*c*. The tag terminal 130 makes electrical contact with an output terminal of the memory tag 230 when the replenishment pack 210*c* is connected to the toner receiving unit 110. The image-forming apparatus 2*c* can read out information stored in the memory tag 230 of the replenishment pack 210*c* through the electrical contact between these terminals.

<3-2. Example of Configuration of Image-Forming Apparatus>

Figure 34:
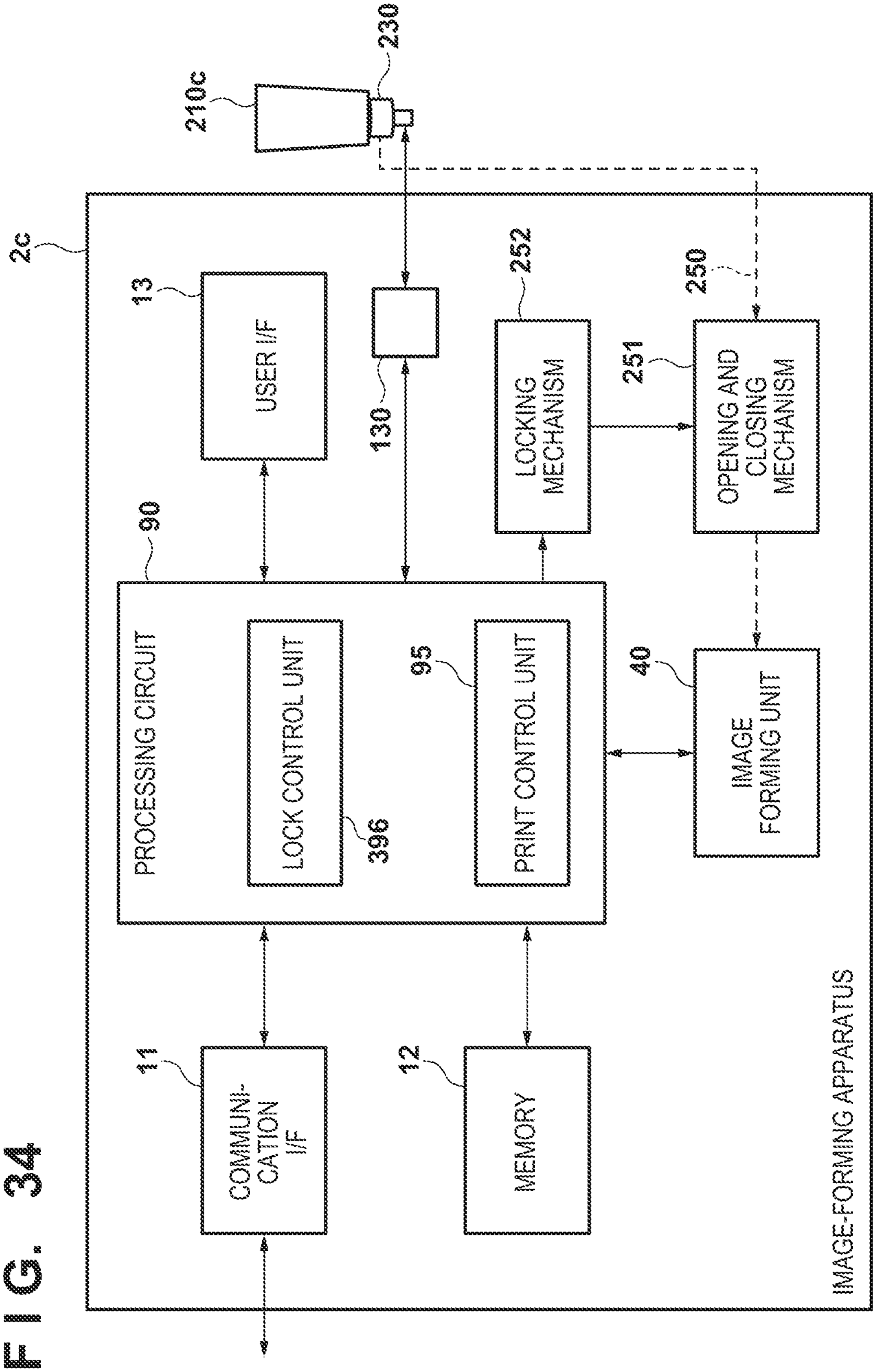
FIG. 34 is a block diagram illustrating an example of the configuration of the image-forming apparatus according to the third embodiment.

FIG. 34 is a block diagram illustrating an example of the functional configuration of the image-forming apparatus 2*c* according to the present embodiment. Referring to FIG. 34, the image-forming apparatus 2*c* includes the communication I/F 11, the memory 12, the user I/F 13, the image-forming unit 40, the opening and closing mechanism 251, the locking mechanism 252, the processing circuit 90, and the tag terminal 130. From a functional perspective, the processing circuit 90 can function mainly as the print control unit 95 and a lock control unit 396.

Like the lock control unit 296 of the image-forming apparatus 2 according to the second embodiment, the lock control unit 396 controls the locking and unlocking of the opening and closing mechanism 251 by the locking mechanism 252. Only the differences between the lock control unit 296 and the lock control unit 396 will be described here.

Upon the connection of the replenishment pack 210*c* being detected (e.g., using a sensor (not shown)), the lock control unit 396 reads out the code specific to the replenishment pack 210*c* from the memory tag 230 of the replenishment pack 210*c* through the tag terminal 130. The lock control unit 396 also reads out the apparatus ID that uniquely identifies the image-forming apparatus 2*c* from the memory 12. The lock control unit 396 then sends an unlock request, including the code specific to the replenishment pack 210*c* and the apparatus ID of the image-forming apparatus 2*c*, to the management server 301 via the communication I/F 11. Prior to the sending of the unlock request or after the sending of the unlock request, the user inputs the user ID and password through the user I/F 13, and logs into the system upon the user authentication being successful. The management server 301 executes the pre-replenishment authentication described above using the user ID of the logged-in user, as well as the code and the apparatus ID received from the image-forming apparatus 2*c*.

After sending the apparatus ID to the management server 301 for the pre-replenishment authentication, the lock control unit 396 waits for reception of an unlock command, which is a control signal based on the result of the pre-replenishment authentication, over a predetermined standby period. Then, if the unlock command is received before the standby period expires, the lock control unit 396 causes the locking mechanism 252 to unlock the opening and closing mechanism 251 in accordance with the unlock command. If the standby period expires without the command being received from the management server 301, the lock control unit 396 stops standing by for the command.

<3-3. Flow of Processing>

Figure 35:
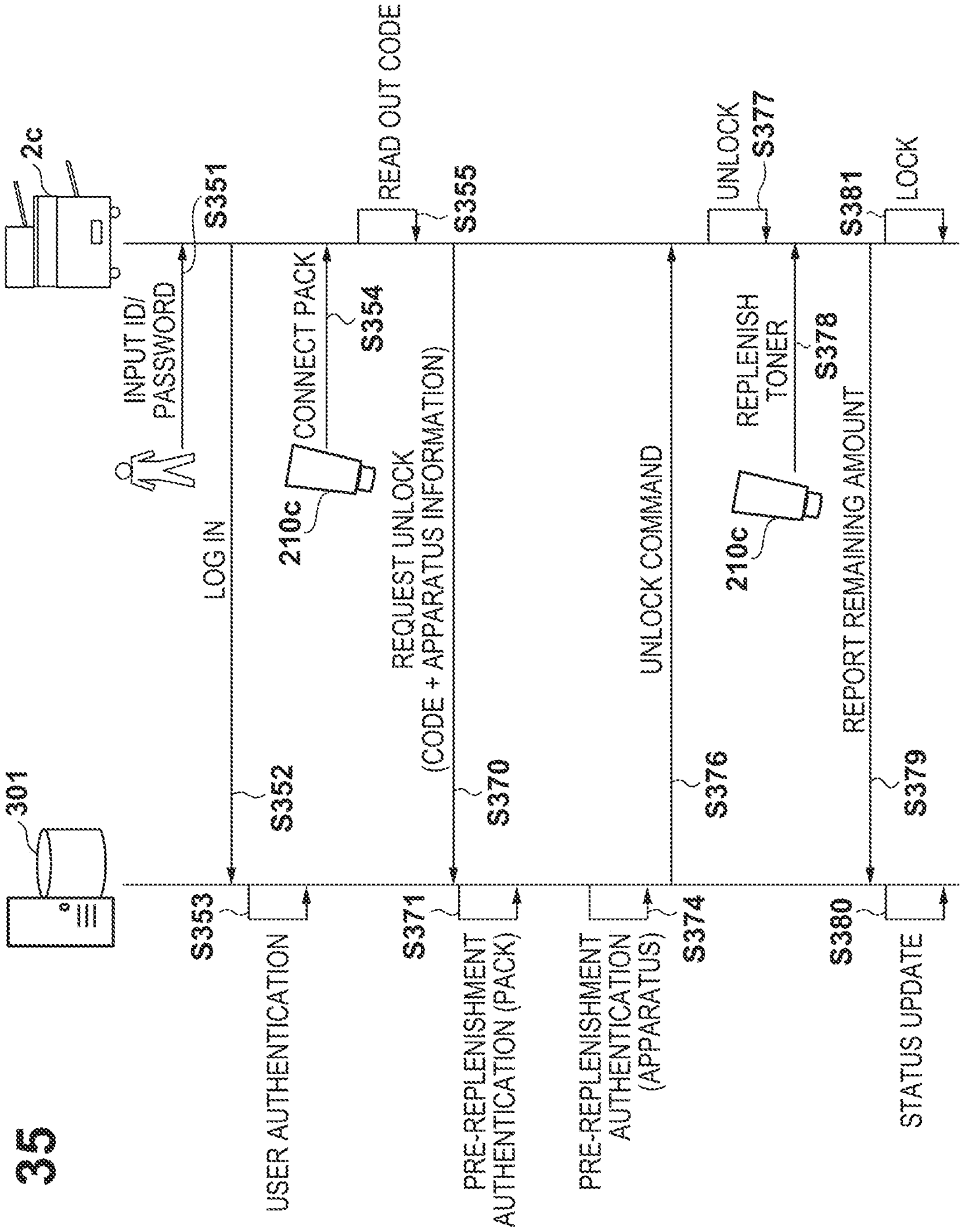
FIG. 35 is a sequence chart illustrating an example of the overall flow of processing when replenishing a consumable agent according to the third embodiment.

FIG. 35 is a sequence chart illustrating an example of the overall flow of processing when replenishing the consumable agent according to the present embodiment. The sequence illustrated in FIG. 35 mainly involves the image-forming apparatus 2*c* and the management server 301. Note that an unused new replenishment pack 210 is assumed to have been delivered to the user environment E1 prior to the start of the sequence.

First, in S351, the user inputs the user ID and password in the login screen provided by the user I/F 13 of the image-forming apparatus 2*c*, for example. In S352, the lock control unit 396 sends the input user ID and password to the management server 301 in order to log in. In S353, the authentication unit 370 of the management server 301 executes user authentication based on the user ID and password received from the image-forming apparatus 2*c*. It is assumed here that the user authentication is successful and the login to the system is established. The subsequent processing illustrated in FIG. 35 is performed while the login session continues.

In S354, the replenishment pack 210*c* is connected to the image-forming apparatus 2*c* by the user, and that connection is detected by the lock control unit 396. Next, in S355, the lock control unit 396 reads out the code specific to the replenishment pack 210*c* from the memory tag 230 of the replenishment pack 210*c* through the tag terminal 130. Next, in S370, the lock control unit 396 sends an unlock request, which can include the code read out from the memory tag 230 and the apparatus information including the apparatus ID of the image-forming apparatus 2, to the management server 301.

The authentication unit 370 of the management server 301 starts the pre-replenishment authentication in response to the unlock request being received. In S371, the authentication unit 370 determines whether the replenishment pack 210*c* identified by the code included in the unlock request has correspondence with the account of the logged-in user by referring to the delivery management table 340. It is assumed here that the replenishment pack 210*c* has appropriate correspondence with the user account. Next, in S374, the authentication unit 370 determines whether the image-forming apparatus 2*c* has correspondence with the user account of the logged-in user by referring to the apparatus registration table 330 based on the apparatus ID included in the unlock request. It is assumed here that the image-forming apparatus 2*c* has appropriate correspondence with the user account. The pre-replenishment authentication is therefore successful. In response to the pre-replenishment authentication being successful, in S376, the authentication unit 370 sends an unlock command to the image-forming apparatus 2*c* to cause the locking mechanism 252 of the image-forming apparatus 2*c* to unlock the opening and closing mechanism 251.

In S377, in response to the unlock command from the management server 301 being received, the lock control unit 396 causes the locking mechanism 252 to unlock the opening and closing mechanism 251. In S378, the unlocked opening and closing mechanism 251 is operated by the user (or is automatically activated), the replenishment path 250 is opened, and the image-forming apparatus 2*c* is replenished with the consumable agent from the replenishment pack 210*c*. In S379, the print control unit 95 detects the remaining amount of toner in the preserving unit 48 and reports the remaining amount information, which indicates the remaining amount of toner, to the management server 301. In S380, the data management unit 350 of the management server 301 updates the value of "Remaining Amount of Toner" in the record of the apparatus registration table 330 corresponding to the image-forming apparatus 2*c* in response to the remaining amount information being received. In addition, the data management unit 350 changes "Status" for the record in the delivery management table 340 corresponding to the used replenishment pack 210*c* to "Used".

In the meantime, when the predetermined unlocked period has passed following the reception of the unlock command or the unlocking of the opening and closing mechanism 251, in S381, the lock control unit 396 of the image-forming apparatus 2*c* locks the opening and closing mechanism 251 again.

<3-4. Summary of Third Embodiment>

According to the third embodiment described in this section, an opening and closing mechanism capable of opening and closing a consumable agent replenishment path from a container device containing a consumable agent consumed for image formation to an image-forming apparatus is provided in at least one of the container device and the image-forming apparatus. A code specific to the container device which is to be used to replenish the consumable agent is read out from the container device to the image-forming apparatus, and the read-out code is sent to a server apparatus in a remote environment. Authentication for permitting the replenishment of the image-forming apparatus with the consumable agent from the container device is then performed by the server apparatus based on the aforementioned code. If the authentication is successful, the consumable agent replenishment path is opened by the opening and closing mechanism, or the opening and closing mechanism is allowed to open the replenishment path. Accordingly, the replenishment of the consumable agent can be permitted or inhibited in light of conditions not easily determined by the image-forming apparatus alone, such as correspondence between the container device and the user account, correspondence between the image-forming apparatus and the user account, or the like.

Note that in the present embodiment too, the management server 301 may verify the association between the user account and the replenishment pack 210 in response to a verification request being received, instead of performing the pre-replenishment authentication in response to the unlock request being received. In this case, the user terminal 401 or the image-forming apparatus 2 that has received a verification result notification from the management server 301 may determine whether the opening and closing mechanism 251 should be unlocked based on the verification result in the notification.

Additionally, in the present embodiment too, "Status" in the delivery management table 340 may be changed to "Used" in response to a predetermined user operation being detected, instead of the remaining amount report. Here, the user operation may be a reaction to a question on the screen, or an operation on the opening and closing mechanism 251 that is detected by a lever position sensor.

The first, second, and third embodiments described in the present specification, as well as the various examples and variations, may be combined with each other in any way. The features described in connection with a given example, and the effects thereof, are applicable to any embodiment, example, and variation unless explicitly stated otherwise.

4. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A management system comprising:

an obtaining unit present in a user environment and configured to obtain a code that is specific to a cartridge-type device that is insertable into an image-forming apparatus;

an inhibiting mechanism that is disposed in at least one of the image-forming apparatus and the device and is capable of inhibiting the device from being inserted into the image-forming apparatus;

a server apparatus present in a remote environment and configured to perform authentication for the device based on the code obtained by the obtaining unit; and a control unit present in the user environment and configured to put the inhibiting mechanism in a state in which the device can be inserted into the image-forming apparatus when the authentication performed by the server apparatus is successful.

2. The management system according to claim 1, wherein the server apparatus is configured to receive account information of a user, and the authentication performed by the server apparatus includes determining whether the device identified by the code has a correspondence to an account indicated by the account information.

3. The management system according to claim 2, further comprising:

a database that indicates an association between each account and at least one device provided to a user who has the account, and the server apparatus is configured to determine, in a case where the device identified by the code is associated in the database with an account indicated by the account information, that the device has a correspondence to the account.

4. The management system according to claim 3, wherein the image-forming apparatus is configured to:

store device identification information that identifies the image-forming apparatus in advance; and transmit the device identification information to the server apparatus when a predetermined input signal is detected, and wherein the authentication performed by the server apparatus includes determining whether the image-forming apparatus identified by the device identification information has a correspondence to the account.

5. The management system according to claim 4, wherein the database further indicates an association between each account and at least one image-forming apparatus registered as an apparatus of a user who has the account, and the server apparatus is configured to determine, in a case where the image-forming apparatus identified by the device identification information is associated in the database with an account indicated by the account information, that the image-forming apparatus has a correspondence to the account.

6. The management system according to claim 4, wherein the predetermined input signal is a user input signal detected via a user interface of the image-forming apparatus.

7. The management system according to claim 4, wherein the predetermined input signal is a received signal received via a communication interface from a user terminal.

8. The management system according to claim 4, wherein, after the device identification information is transmitted to the server apparatus in response to detection of the predetermined input signal, the control unit is configured to wait over a predetermined time period for reception of a control signal based on a result of the authentication.

9. The management system according to claim 3, wherein the server apparatus is configured to register, when an event that triggers provision of the device to the user, an association between the account of the user and the device in the database.

10. The management system according to claim 9, wherein the event that triggers provision of the device to the user includes one or more of:

purchase of the device by the user;

arrival of provision timing based on a contract with the user;

detection of decrease in a remaining amount of the device or a consumable agent in an image-forming apparatus registered as an apparatus of the user;

arrival of a number of operations of an image-forming apparatus registered as an apparatus of the user to a threshold; and detection of use of a device that has provided to the user in the past.

11. The management system according to claim 1, wherein the database includes status information indicating whether each device has been used or not, and the authentication performed by the server apparatus further includes determining, based on the status information, whether the device identified by the code has been used or not.

12. The management system according to claim 11, wherein the server apparatus is configured to:

receive remaining amount information regarding the device or a consumable agent; and update the status information for the device in the database based on the received remaining amount information.

13. The management system according to claim 1, wherein the code is an optically-readable code printed on the device or a package of the device, and the obtaining unit is configured to obtain the code by optically reading the code.

14. The management system according to claim 1, wherein the obtaining unit is configured to obtain the code input by a user via a user interface.

15. The management system according to claim 1, wherein the management system comprises a user terminal that includes the obtaining unit and a communication unit configured to transmit the code obtained by the obtaining unit to the server apparatus.

16. The management system according to claim 1, wherein the management system comprises the image-forming apparatus that includes the obtaining unit and a communication unit configured to transmit the code obtained by the obtaining unit to the server apparatus, and the control unit.

17. The management system according to claim 1, wherein the inhibiting mechanism is a mechanism that switches between a first state in which the device can be inserted into and extracted from the image-forming apparatus and a second state in which the device cannot be inserted into and extracted from the image-forming apparatus.

18. The management system according to claim 17, wherein the control unit is configured to:

monitor, while keeping the inhibiting mechanism in the second state, whether an image-forming function of the image-forming apparatus is operable normally; and switch the inhibiting mechanism from the second state to the first state when an abnormality of the image-forming function has been detected and there is the device inserted in the image-forming apparatus.

19. The management system according to claim 18, wherein, after switching the inhibiting mechanism to the first state when the abnormality of the image-forming function has been detected, the control unit is configured to switch the inhibiting mechanism from the first state to the second state upon detecting that the device has been extracted from the image-forming apparatus.

20. A method for managing use of a cartridge-type device in an image-forming apparatus, wherein an inhibiting mechanism capable of inhibiting the device from being inserted into the image-forming apparatus is disposed in at least one of the image-forming apparatus and the device, and the image-forming apparatus is present in a user environment, the method comprising:

obtaining, by an obtaining unit present in the user environment, a code specific to the device;

transmitting the obtained code from the obtaining unit to a server apparatus that is present in a remote environment;

performing, by the server apparatus, authentication for the device based on the code that has been received; and putting, by the image-forming apparatus, the inhibiting mechanism in a state in which the device can be inserted into the image-forming apparatus when the authentication performed by the server apparatus is successful.

21. An image-forming apparatus installed in a user environment comprising:

an image-forming unit configured to consume a consumable agent contained in a cartridge-type device inserted into the image-forming apparatus to form an image on a recording medium;

a control unit configured to control an inhibiting mechanism that is capable of inhibiting the device from being inserted into the image-forming apparatus; and a communication interface configured to communicate with a server apparatus that is present in a remote environment;

wherein the control unit is configured to:

obtain a code specific to the device to transmit the obtained code via the communication interface to the server apparatus; and put the inhibiting mechanism in a state in which the device can be inserted into the image-forming apparatus when an authentication for the device performed by the server apparatus based on the transmitted code is successful.

22. A server apparatus for managing use of a cartridge-type device in an image-forming apparatus, wherein at least one of the image-forming apparatus and the device includes an inhibiting mechanism capable of inhibiting the device from being inserted into the image-forming apparatus, the image-forming apparatus is present in a user environment, and the server apparatus is present in a remote environment, the server apparatus comprising a communication interface and a processing circuit, wherein the processing circuit is configured to:

receive, from an apparatus present in the user environment via the communication interface, a code specific to the device;

performing authentication for the device based on the received code; and cause the image-forming apparatus to switch a state of the inhibiting mechanism to a state in which the device can be inserted into the image-forming apparatus when the authentication for the device is successful.

* * * * *